(12) United States Patent
Yasui et al.

(10) Patent No.: US 7,292,927 B2
(45) Date of Patent: Nov. 6, 2007

(54) CONTROL SYSTEM

(75) Inventors: Yuji Yasui, Saitama-ken (JP); Kanako Shimojo, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 11/206,992

(22) Filed: Aug. 19, 2005

(65) Prior Publication Data

US 2006/0047350 A1 Mar. 2, 2006

(30) Foreign Application Priority Data

Aug. 27, 2004 (JP) .............................. 2004-249213

(51) Int. Cl.
 *G05B 13/02* (2006.01)
 *F02D 13/02* (2006.01)
 *F01L 13/00* (2006.01)
(52) U.S. Cl. ........................... 701/103; 701/54; 701/57
(58) Field of Classification Search ................ 701/103, 701/102, 115, 54, 57, 61; 123/90.15
See application file for complete search history.

(56) References Cited

U.S. PATENT DOCUMENTS 4,914,905 A * 4/1990 Dubois et al. ............. 60/226.2

FOREIGN PATENT DOCUMENTS

JP 2003-262110 A * 9/2003

* cited by examiner

*Primary Examiner*—Hieu T. Vo
(74) *Attorney, Agent, or Firm*—Arent Fox LLP

(57) ABSTRACT

A control system which controls a control amount via a movable mechanism, such that it is possible to reduce impact occurring when a movable part of the movable mechanism is driven to a limit of the movable range, and time required for the driving, in a compatible manner. An ECU 2 of a control system 1 calculates, when Liftin<Liftin_VPL or Liftin_ VPH <Liftin holds, a switching function-setting parameter POLE_ lf as a value toward a predetermined value POLE_1f2 which is close to a value of −1 (step 25), and calculates a lift control input Uliftin for controlling a variable valve lift mechanism 50 by equations (3) to (10) using the calculated value (step 26).

9 Claims, 26 Drawing Sheets

F I G. 1
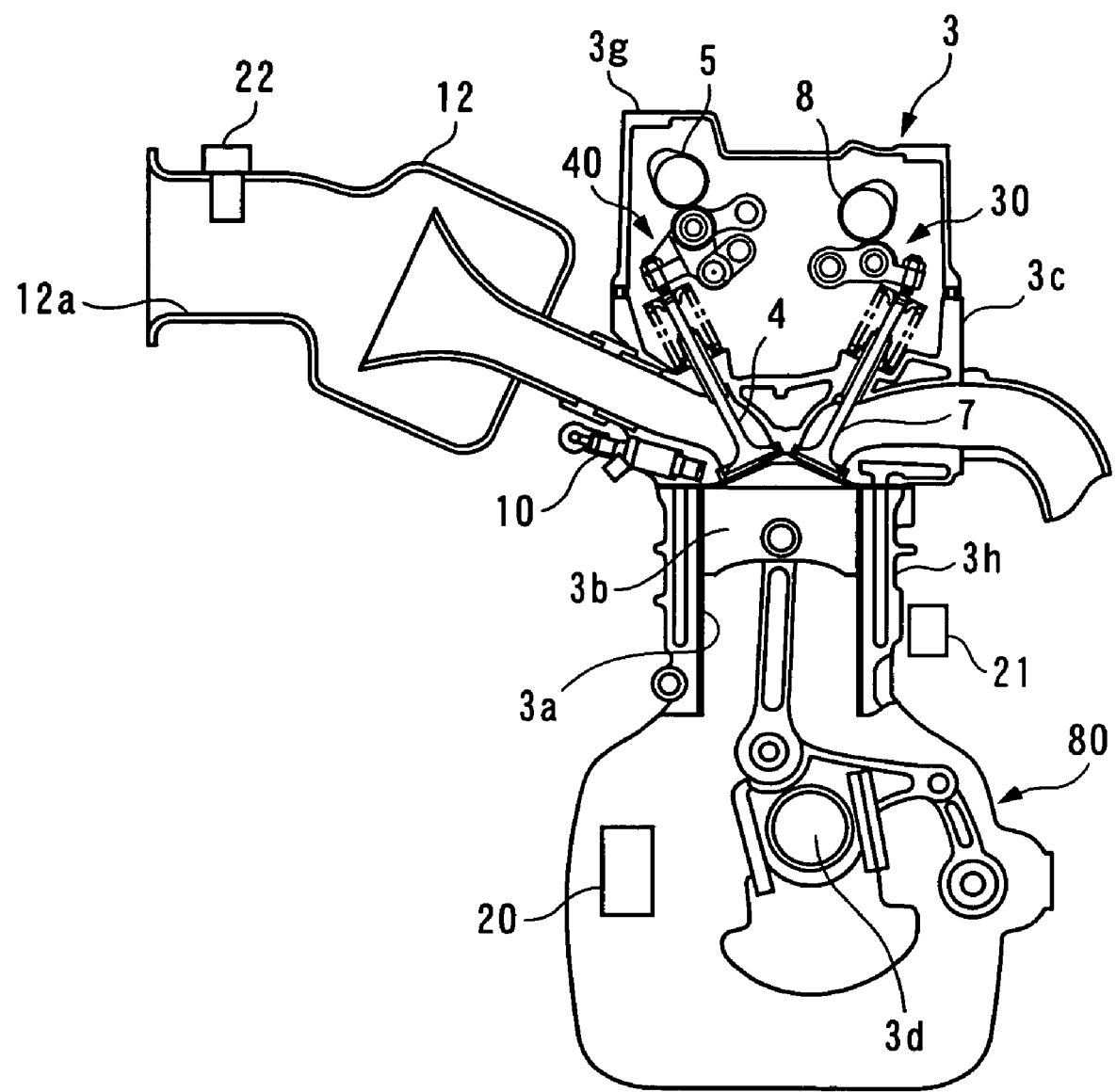

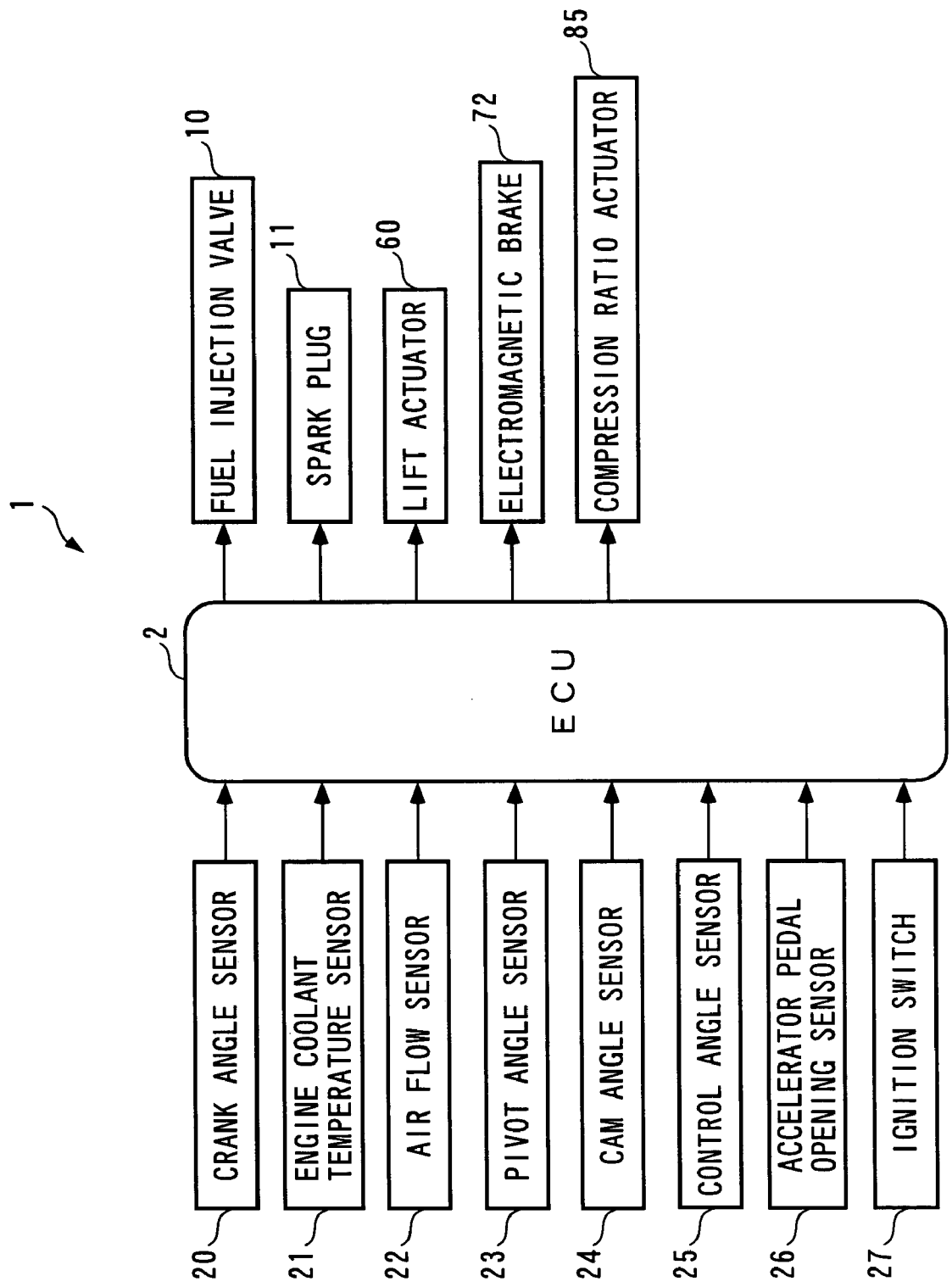

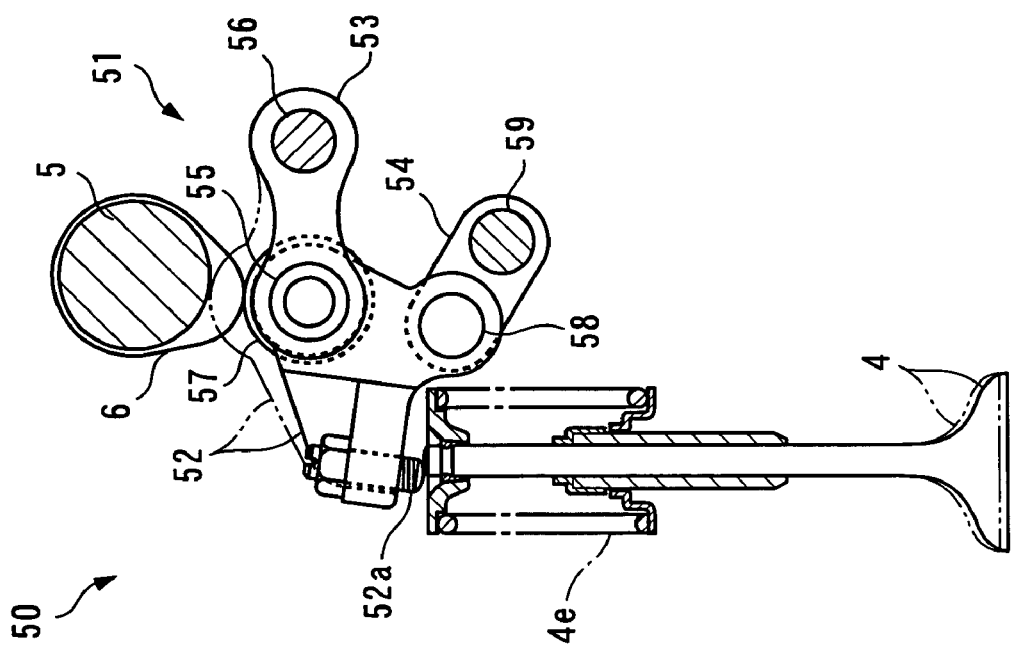
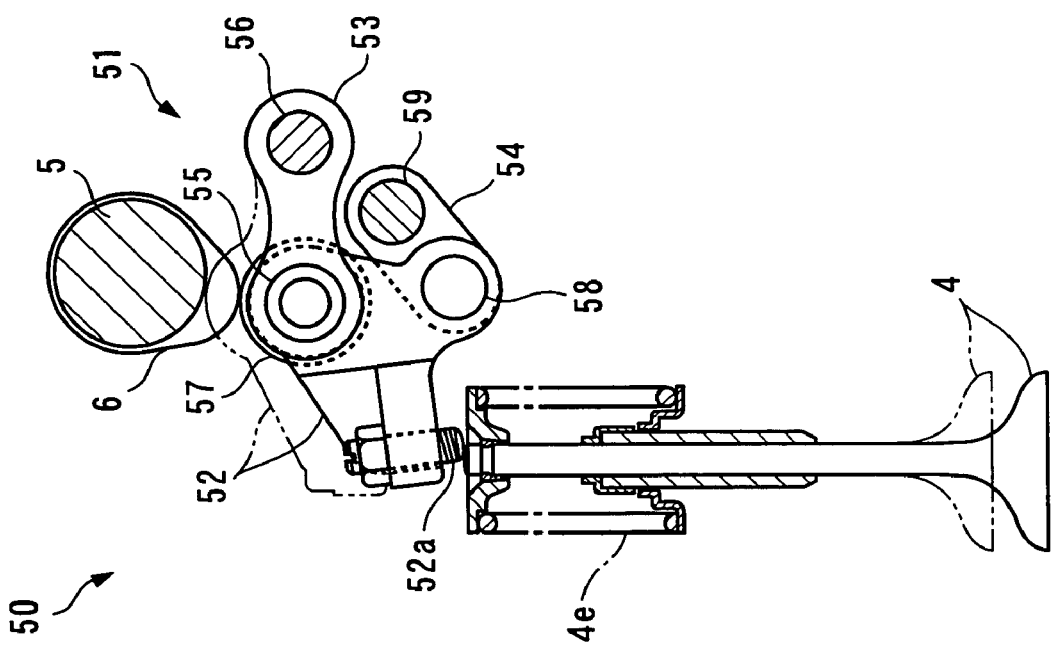

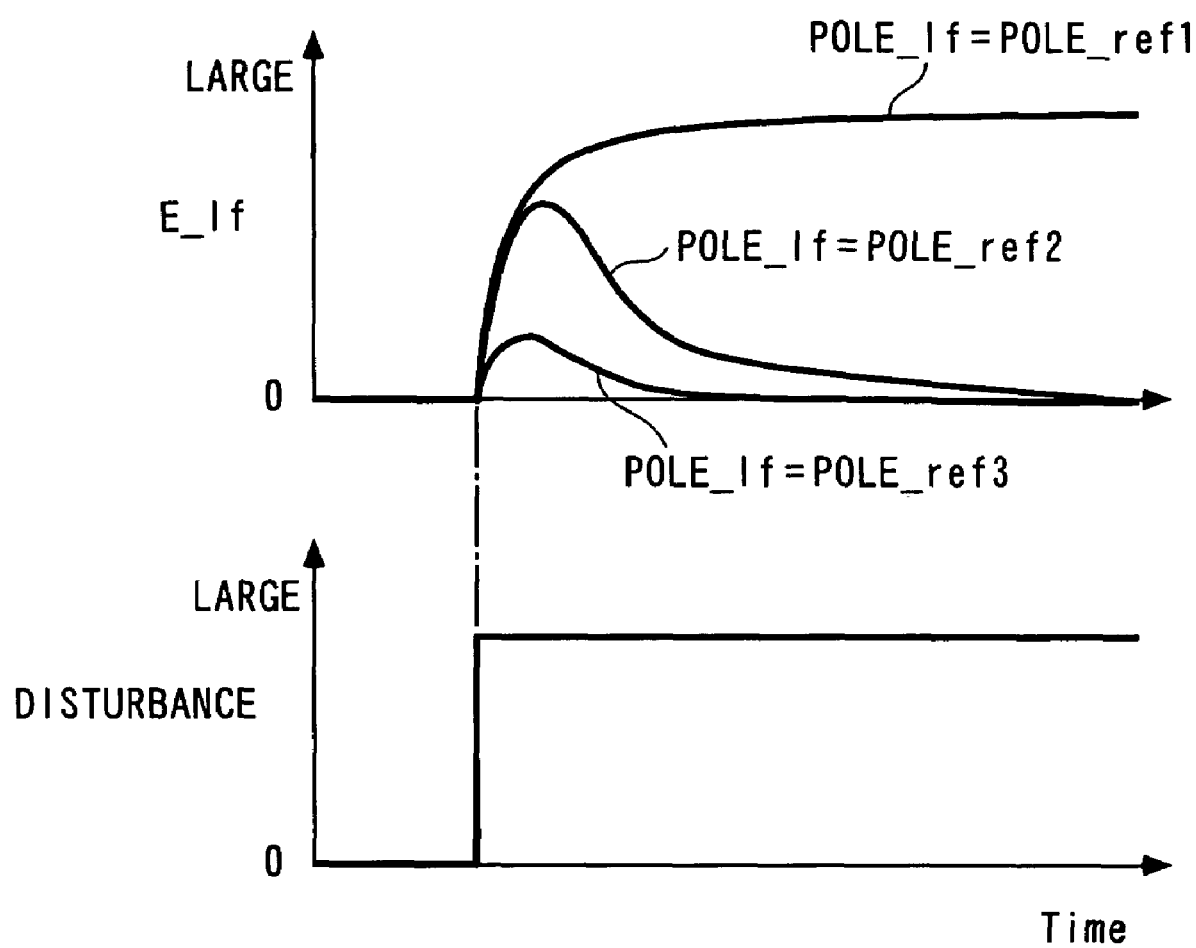
F I G. 1 6

F I G. 2 1
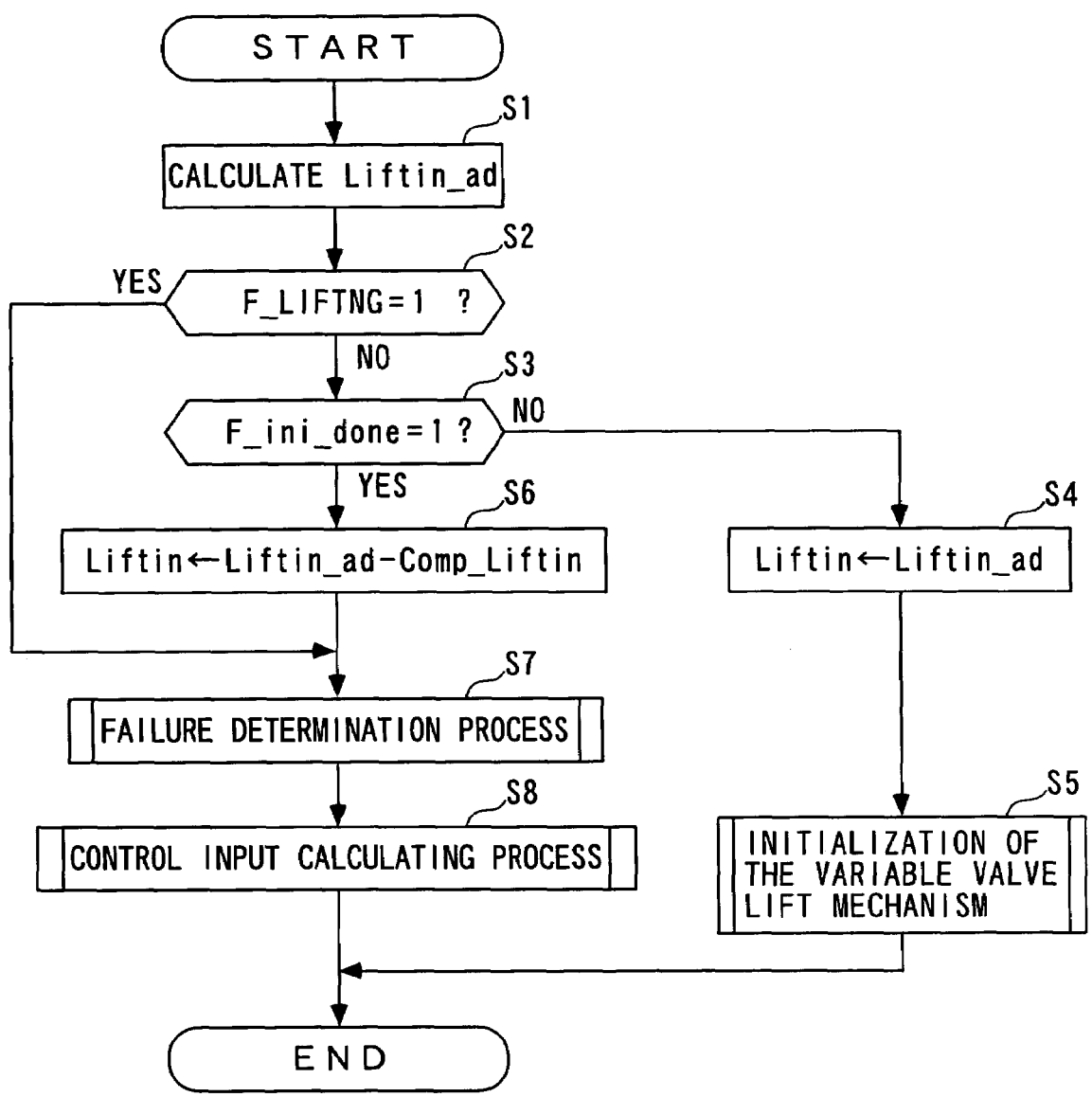

F I G. 3 2
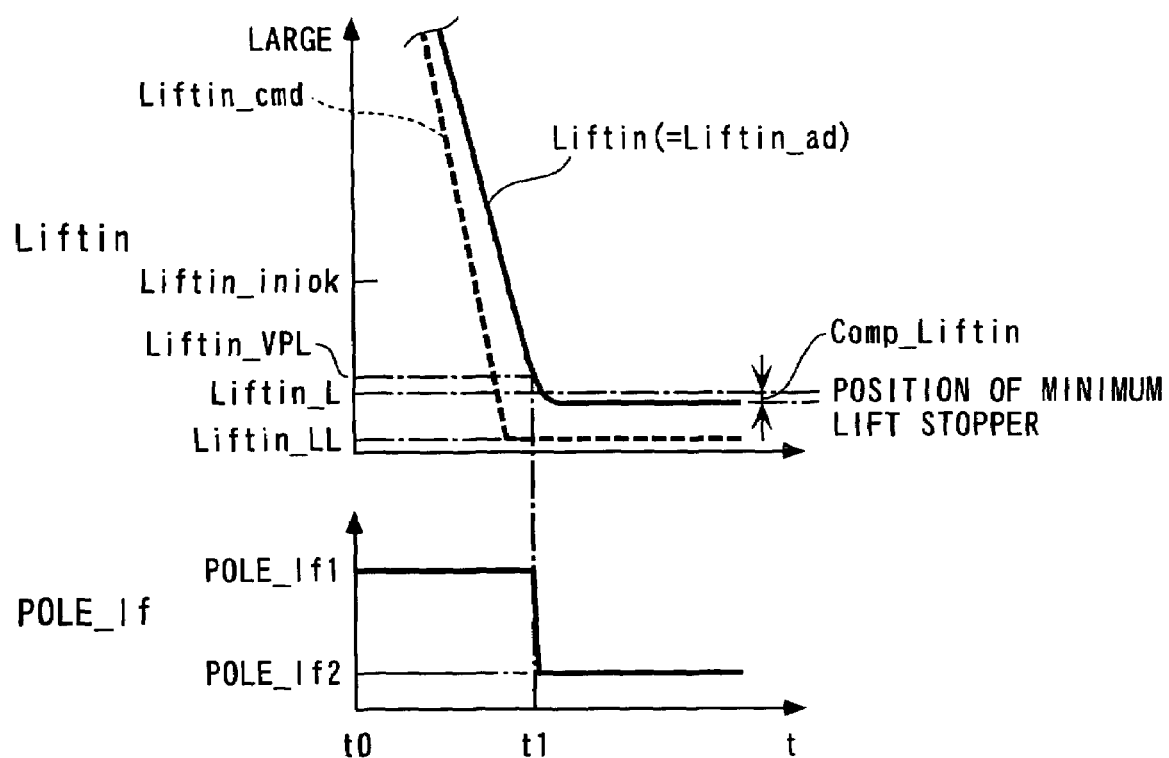

CONTROL SYSTEM

BACKGROUND OF THE INVENTION

1. Field of the Invention

The present invention relates to a control system for controlling a control amount via a movable mechanism that can vary the control amount within a predetermined control range.

2. Description of the Related Art

Conventionally, there has been proposed a control system for controlling the lift of an intake valve (hereinafter referred to as "the valve lift") of an internal combustion engine in Japanese Laid-Open Patent Publication (Kokai) No. 2003-254100. The engine has a variable valve lift mechanism provided for each cylinder. The variable valve lift mechanism continuously varies the valve lift between a predetermined maximum value and a predetermined minimum value, and includes a drive shaft connected to a crankshaft and a control shaft parallel to the drive shaft. On the drive shaft, there are provided a swinging cam and an link arm which are connected to a rocker arm on the control shaft.

The control shaft is rotatably supported by a bearing, and has a pin radially outwardly extending from the peripheral surface thereof at a location close to the bearing. The bearing is formed with a protrusion, and when the control shaft rotates in a predetermined direction, it is brought into contact with the protrusion whereby the rotation of the control shaft is stopped. Further, the control shaft is provided with a rotation drive mechanism that drives the control shaft for rotation, and the rotation drive mechanism includes an electric motor and a gear mechanism. When the rotation drive mechanism drives the control shaft for rotation, the relative angular positional relationship between the swinging cam and the link arm, and the rocker arm, whereby the valve lift is changed. In particular, when the pin of the control shaft is held in contact with the protrusion of the bearing, the valve lift is held at the predetermined minimum value.

The control system includes various sensors, a controller to which are connected these sensors and the electric motor, and so forth. The controller determines an operating region of the engine based on detection signals from the sensors, and controls the valve lift via the variable valve lift mechanism according to the operating region, whereby the amount of intake air supplied to the engine is controlled. Moreover, when the controller determines that the engine is in a low-load operating region, such as idling, the controller causes the control shaft to be rotated until the pin is brought into contact with the protrusion, whereby the valve lift of each cylinder is controlled to the predetermined minimum value.

According to the above conventional control system, during the control of the valve lift, when it is determined that the engine is in a low-load operating region, the control shaft is driven for rotation until the pin of the control shaft is shifted to a position where it is in contact with the protrusion of the bearing, so that when the rational speed of the control shaft is high, the pin and the protrusion may be deformed due to an impact applied thereto when the pin is brought into contact with the protrusion. To avoid this problem, there can be envisaged e.g. a method of reducing the rotational speed of the control shaft so as to reduce the impact, and a method of providing shock absorbers for the pin and the protrusion. When the rotational speed of the control shaft is reduced, however, it takes a longer time to drive the pin to the position of abutment with the protrusion, i.e. to control the valve lift to the minimum value, and hence it takes a longer time to control the intake air amount to the proper value. As a result, the controllability of the intake air amount is lowered, so that when the engine is in a low-load operating region, e.g. during idling, the engine speed can be made unstable. On the other hand, when the shock absorbers are provided for the pin and the protrusion, the manufacturing costs are increased due to the provision of these additional members, and since space for the shock absorbers has to be secured, this degrades the degree of freedom in design of the engine.

SUMMARY OF THE INVENTION

The present invention has been made to provide a solution to the above-described problems, and an object thereof is to provide a control system which controls a control amount via a movable mechanism, such that it is possible to reduce impact occurring when a movable part of the movable mechanism is driven to a limit of the movable range, and time required for the driving, in a compatible manner.

To attain the above object, in a first aspect of the present invention, there is provided a control system comprising:

a movable mechanism that has a restricting part, and a movable part that is brought into contact with the restricting part to be thereby limited in a movable range, the movable mechanism being operable to vary a control amount within a predetermined control range, by driving the movable part within the movable range;

position detecting means for detecting a position of the movable part;

control amount-calculating means for calculating the control amount according to the detected position of the movable part;

target control amount-setting means for setting a target control amount as a target to which the control amount is to be controlled; and control input-calculating means for calculating a control input for controlling the movable mechanism with a predetermined control algorithm such that the control amount follows up the target control amount, wherein the predetermined control algorithm includes a disturbance suppressing parameter for suppressing influence of disturbance applied to the movable mechanism, and wherein the control input-calculating means has disturbance suppressing parameter-setting means for setting the disturbance suppressing parameter such that a degree of suppression of the influence of disturbance by the disturbance suppressing parameter becomes smaller, when one of the control amount and the target control amount is toward a limit value of the predetermined control range with respect to a predetermined value close to the limit value, or when the detected position of the movable part is toward a limit of the movable range with respect to a predetermined position close to the limit, than otherwise.

With the configuration of this control system, a control input for controlling the movable mechanism is calculated with a predetermine control algorithm such that a control amount follows up a target control amount. The predetermined control algorithm includes a disturbance suppressing parameter for suppressing influence of disturbance applied to the movable mechanism, and the disturbance suppressing parameter is set such that a degree of suppression of influence of the disturbance by the disturbance suppressing parameter becomes smaller, when one of the control amount and the target control amount is toward a limit value of a predetermined control range with respect to a predetermined value close to the limit value, or when the detected position of the movable part is toward a limit of the movable range with respect to a predetermined position close to the limit, than otherwise. As in the case of this control system where the control input for controlling the movable mechanism is calculated with the predetermined control algorithm such that the control amount follows up the target control amount, when the predetermined control algorithm includes the disturbance suppressing parameter for suppressing influence of disturbance applied to the movable mechanism, if the disturbance suppressing parameter is set such that the degree of suppression of influence of the disturbance is increased, the control input is calculated as a value which while more effectively suppressing the influence of the disturbance, causes the driving force applied to the movable part to be increased so as to secure the follow-up property of the control amount to the target control amount, i.e. the convergence of the difference between the control amount and the target control amount to a value of 0. Inversely, if the disturbance suppressing parameter is set such that the degree of suppression of the disturbance is reduced, the control amount is calculated as a value which makes smaller the driving force applied to the movable part for converging the difference between the control amount and the target control amount to a value of 0.

For the reason described above, according to this control system, when the movable part is driven toward the limit of the movable range, in other words, the control amount is controlled toward the limit value of the predetermined control range, after the movable part goes beyond a predetermined position close to the limit of the movable range, the movable part is driven toward the limit in a state in which the degree of increase in the driving force acting on the movable part at the time of occurrence of the difference between the control amount and the target control amount is smaller than a value assumed before the predetermined position is passed. That is, immediately before the movable part is brought into contact with the restricting part, even if the difference between the control amount and the target control amount occurs, a larger driving force for causing the difference to converge to a value of 0 is prevented from suddenly acting on the movable part, which makes it possible to reduce the impact generated when the movable part is brought into contact with restricting part, whereby deformation of the movable part and the restricting part can be avoided and the life of the movable mechanism can be prolonged. Moreover, since the impact can be reduced without reducing the driving speed of the movable part, it is possible to avoid an increase in the driving time. As described above, it is possible to reduce the impact and the driving time, in a compatible manner. What is more, since it is not necessary to carry out modification of the design of the structure, such as provision of a shock-absorbing member, it is possible to reduce the manufacturing cost, and enhance the degree of freedom in design. Further, also when the control amount is controlled toward the limit across the predetermined value close to the limit value or when the target control amount is set toward the limit value with respect to the predetermined value, similarly to the case where the movable part goes beyond the predetermined position close to the limit of the movable range, the movable part is driven toward the limit of the movable range by a smaller driving force, which makes it possible to provide the same advantageous effects as described above.

Preferably, the predetermined control algorithm includes a predetermined response-specifying control algorithm, and the disturbance suppressing parameter is a response-specifying parameter that specifies a speed of convergence of a difference between the control amount and the target control amount and a behavior of the convergence.

In general, in the response-specifying control algorithm, by varying the response-specifying parameter that specifies the speed of convergence of the difference between the control amount and the target control amount and the convergence behavior, the degree of influence of disturbance applied to the movable mechanism can be changed. In contrast, according to this control system, the control input is calculated by the control algorithm including the predetermined response-specifying control algorithm, and the disturbance suppressing parameter is a response-specifying parameter in the predetermined response-specifying control algorithm, and hence, the disturbance suppressing capability can be promptly changed only by changing the value of the response-specifying parameter without spoiling the stability of the system of control. As a result, it is possible to improve controllability.

Preferably, the predetermined control algorithm includes a predetermined two-degree-of-freedom control algorithm.

With the configuration of this preferred embodiment, the control input is calculated by a control algorithm including a predetermined two-degree-of-freedom control algorithm, and hence if a target filer type two-degree-of-freedom control algorithm is used as the two-degree-of-freedom control algorithm, the speed of follow-up of the control amount to the target control amount can be properly set with the target value filer algorithm, and the behavior of the follow-up of the control amount to the target control amount can be properly set with the feedback control algorithm, whereby the control amount can be accurately caused to follow up the target control amount while avoiding occurrence of overshooting. As a result, when the movable part is driven toward the limit of the movable range, it is possible to more positively reduce the impact occurring when the movable part is brought into contact with the restricting part.

Preferably, when the movable part is to be driven to the limit of the movable range, the target control amount-setting means sets the target control amount to a predetermined value outside the predetermined control range.

In general, in controlling the movable part of the movable mechanism to the limit of the movable range, if the target control amount is set to a limit value of the predetermined control range, there is a possibility that the movable part does not reach the limit of the movable range due to variation of individual units of the movable mechanism or aging thereof. However, according to this control system, when the movable part is to be driven to the limit of the movable range, the target control amount is set to a predetermined value outside the predetermined control range, and hence the movable part can be positively driven to the limit of the movable range, thereby positively bringing the same into contact with the restricting part. This makes it possible to intentionally create a state in which the movable part is in contact with the restricting part, and the calibration can be properly carried out, for example, in calibration of the position detecting means requiring such a state.

Preferably, the control system further comprises determination means for determining whether or not the movable part is at the limit of the movable range, based on at least one of the detected position of the movable part and the calculated control amount, and correction value-calculating means for calculating a correction value for correcting the calculated control amount, according to a result of comparison between the control amount calculated when the determination means determines that the movable part is at the limit of the movable range and the limit value.

With this configuration of the control system, it is determined by the determination means according to one of the detected position of the movable part and the calculated control amount whether or not the movable part is at the limit of the movable range, and the correction value-calculating means calculates a correction value for correcting the calculated control amount according to a result of comparison between the control amount calculated when it is determined that the movable part is at the limit of the movable range, and the limit value, and hence thereafter, the control can be carried out using the control amount corrected using the correction value calculated as described above.

That is, the control amount can be corrected while causing the difference between the calculated control amount and the actual value, caused by aging of the movable mechanism and the like, whereby the calibration of the position detecting means can be properly carried out. As a result, it is possible to increase the control accuracy.

Preferably, the movable mechanism is a variable valve lift mechanism that varies, as the control amount, a valve lift as a lift of at least one of a intake valve and an exhaust valve of an internal combustion engine.

According to this control system, when the valve lift is controlled via the variable valve lift mechanism, it is possible to obtain the advantageous effects as described above, whereby the life of the variable valve lift mechanism can be prolonged.

Preferably, the movable mechanism is a variable cam phase mechanism that varies, as the control amount, a cam phase as a phase of at least one of an intake cam and an exhaust cam relative to a crankshaft of an internal combustion engine.

According to this control system, when the cam phase is controlled via the variable cam phase mechanism, it is possible to obtain the advantageous effects as described above, whereby the life of the variable cam phase mechanism can be prolonged.

Preferably, the movable mechanism is a variable compression ratio mechanism that varies, as the control amount, a compression ratio of an internal combustion engine.

According to this control system, when the compression ratio is controlled via the variable compression ratio mechanism, it is possible to obtain the advantageous effects as described above, whereby the life of the variable compression ratio mechanism can be prolonged.

Preferably, the movable mechanism is a throttle mechanism that varies, as the control amount, opening of a throttle valve provided in an intake passage of an internal combustion engine.

According to this control system, when the degree of opening of the throttle valve is controlled via the throttle valve mechanism, it is possible to obtain the advantageous effects as described above, whereby the life of the throttle valve mechanism can be prolonged.

The above and other objects, features, and advantages of the present invention will become more apparent from the following detailed description taken in conjunction with the accompanying drawings.

BRIEF DESCRIPTION OF THE DRAWINGS

FIG. 1 is a diagram schematically showing the arrangement of an internal combustion engine to which is applied a control system according to a first embodiment of the present invention;

FIG. 2 is a schematic block diagram of the control system;

FIG. 6A is a diagram showing an intake valve placed in an open state when a lower link of the variable valve lift mechanism is in a maximum lift position;

FIG. 6B is a diagram showing the intake valve placed in an open state when the lower link of the variable valve lift mechanism is in a minimum lift position;

FIG. 16 is a timing diagram showing changes in a follow-up error E_lf when disturbance is input to the variable valve lift mechanism;

FIG. 21 is a flowchart showing a control process for controlling the movable mechanism;

FIG. 32 is a timing diagram showing, by way of example, control results obtained by executing the initializing process for the variable valve lift mechanism;

DETAILED DESCRIPTION OF PREFERRED EMBODIMENTS

Hereafter, a control system according an embodiment of the present invention will be described with reference to the drawings. The control system 1 includes an ECU 2, as shown in FIG. 2. As described hereinafter, the ECU 2 carries out control processes for performing valve lift control, cam phase control, compression control, and so forth, depending on operating conditions of an internal combustion engine (hereinafter simply referred to as "the engine") 3.

Figure 3:
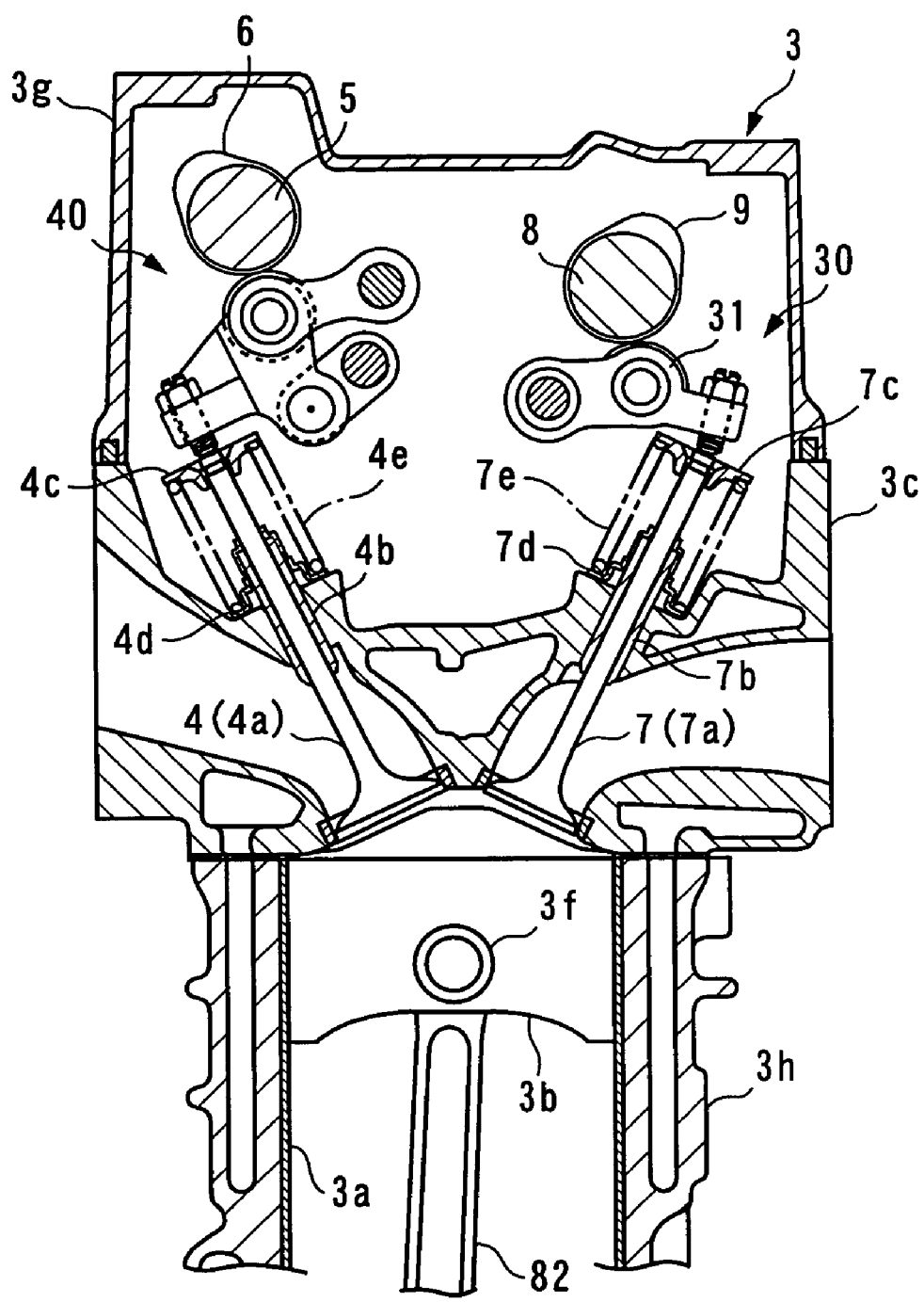
FIG. 3 is a schematic cross-sectional view of a variable intake valve-actuating mechanism and an exhaust valve-actuating mechanism of the engine.

Referring to FIGS. 1 and 3, the engine 3 is an in-line four-cylinder DOHC gasoline engine having four pairs of cylinders 3a and pistons 3b (only one pair of which is shown), and is installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 that actuate the intake valves 4, a variable intake valve-actuating mechanism 40 that actuates the intake valves 4 to open and close the same, an exhaust camshaft 8 and exhaust cams 9 that actuate the exhaust valves 7, an exhaust valve-actuating mechanism 30 that actuates the exhaust valves 7 to open and close the same, a variable compression ratio mechanism 80 that changes a compression ratio, fuel injection valves 10, spark plugs 11 (see FIG. 2), and so forth.

Figure 4:
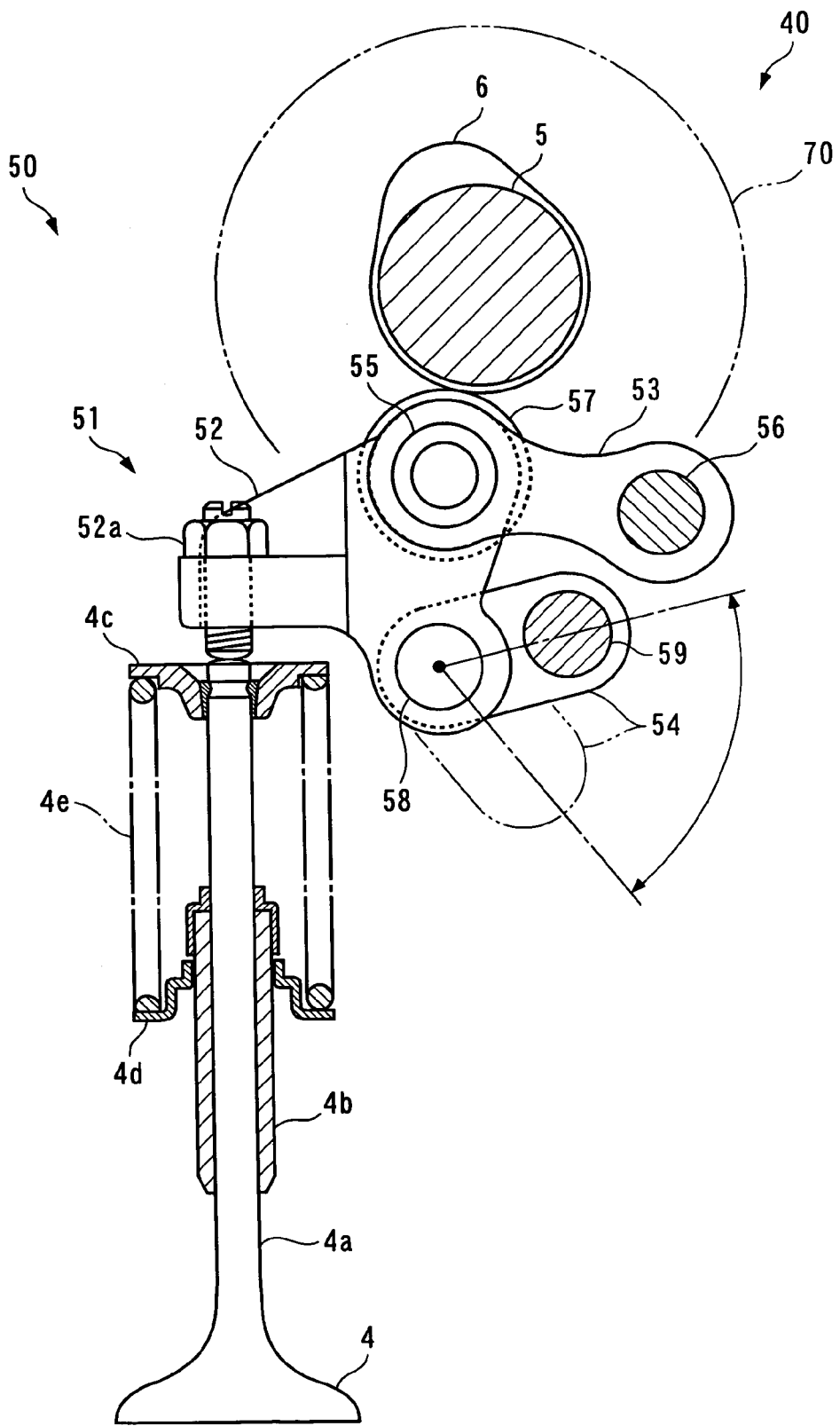
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket 5a coaxially and rotatably fitted on one end thereof (see FIG. 8). The intake sprocket 5a is connected to a crankshaft 3d via a timing belt 5b, and connected to the intake camshaft 5 via a variable cam phase mechanism 70, described hereinafter (see FIG. 8). With the above configuration, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift") represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and a timing belt 5b, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a tilted state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection control is carried out.

The spark plug 11 as well is provided for each cylinder 3a, and mounted through the cylinder head 3c.

The spark plug 11 is electrically connected to the ECU 2, and a state of spark discharge is controlled by the ECU 2 such that a mixture in the combustion chamber is burned in timing corresponding to ignition timing, whereby ignition timing control is executed.

On the other hand, the engine 3 is provided with a crank angle sensor 20 and an engine coolant temperature sensor 21. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d. In the present embodiment, the crank angle sensor 20 corresponds to the position detecting means of the present invention.

Each pulse of the CRK signal is generated whenever the crankshaft 3d rotates through a predetermined angle (e.g. 10 degrees). The ECU 2 determines the rotational speed NE of the engine 3 (hereinafter referred to as "the engine speed NE") based on the CRK signal. Further, the TDC signal indicates that each piston 3b in the associated cylinder 3a is in a predetermined crank angle position slightly before the TDC position at the start of the intake stroke, and each pulse of the TDC signal is generated whenever the crankshaft 3d rotates through a predetermined crank angle.

The engine coolant temperature sensor 12 is implemented e.g. by a thermistor, and detects an engine coolant temperature TW to deliver a signal indicative of the sensed engine coolant temperature TW to the ECU 2. The engine coolant temperature TW represents the temperature of an engine coolant circulating through a cylinder block 3h of the engine 3.

Furthermore, the engine 3 has an intake pipe 12 from which a throttle valve mechanism is omitted, and an intake passage 12a of which is formed to have a large diameter, whereby the engine 3 is configured such that flow resistance is smaller than in an ordinary engine. The intake pipe 12 is provided with an air flow sensor 22. The air flow sensor 22 is formed by a hot-wire air flow meter, and detects the flow rate Gin of air flowing through the intake passage 12a to deliver a signal indicative of the sensed air flow rate Gin to the ECU 2.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70. In the present embodiment, the variable valve lift mechanism 50 and the variable cam phase mechanism 70 correspond to the movable mechanism of the present invention.

The variable valve lift mechanism 50 is provided for actuating the intake valves 4 to open and close the same, in accordance with rotation of the intake camshaft 5, and continuously changing the valve lift Liftin between a predetermined maximum value Liftin_H and a predetermined minimum value Liftin_L. The variable valve lift mechanism 50 is comprised of rocker arm mechanisms 51 of a four joint link type, provided for the respective cylinders 3a, and a lift actuator 60 (see FIGS. 5A and 5B) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, referred to hereinafter, of the lift actuator 60 by the connection shaft 59.

Figure 5A:
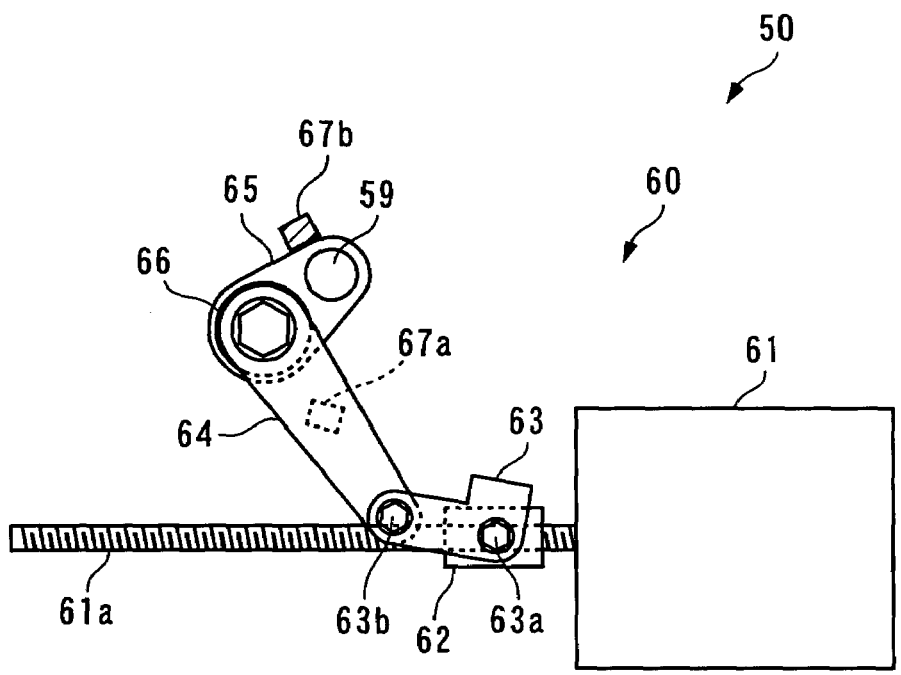
FIG. 5A is a diagram showing a lift actuator in a state in which a short arm thereof is in contact with a maximum lift stopper.
Figure 5B:
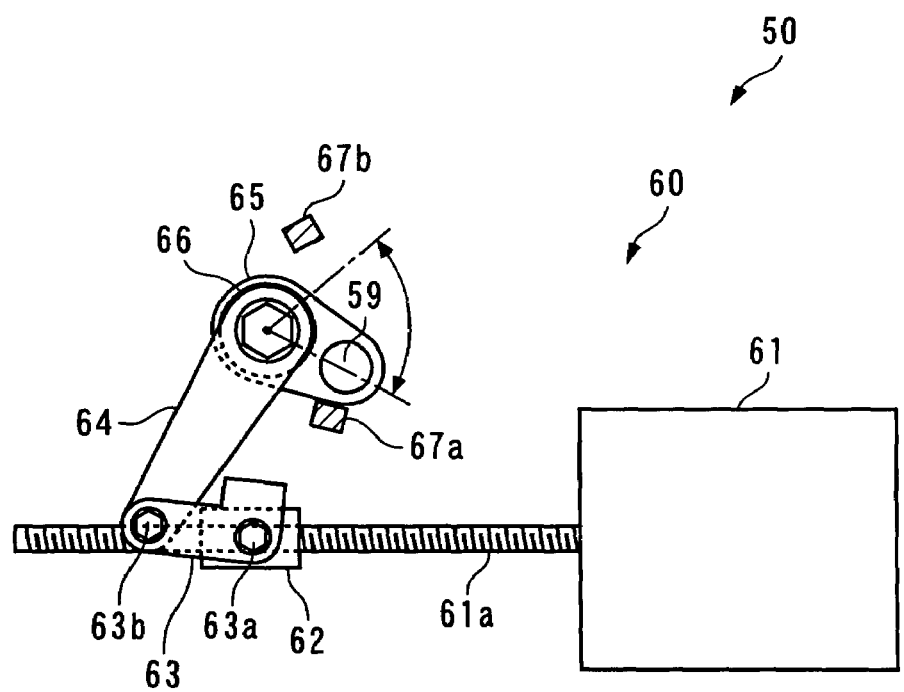
FIG. 5B is a diagram showing the lift actuator in a state in which the short arm thereof is in contact with a minimum lift stopper.

On the other hand, as shown in FIGS. 5A and 5B, the lift actuator 60 is controlled by the ECU 2 and is comprised of a motor 61, a nut 62, a link 63, a long arm 64, and the short arm 65. The motor 61 is connected to the ECU 2, and disposed outside a head cover 3g of the engine 3. The rotating shaft of the motor 61 is a screw shaft 61a formed with a male screw and the nut 62 is screwed onto the screw shaft 61a. The nut 62 is connected to the long arm 64 by the link 63. The link 63 has one end thereof pivotally mounted to the nut 62 by a pin 63a, and the other end thereof pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 pivotally extends through the other end of the short arm 65, whereby the short arm 65 is connected to the lower link 54 by the connection shaft 59. Further, in the vicinity of the short arm 65, there are provided a minimum lift stopper 67a and a maximum lift stopper 67b, in a manner spaced from each other, and these stoppers 67a and 67b limit the movable range of the short arm 65, as will be described hereinafter. In the present embodiment, the short arm 65 corresponds to the movable part of the present invention, and the minimum lift shopper 67a and the maximum lift stopper 67b correspond to the restricting part of the present invention.

Next, a description will be given of the operation of the variable valve lift mechanism 50 constructed as above. In the variable valve lift mechanism 50, when a lift control input Uliftin, referred to hereinafter, is inputted from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

As shown in FIG. 5A, when the short arm 65 rotates counterclockwise as viewed in FIG. 5A, the short arm 65 is brought into contact with the maximum lift stopper 67b, and fixedly engaged therewith. This causes the lower link 54 as well to be held at a maximum lift position indicated by solid lines in FIG. 4. In contrast, as shown in FIG. 5B, when the short arm 65 rotates clockwise as viewed in FIG. 5B, the short arm 65 is brought into contact with the minimum lift stopper 67a, and fixedly engaged therewith. This causes the lower link 45 as well to be held at a minimum lift position indicated by two-dot chain lines in FIG. 4.

As described above, the range of pivotal motion of the short arm 65 is limited between a maximum lift position shown in FIG. 5A and a minimum lift position shown in FIG. 5B by the two stoppers 67a and 67b, whereby the range of pivotal motion of the lower link 54 is also restricted between the maximum lift position indicated by the solid lines in FIG. 4 and the minimum lift position indicated by the two-dot chain lines in FIG. 4.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6B, when the intake cam 6 rotates, the amount of movement of the adjusting bolt 52a becomes smaller than the amount of movement of the contact point where the intake cam 6 and the roller 57 are in contact with each other.

Figure 7:
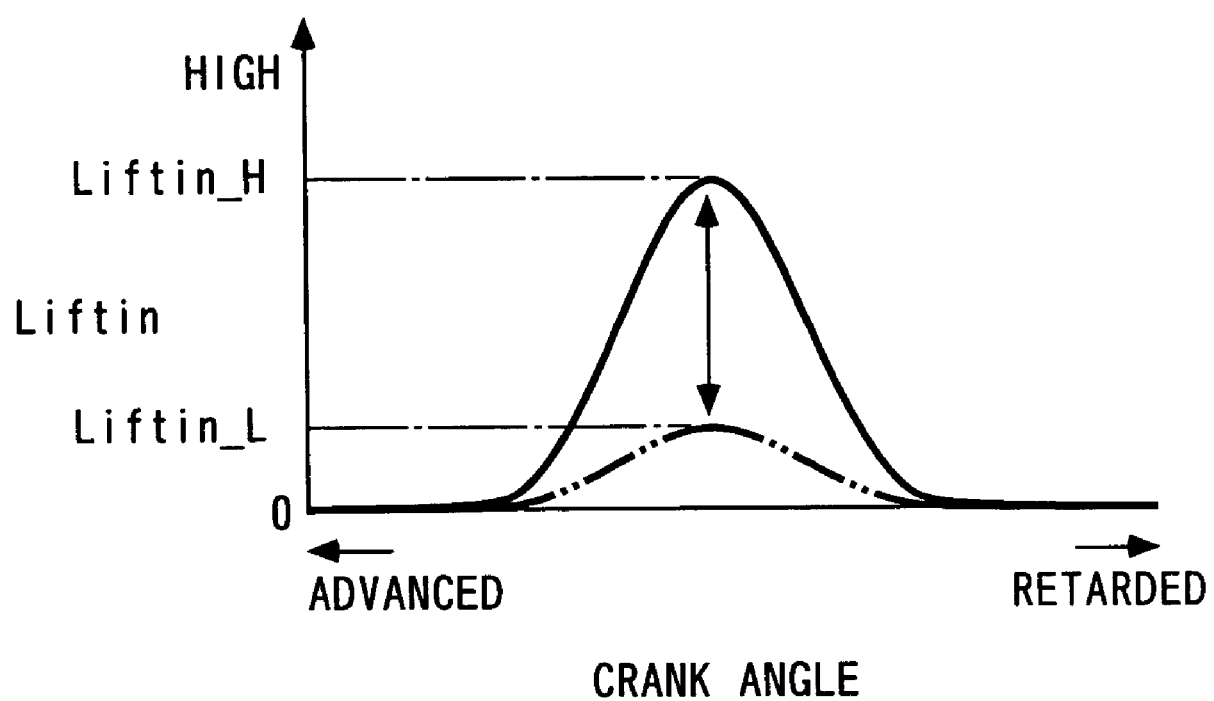
FIG. 7 is a diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftin_H. On the other hand, when the lower link 54 is in the minimum lift position, the intake valve 4 is opened according to a valve lift curve indicated by a two-dot chain line in FIG. 7, and the valve lift Liftin assumes its minimum value Liftin_L.

As described above, in the variable valve lift mechanism 50, the lower link 54 is pivotally moved by the lift actuator 60 between the maximum lift position and the minimum lift position, whereby it is possible to continuously change the valve lift Liftin between the maximum value Liftin_H and the minimum value Liftin_L. In the present embodiment, the maximum value Liftin_H and the minimum value Liftin_L correspond to the limit values of the control range.

It should be noted that the variable valve lift mechanism 50 is provided with a lock mechanism, not shown, which locks operation of the variable valve lift mechanism 50 when the lift control input Uliftin is set to a failure time value Uliftin_fs, referred to hereinafter, and when the lift control input Uliftin is not inputted from the ECU 2 to the lift actuator 60 e.g. due to a disconnection. More specifically, the variable valve lift mechanism 50 is inhibited from changing the valve lift Liftin, whereby the valve lift Liftin is held at the minimum value Liftin_L. It should be noted that when a cam phase Cain is held at a, most retarded value Cain_L, referred to hereinafter, and at the same time when a compression ratio Cr is held at a minimum value Cr_L, the minimum value Liftin_L is set to a value which is capable of ensuring a predetermined failure time value of the intake air amount. The predetermined failure time value is set to an intake air amount value which is capable of suitably carrying out idling or starting of the engine 3 during stoppage of the vehicle, and at the same time holding the vehicle in a low-speed traveling condition during traveling of the vehicle.

The engine 3 is provided with a pivot angle sensor 23 (see FIG. 2). The pivot angle sensor 23 detects a pivot angle θ lift of the short arm 65, and delivers a signal indicative of the sensed pivot angle to the ECU 2. The pivotal angle θ lift represents a position of the short arm between the maximum valve lift and the minimum valve lift. The ECU 2 calculates the valve lift Liftin based on the pivot angle θ lift. In the present embodiment, the pivot angle sensor 23 corresponds to the position detecting means.

Figure 8:
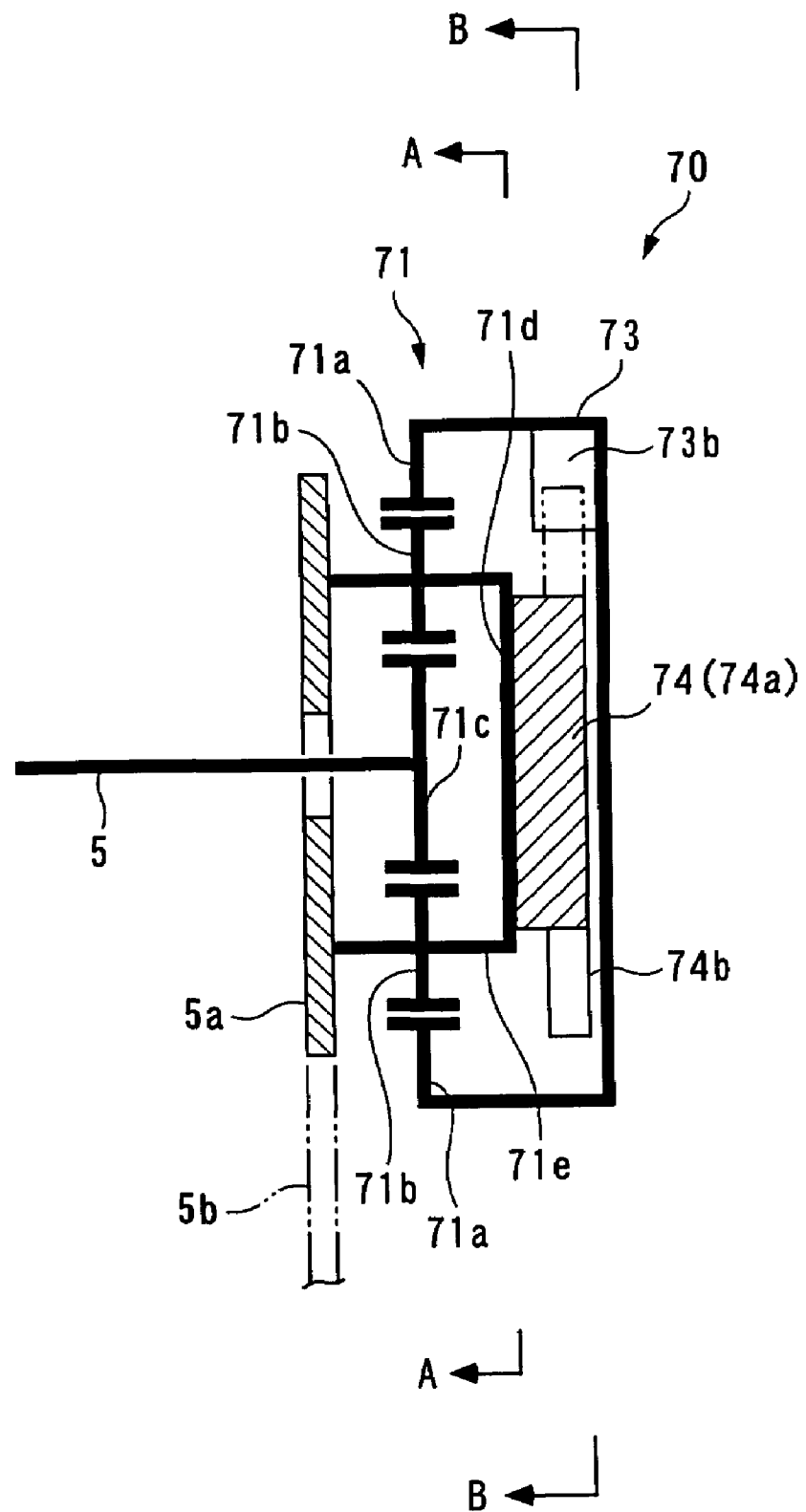
FIG. 8 is a schematic diagram of a variable cam phase mechanism.
Figure 9:
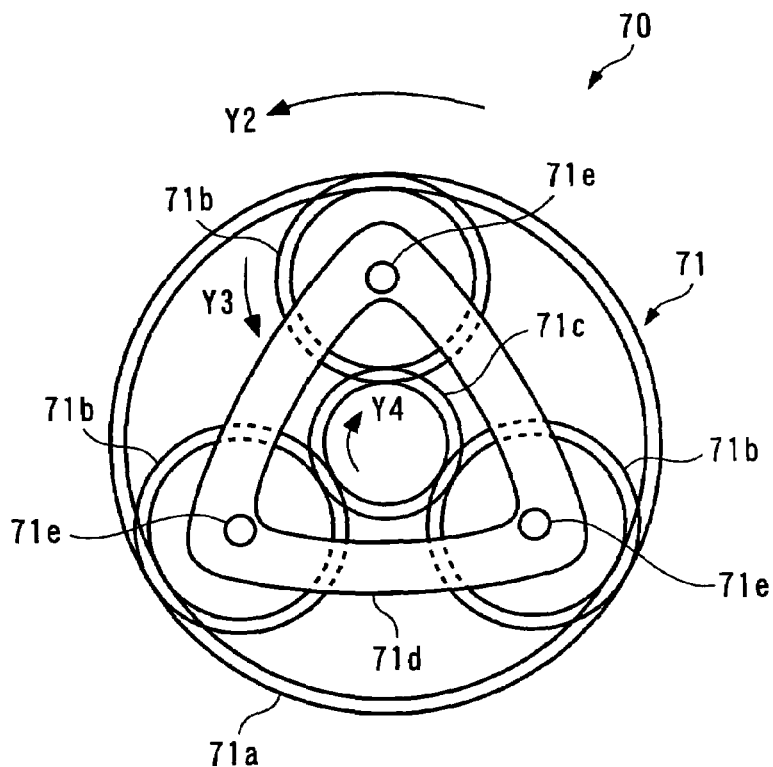
FIG. 9 is a schematic diagram of a planetary gear unit taken on line A-A of FIG. 8.
Figure 10:
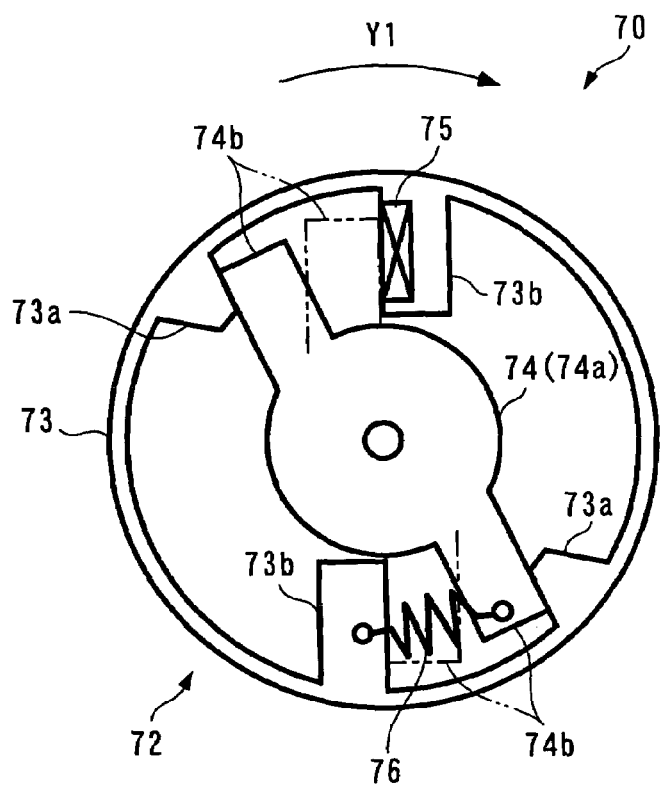
FIG. 10 is a schematic diagram of an electromagnet brake taken on line B-B of FIG. 8.

Next, a description will be given of the aforementioned variable cam phase mechanism 70. The variable cam phase mechanism 70 is of an electromagnetic type, as described hereinbelow, which steplessly changes the cam phase Cain by an electromagnetic force. As shown in FIGS. 8 to 10, the variable cam phase mechanism 70 includes a planetary gear unit 71 and an electromagnetic brake 72.

The planetary gear unit 71 transmits rotation between the intake camshaft 51 and the sprocket 5a, and is comprised of a ring gear 71a, three planetary pinion gears 71b, a sun gear 71c, and a planetary carrier 71d. The ring gear 71a is connected to an outer casing 73, referred to hereinafter, of the electromagnetic brake 72, and rotated coaxially in unison with the outer casing 73. Further, the sun gear 71c is coaxially attached to a foremost end of the intake camshaft 5 for rotation in unison therewith.

On the other hand, the planetary carrier 71d has a generally triangular shape, and includes shafts 71e protruding from the three corners thereof. The planetary carrier 71d is connected to the sprocket 5a via these shafts 71e, such that it rotates coaxially in unison with the sprocket 5a.

Further, each planetary pinion gear 71b is rotatably supported on an associated one of the shafts 71e of the planetary carrier 71d, and is disposed between the sung gear 71c and the ring gear 71a, in constant mesh with these gears.

Further, the electromagnetic brake 72, referred to hereinbefore, is driven by the ECU 2, and is comprised of an outer casing 73, a core 74, an electromagnet 75, and a return spring 76. The outer casing 73 is formed to be hollow, and the core 74 is disposed therein in a manner rotatable relative to the outer casing 73. The core 74 is comprised of a root portion 74a circular in cross-section, and two arms 74b and 74b extending radially from the root portion 74a. The core 74 has its root portion 74a mounted on the planetary carrier 71d for coaxial rotation in unison with the planetary carrier 71d.

On the other hand, on the inner peripheral surface of the outer casing 73, there are provided two pairs of stoppers 73a and 73b, at spaced intervals, each pair formed by a most retarded position stopper 73a and a most advanced position stopper 73b. The arms 74b of the core 74 are disposed between the respective pairs of stoppers 73a and 73b, whereby the core 74 is rotatable relative to the outer casing 73 between the most retarded position (indicated by solid lines in FIG. 10) in which the arms 74b are brought into contact with the most retarded position stoppers 73a and stopped thereat, and the most advanced position (indicated by two-dot chain lines in FIG. 10) in which the arms 74b are brought into contact with the most advanced position stoppers 73b and stopped thereat. In the present embodiment, the arm 74b corresponds to the movable part, and the most retarded and most advanced position stoppers 73a and 73b correspond to the restricting part.

Further, the return spring 76 is interposed in a compressed state between one of the most advanced position stoppers 73b and the opposed one of the arms 74b, and the urging force Fspr of the return spring 76 urges the arms 74b toward the most retarded position stoppers 73a.

On the other hand, the electromagnet 75 is attached to one of the most advanced position stoppers 73b on a side opposite to the return spring 76, such that it is flush with an end of the most advanced position stopper 73b opposed to the arm 74b. The electromagnet 75 is electrically connected to the ECU 2, and when energized by a phase control input Ucain (voltage signal) from the ECU 2, the electromagnetic force Fsol attracts the opposed one of the arms 74b against the urging force Fspr of the return spring 76 to pivotally move the same toward the most advanced position stopper 73b.

A description will be given of the operation of the variable cam phase mechanism 70 constructed as described above. In the variable cam phase mechanism 70, when the electromagnet 75 of the electromagnetic brake 72 is not energized, the core 74 is held by the urging force Fspr of the return spring 76 at the most retarded position in which the arm 74b abuts the most retarded position stopper 73a, whereby the cam phase Cain is held at the most retarded value Cainrt (see FIG. 11).

In this state, as the sprocket 5a rotates in a direction indicated by an arrow Y1 in FIG. 10 along with rotation of the crankshaft 3d of the engine in operation, the planetary carrier 71d and the ring gear 71a rotate in unison therewith, whereby the planetary pinion gears 71b are inhibited from rotation but the sun gear 71c rotates in unison with the planetary carrier 71d and the ring gear 71a. That is, the sprocket 5a and the intake camshaft 5 rotate in unison with each in the direction indicated by the arrow Y1.

Further, in a state in which the core 74 is held at the most retarded position, if the electromagnet 75 is energized by the control input Ucain from the ECU 2, the electromagnetic force Fsol of the electromagnet 75 attracts the arm 74b of the core 74 toward the most advanced position stopper 73b, i.e. toward the most advanced position, against the urging force Fspr of the return spring 76, to be rotated to a position where the electromagnetic force Fsol and the urging force Fspr are balanced with each other. In other words, the outer casing 73 rotates relative to the core 74 in a direction opposite to the direction indicated by the arrow Y1.

This causes the ring gear 71a to rotate relative to the planetary carrier 71d in a direction indicated by an arrow Y2 in FIG. 9, and along therewith, the planetary pinion gears 71b rotate in a direction indicated by an arrow Y3 in FIG. 9, whereby the sun gear 71c rotates in a direction indicated by an arrow Y4 in FIG. 9. As a result, the intake camshaft 5 rotates relative to the sprocket 5a in the direction of the rotation of the sprocket 5a (i.e. a direction opposite to the direction indicated by the arrow Y2 in FIG. 9), whereby the cam phase Cain is advanced.

In this case, the pivotal motion of the outer casing 73 is transmitted to the intake camshaft 5 via the ring gear 71a, the planetary pinion gears 71b, and the sun gear 71c, and therefore the speed-increasing action of the planetary gear unit 70 causes the intake camshaft 5 to rotate relative to the sprocket 5a by an amplified or increased amount of angle of rotation of the outer casing 73. That is, the amount of advance of the cam phase Cain of the intake cam 5 is configured to be equal to an amplified value of angle of rotation of the outer casing 73. This is because the electromagnetic force Fsol of the electromagnet 75 has a limit beyond which it is not effective, and hence it is necessary to cause the cam phase Cain to vary through a wider range by compensating for the limit.

As described above, in the variable cam phase mechanism 70, the electromagnetic force Fsol acts in the direction of advancing the cam phase Cain, and the urging force Fspr of the return spring 76 acts in the direction of retarding the cam phase Cain. Further, when the electromagnetic force Fsol does not vary, the cam phase Cain is held at a value in which the electromagnetic force Fsol and the urging force Fspr are balanced. Further, the movable range of the core 74 is set by the two stoppers 73a and 73b to a range defined by the most retarded position shown by solid lines in FIG. 10 and the most advanced position shown by two-dot chain lines in FIG. 10, whereby the control range of the cam phase Cain is also limited to a range between the most retarded value Cain_L and the most advanced value Cain_H. In the present embodiment, the most retarded value Cain_L and the most advanced value Cain_H correspond to the limit value of the control range.

Figure 11:
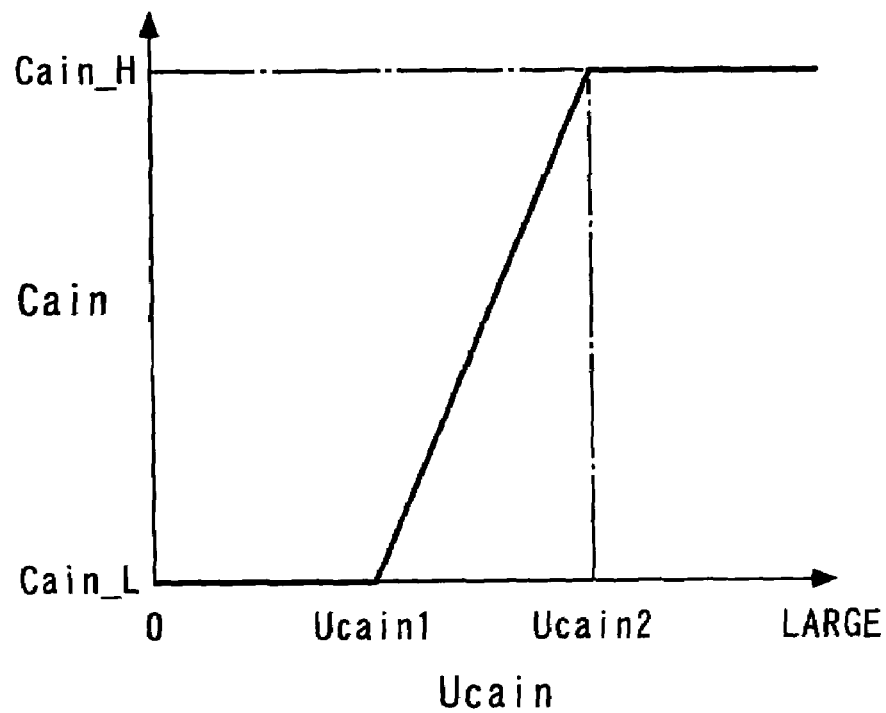
FIG. 11 is a characteristic curve indicative of an operating characteristic of a variable cam phase mechanism.
Figure 12:
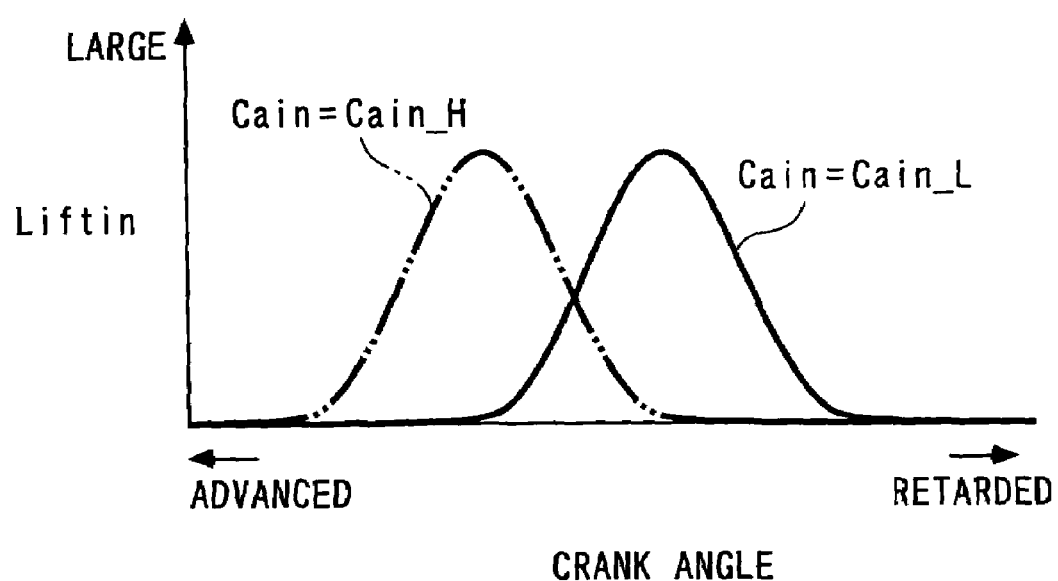
FIG. 12 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

Next, a description will be given of the operating characteristics of the variable cam phase mechanism 70. As shown in FIG. 11, in the variable cam phase mechanism 70, the cam phase Cain is held at the most retarded value Cain_L when the phase control input Ucain to the electromagnet 75 is smaller than a predetermined value Ucain1, and held at the most advanced value Cain_H when the same is larger than a predetermined value Ucain2. Further, when the phase control input is within a range of Ucain1≦Ucain≦Ucain2, the cam phase Cain is continuously varied by the control input Ucain between the most retarded value Cain_L (e.g. a cam angle of 0°) and the most advanced value Cain_H (e.g. a cam angle of 55°), whereby the valve timing of the intake valve 4 is steplessly varied between the most retarded timing indicated by a solid line in FIG. 12 and the most advanced timing indicated by a two-dot chain line in FIG. 12. Although not shown, the variable cam phase mechanism 70 has a characteristic that the cam phase Cain assumes somewhat different values between when the control input Ucain is increasing, and when the control input Ucain is decreasing, i.e. a hysteresis characteristic.

Further, in the variable cam phase mechanism 70, when the phase control input Ucain is set to a failure time value Ucain_fs, referred to hereinafter, and when the phase control input Ucain is not inputted to the electromagnet 75 due to a disconnection, the cam phase Cain is held at the most retarded value Cain_L. As described hereinabove, the most retarded value Cain_L which is capable of ensuring the predetermined failure time value of the intake air amount when the valve lift Liftin is held at the minimum value Liftin_L, and at the same time when the compression ratio Cr is held at the minimum value Cr_L, as described above.

As described above, in the variable intake valve-actuating mechanism 40 used in the present embodiment, the valve lift Liftin is continuously changed by the variable valve lift mechanism 50 between the maximum value Liftin_H and the minimum value Liftin_L, and the cam phase Cain is continuously changed by the variable cam phase mechanism 70 between the most retarded value Cain_L and the most advanced value Cain_H, described hereinabove.

On the other hand, a cam angle sensor 24 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal described above. In the present embodiment, the cam angle sensor 24 corresponds to the position detecting means.

Next the aforementioned variable compression ratio mechanism 80 will be described with reference to FIGS. 13A and 13B. The variable compression ratio mechanism 80 is provided for changing the top dead center position of each piston 3b, that is, the stroke of the piston 3b, to thereby continuously change the compression ratio Cr between a predetermined maximum value Cr_H and a predetermined minimum value Cr_L, and comprised of a composite link mechanism 81 connected between the piston 3b and the crankshaft 3d of each cylinder 3a, and a compression ratio actuator 85. In the present embodiment, the variable compression ratio mechanism 80 corresponds to the movable mechanism of the present invention.

The composite link mechanism 81 is implemented by an upper link 82, a lower link 83, and a control link 84. The upper link 82 corresponds to a so-called connecting rod, and has an upper end thereof pivotally connected to the piston 3b via a piston pin 3f, and a lower end thereof pivotally connected to an end of the lower link 83 via a pin 83a.

The lower link 83 has a triangular shape. Two ends of the lower link 83 except for the end connected to the upper link 82 are pivotally connected to the crankshaft 3d via a crank pin 83b, and to an end of the control link 84 via a control pin 83c, respectively. With the above configuration, reciprocating motion of the piston 3b is transmitted to the crankshaft 3d via the composite link mechanism 81 such that it is converted into rotating motion of the crankshaft 3d.

Further, the compression ratio actuator 85 is a combination of a motor connected to the ECU 2 and a reduction mechanism (neither of which is shown), and driven by the ECU 2, as described hereinbelow. The compression ratio actuator 85 is comprised of a casing 85a, an arm 85b, and a control shaft 85c, with the motor and the reduction mechanism contained in the casing 85a. The arm 85b has one end thereof fixed to a foremost end of a rotating shaft 85b of the reduction mechanism, whereby the arm 85b pivotally moves about the rotating shaft 85b along with rotation of the motor.

The other end of the arm 85b has the control shaft 85c pivotally movably connected thereto. The control shaft 85c extends, similarly to the crankshaft 3d, in the direction of depth of the figure, and has the other end of the control link 84 connected thereto.

Further, in the vicinity of the arm 85b, a minimum compression ratio stopper 86a and a maximum compression ratio stopper 86b are provided in a manner spaced from each other, and these two stoppers 86a and 86b restrict the rotatable range of the arm 85b. More specifically, when the motor is driven in normal and reverse rotational directions by compression ratio control input Ucr, referred to hereinafter, from the ECU 2, the arm 85b is pivotally moved within a range between the minimum compression ratio position (shown in FIG. 13A) in which the arm 85b is in contact with the minimum compression ratio stopper 86a and stopped thereat and the maximum compression ratio position (shown in FIG. 13B) in which the arm 85b is in contact with the maximum compression ratio stopper 86b and stopped thereat. In the present embodiment, the arm 85b corresponds to the movable part, and the minimum compression ratio and the maximum compression ratio stoppers 86a and 86b correspond to the restricting part.

Figure 13A:
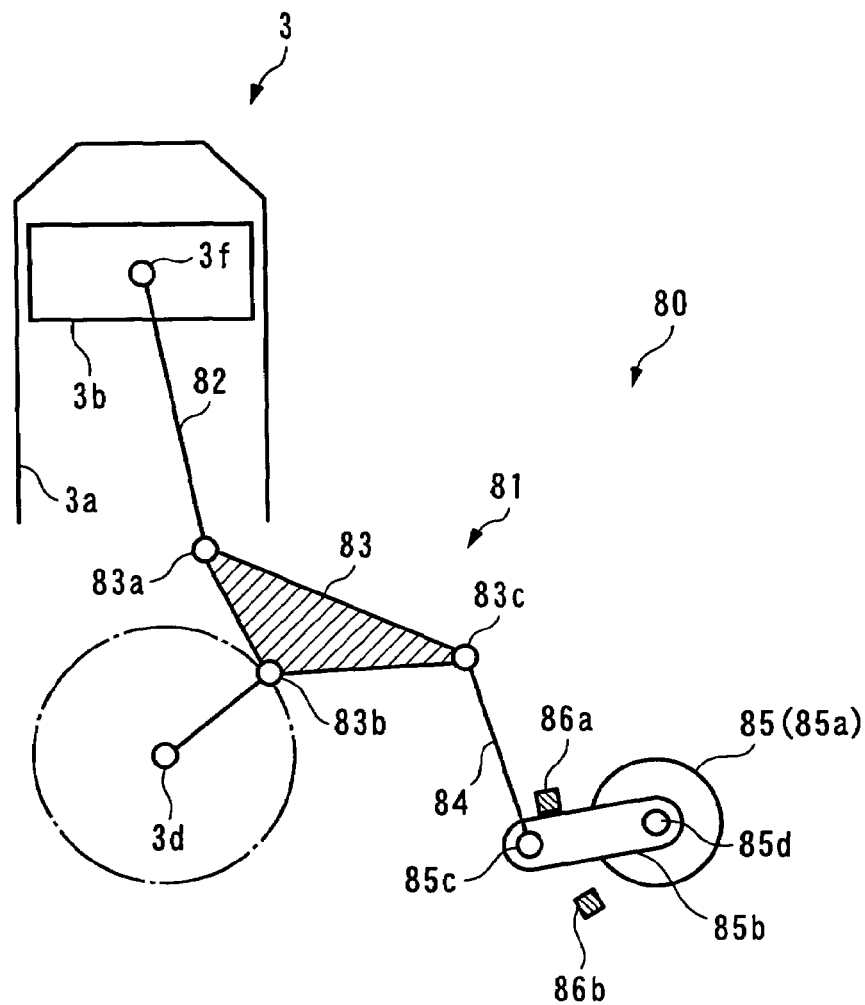
FIG. 13A is a schematic diagram of the whole arrangement of a variable compression ratio mechanism in a state where a compression ratio is set to a minimum value.
Figure 13B:
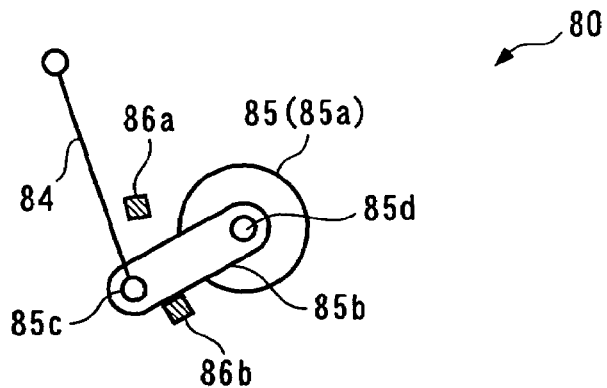
FIG. 13B is a schematic diagram of the arrangement of a compression ratio actuator and their vicinity of the variable compression ratio mechanism in a state where the compression ratio is set to a maximum value.

With the above configuration, in the variable compression ratio mechanism 80, when the rotating shaft 85d of the compression ratio actuator 85 is rotated counterclockwise as viewed in FIG. 13A in the state of the arm 85b is toward the minimum compression ratio stopper 86a, the arm 85b is pivotally moved counterclockwise as viewed in FIG. 13A along with the counterclockwise rotation of the rotating shaft 85d. As the whole control link 84 is pressed downward by the downward movement of the arm 85b, the lower link 83 is pivotally moved clockwise as viewed in FIG. 13A about the crank pin 83b, while the upper link 82 is pivotally moved counterclockwise as viewed in FIG. 13A about the piston pin 3f. As a result, the shape formed by the piston pin 3f, the upper pin 83a, and the crank pin 83b is made closer to the shape of a straight line than when they are located at the minimum compression ratio position, whereby the straight-line distance between the piston pin 3f and the crank pin 83b, obtained when the piston 3b has reached the top dead center position is increased (which means that the stroke of the piston 3b is increased), to decrease the volume of the combustion chamber, whereby the compression ratio Cr is increased.

On the other hand, inversely to the above, when the rotating shaft 85d of the compression ratio actuator 85 is rotated clockwise as viewed in FIG. 13A in the state of the arm 85b being toward the maximum compression ratio stopper 86b, the arm 85b is pivotally moved clockwise as viewed in FIG. 13A along with the clockwise rotation of the rotating shaft 85, whereby the whole control link 84 is pushed upward. Quite inversely to the above operations, this causes the lower link 83 to be pivotally moved counterclockwise, and the upper link 82 to be pivotally moved clockwise, as viewed in FIG. 13A. As a result, the straight-line distance between the piston 3f and the crank pin 83b, obtained when the piston 3b has reached the top dead center position is decreased (which means that the stroke of the piston 3b is shortened), to increase the volume of the combustion chamber, whereby the compression ratio Cr is reduced. As described above, in the variable compression ratio mechanism 80, by pivotal motion of the arm 85b between the minimum compression ratio stopper 86a and the maximum compression ratio stopper 86b, the compression ratio Cr is continuously changed between the minimum value Cr_L and the maximum value Cr_H. In the present embodiment, the minimum value Cr_L and the maximum value Cr_H correspond to the limit value.

It should be noted that the variable compression ratio mechanism 80 includes a lock mechanism, not shown, and when the compression ratio control input Ucr is set to a failure time value Ucr_fs, referred to hereinafter, or when the compression ratio control input Ucr is not inputted to the compression ratio actuator 85 e.g. due to a disconnection, the operation of the variable compression ratio mechanism 80 is locked by the lock mechanism. More specifically, the variable compression ratio mechanism 80 is inhibited from changing the compression ratio Cr, whereby the compression ratio Cr is held at the minimum value Cr_L. As described hereinabove, the minimum value Cr_L is set to a value which is capable of ensuring the predetermined failure time value of the intake air amount when the valve lift Liftin is held at the minimum value Liftin_L, and at the same time the cam phase Cain is held at the most retarded value Cain_L.

Further, within the casing 85a of the compression ratio actuator 85, there is provided a control angle sensor 25 (see FIG. 2). The control angle sensor 25 detects a pivot angle θcr of the rotating shaft 85d, i.e. the arm 85b, and delivers a signal indicative of the sensed control angle θcr to the ECU 2. The ECU 2 calculates the compression ratio Cr based on the signal output from the control angle sensor 25. In the present embodiment, the control angle sensor 25 corresponds to the position detecting means.

Furthermore, as shown in FIG. 2, connected to the ECU 2 are an accelerator pedal opening sensor 26, and an ignition switch (hereinafter referred to as "the IG·SW") 27. The accelerator pedal opening sensor 26 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG SW 27 is turned on or off by the operation of an ignition key, not shown, and delivers a signal indicative of the ON/OFF state thereof to the ECU 2.

The ECU 2 is implemented by a microcomputer including a CPU, a RAM, a ROM, and an I/O interface (none of which are shown). The ECU 2 determines operating conditions of the engine 3, based on the detection signals delivered from the above-mentioned sensors 20 to 26, the ON/OFF signal from the IG·SW 27, and the like, and executes control processes. More specifically, as will be described in detail hereinafter, the ECU 2 controls the valve lift Liftin and the cam phase Cain via the variable valve lift mechanism 50 and the variable cam phase mechanism 70, respectively, and controls the compression ratio Cr via the variable compression ratio mechanism 80.

It should be noted that in the present embodiment, the ECU 2 corresponds to the control amount-calculating means, the target control amount-setting means, the control input-calculating means, the disturbance suppressing parameter-setting means, the determination means, and the correction value-calculating means of the present invention.

Next, a description will be given of the control system 1 according to the present embodiment. The control system 1 includes a valve lift controller 100 (see FIG. 14) for carrying out valve lift control, a cam phase controller 110 (see FIG. 16) for carrying out cam phase control, and a compression ratio controller 120 (see FIG. 18) for carrying out compression ratio control, all of which are implemented by the ECU 2.

Figure 14:
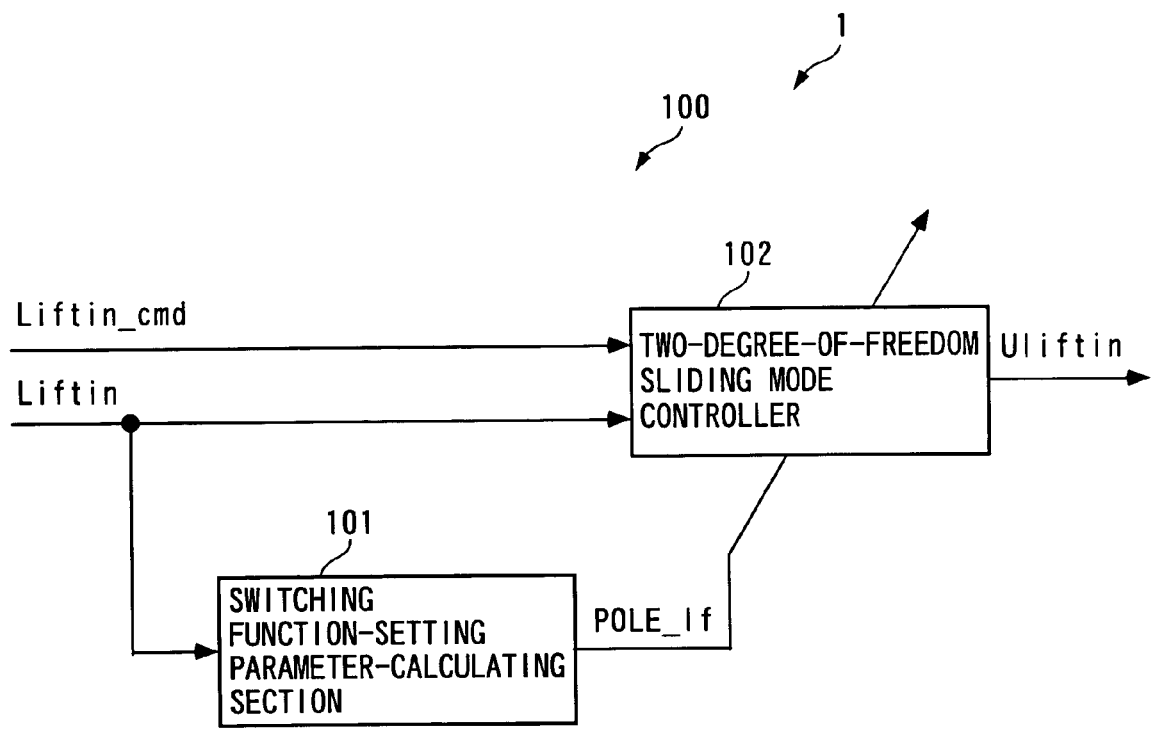
FIG. 14 is a schematic block diagram of a valve lift controller.

First, a description will be given of the valve lift controller 100. The valve lift controller 100 calculates the lift control input Uliftin for control of the variable valve lift mechanism 50, and as shown in FIG. 14, is comprised of a switching function-setting parameter-calculating section 101, and a two-degree-of-freedom sliding mode controller (hereinafter referred to as "the two-degree-of-freedom SLD controller) 102.

Figure 15:
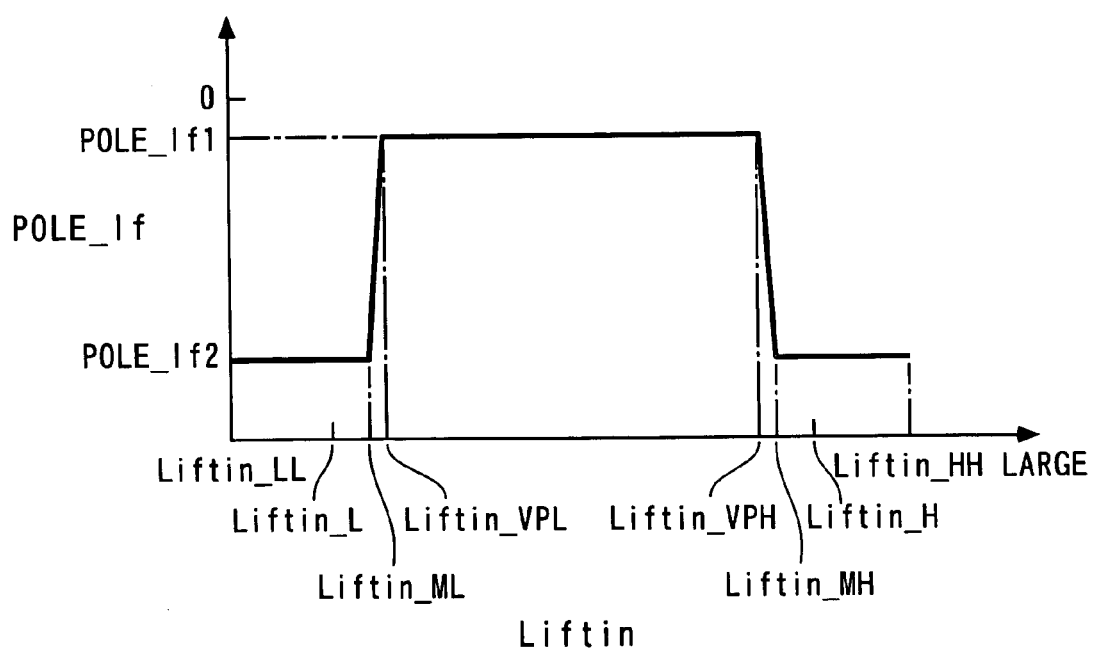
FIG. 15 is a diagram showing, by way of example, a table for use in calculating a switching function-setting parameter POLE_lf.

The switching function-setting parameter-calculating section 101 calculates the switching function-setting parameter POLE_lf by searching a table shown in FIG. 15 according to the valve lift Liftin. In FIG. 15, POLE_lf1 is set to a predetermined negative value (e.g. a value of −0.2) close to a value of 0, and POLE_lf2 is set to a predetermined negative value (e.g. a value of −0.99) close to a value of −1.

Further, in FIG. 15, Liftin_LL, Liftin_ML, Liftin_VPL, Liftin_VPH, Liftin_MH, and Liftin_HH correspond to respective predetermined values of the valve lift Liftin set such that the following equations (1) and (2) hold. Liftin_LL and Liftin_HH represent a predetermined minimum hold value and a predetermined maximum hold value, respectively, and used for holding the short arum 65 of the aforementioned lift actuator 60 in contact with the minimum lift stopper 67*a* and the maximum lift stopper 67*b*, respectively. Further, Liftin_VPL and Liftin_VPH represent predetermined threshold values, respectively, and Dliftin_vpole in the following equation (2) represents a predetermined positive value.

$$\text{Liftin\_LL} < \text{Liftin\_L} < \text{Liftin\_ML} < \text{Liftin\_VPL} < \text{Liftin\_VPH} < \text{Liftin\_MH} < \text{Liftin\_H} < \text{Liftin\_HH} \quad (1)$$

$$\text{Liftin\_H-Liftin\_VPH} = \text{Liftin\_VPL} - \text{Liftin\_L} = \text{Dliftin\_vpole} \quad (2)$$

In this table, the switching function-setting parameter POLE_lf is set to the predetermined value POLE_lf2 when the valve lift is within a range of Liftin≦Liftin_ML or a range of Liftin_MH≦Liftin, and to the predetermined value POLE_lf1 when the same is within a range of Liftin_VPL≦Liftin≦Liftin_VPH. Further, when the valve lift Liftin is within a range of Liftin_ML<Liftin<Liftin_VPL, the switching function-setting parameter POLE_lf is set to a larger value as the valve lift Liftin is larger, and when the same is within a range of Liftin_VPH<Liftin<Liftin_MH, the switching function-setting parameter POLE_lf is set to a smaller value as the valve lift Liftin is larger. The reason for thus setting the switching function-setting parameter POLE_lf will be described hereinafter.

In the present embodiment, the valve lift controller 100 corresponds to the control input-calculating means, the switching function-setting parameter-calculating section 101 to the disturbance suppressing parameter-setting means, and the switching function-setting parameter POLE_lf to the disturbance suppressing parameter and the response-specifying parameter. Further, the minimum and maximum hold values Liftin_LL and Liftin_HH correspond to the predetermined value outside the control range of the present invention, and the threshold values Liftin_VPL and Liftin_VPH correspond to the predetermined value close to the limit value of the present invention.

On the other hand, with a target value filter-type two-degree-of-freedom sliding mode control algorithm expressed by the following equations (3) to (10), the two-degree-of-freedom SLD controller 102 calculates the Lift control input Uliftin based on the valve lift Liftin and a target valve lift Liftin_cmd. That is, the valve lift control input Uliftin is calculated as a value for causing the valve lift Liftin to follow up and converge to the target valve lift Liftin_cmd. In the following equations (3) to (10), each discrete data with a symbol (k) represents data sampled (or calculated) at a predetermined control cycle ΔT, referred to hereinafter. The symbol k represents a position in the sequence of sampling cycles of discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol k and the like provided for the discrete data are omitted as deemed appropriate.

$$\text{Liftin\_cmd\_f}(k) = \quad (3)$$
$$-\text{POLE\_f\_lf} \cdot \text{Liftin\_cmd\_f}(k-1) + (1 + \text{POLE\_f\_lf}) \cdot \text{Liftin\_cmd}(k)$$

$$Uliftin(k) = \text{Ueq\_lf}(k) + \text{Urch\_lf}(k) + \text{Uadp\_lf}(k) + \text{Unl\_lf}(k) \quad (4)$$

$$\text{Ueq\_lf}(k) = \frac{1}{b1\_lf}\{(1 - a1\_lf - \text{POLE\_lf}) \cdot \text{Liftin}(k) + \quad (5)$$
$$(\text{POLE\_lf} - a2\_lf) \cdot \text{Liftin}(k-1) - b2\_lf \cdot Uliftin(k-1) +$$
$$\text{Liftin\_cmd\_f}(k) + (\text{POLE\_lf} - 1) \cdot \text{Liftin\_cmd\_f}(k-1) -$$
$$\text{POLE\_lf} \cdot \text{Liftin\_cmd\_f}(k-2)\}$$

$$\text{Urch\_lf}(k) = -\frac{\text{Krch\_lf}}{b1\_lf} \cdot \sigma\_lf(k) \quad (6)$$

$$\text{Uadp\_lf}(k) = -\frac{\text{Kadp\_lf}}{b1\_lf} \cdot \sum_{i=0}^{k} \sigma\_lf(i) \quad (7)$$

$$\text{Unl\_lf}(k) = -\frac{\text{Knl\_lf}}{b1\_lf} \cdot sgn(\sigma\_lf(k)) \quad (8)$$

$$\sigma\_lf(k) = E\_lf(k) + \text{POLE\_lf} \cdot E\_lf(k-1) \quad (9)$$

$$E\_lf(k) = \text{Liftin}(k) - \text{Liftin\_cmd\_f}(k) \quad (10)$$

In the control algorithm, first, a filtered value Liftin_cmd_f of the target valve lift is calculated with a target value filter algorithm, i.e. a first-order lag filter algorithm expressed by the equation (3). In the equation (3), POLE_f_lf represents a target value filter-setting parameter set to a value which satisfies the relationship of −1<POLE_f_lf<0.

Next, the Lift control input Uliftin is calculated with a sliding mode control algorithm expressed by the equations (4) to (10). That is, as shown in the equation (4), the Lift control input Uliftin is calculated as the sum of an equivalent control input Ueq_lf, a reaching law input Urch_lf, an adaptive law input Uadp_lf, and a non-linear input Unl_lf.

The equivalent control input Ueq_lf is calculated using the equation (5). In the equation (5), parameters a1_lf, a2_lf, b1_lf, and b2_lf represent model parameters of a plant model expressed by an equation (11), referred to hereinafter, which are set to respective predetermined values.

Further, the reaching law input Urch_lf is calculated using the equation (6). In the equation (6), Krch_lf represents a predetermined reaching law gain, and σ_lf represents a switching function defined by the equation (9). E_lf in the equation (9) represents a follow-up error (difference) calculated by the equation (10).

Further, the adaptive law input Uadp_lf is calculated by the equation (7). In the equation (7), Kadp_lf represents a predetermined adaptive law gain. Further, the non-linear input Unl_lf is calculated by the equation (8). In the equation (8), Knl_lf represents a predetermined non-linear gain, and at the same time, sgn(σ_lf) represents a code function, which assumes a value of sgn(σ_lf)=1 when σ_lf≧0 holds, and a value of sgn(σ_lf)=−1 when σ_lf<0 holds (it may be configured to assume a value of sgn(σ_lf)=0 when σ_lf=0 holds.)

The above equations (3) to (10) are derived as follows: A plant is defined as a system to which is inputted the lift control input Uliftin and from which is outputted the valve lift Liftin as the control amount, and modeled into a discrete-time system model, whereby the following equation (11) is obtained. When the target value filter-type two-degree-offreedom sliding mode control theory is applied to the model defined by the equation (11) such that the valve lift Liftin follows up and converges to the target valve lift Liftin_cmd, the aforementioned equations (3) to (10) are derived.

$$\text{Liftin}(k+1) = a1\_lf \cdot \text{Liftin}(k) + \qquad (11)$$
$$a2\_lf \cdot \text{Liftin}(k-1) + b1\_lf \cdot Uliftin(k) + b2\_lf \cdot Uliftin(k-1)$$

In the control algorithms of the two-degree-of-freedom SLD controller 100, by varying the switching function-setting parameter POLE_lf within a range of −1<POLE_lf<0, it is possible to change the speed at which the follow-up error E_lf converges to a value of 0 and the convergence behavior, and at the same time change disturbance suppressing capability. This point will be described in detail with reference to FIG. 16. This figure shows changes in the follow-up error E_lf occurring in the case where the switching function-setting parameter POLE_lf is varied between three predetermined values POLE_ref1 to POLE_ref3 when a step-like disturbance is input to the valve lift mechanism 50. The predetermined value POLE_ref1 is set to a negative value (e.g. a value of −0.2) close to a value of 0, the predetermined value POLE_ref2 to an intermediate value (e.g. a value of −0.5) between a value of 0 and a value of −1, and the predetermined value POLE_ref3 to a negative value (e.g. a value of −0.99) close to a value of −1.

As is clear from FIG. 16, as the switching function-setting parameter POLE_lf is closer to a value of 0, it takes a shorter time before the follow-up error E_lf converges to a value of 0, and at the same time, the maximum value of the follow-up error E_lf becomes smaller, which enhances the disturbance suppressing capability. In other words, as the switching function-setting parameter POLE_lf is closer to a value of −1, it takes a longer time before the follow-up error E_lf converges to a value of 0, and the maximum value of the follow-up error E_lf becomes larger (i.e. the deviation of the valve lift Liftin from the target valve lift Liftin_cmd becomes larger), which decreases the disturbance suppressing capability. Further, during control of the variable valve lift mechanism 50 using the lift control input Uliftin, even when the value of the switching function-setting parameter POLE_lf is changed, due to the characteristics of the sliding mode control algorithm, the rotational speed of the short arm 65 does not decrease but is held at a value assumed before the change of the switching function-setting parameter POLE_lf.

By making use of the characteristics of the control algorithms, described above, in the variable valve lift mechanism 50, to reduce impact occurring when the short arm 65 is brought into contact with the minimum and maximum lift stoppers 67a and 67b, in the present embodiment, the switching function-setting parameter POLE_lf is set as in a table shown in FIG. 15. More specifically, when the valve lift Liftin is controlled in a decreasing direction, if it becomes smaller than the threshold value Liftin_VPL close to the minimum value Liftin_L, the switching function-setting parameter POLE_lf is set to a value closer to the predetermined value POLE_lf2 as the valve lift Liftin is smaller, that is, the switching function-setting parameter POLE_lf is set to such a value that allows an increase in the follow-up error E_lf and reduces the disturbance suppressing capability. As a result, while maintaining the rotational speed assumed before the change of the setting of the switching function-setting parameter POLE_lf, the short arm 65 of the lift actuator 60 is driven toward the minimum lift stopper 67a in a state where the sensitivity of the control in increasing or decreasing the driving force applied to the short arm 65 in response to a decrease or increase in the follow-up error E_lf is lower than before the change of the setting (i.e. in a state in which the degree of increase in the driving force applied to the short arm 65 with respect to an increase in the follow-up error E_lf is smaller), whereby the impact occurring when the short arm 65 is brought into contact with the small lift stopper 67a can be reduced.

On the other hand, in the case where the valve lift Liftin is controlled in an increasing direction, also when the valve lift Liftin becomes larger than the threshold value Liftin_VPH close to the maximum value Liftin_H, similarly to the above, the switching function-setting parameter POLE_lf is set to a value closer to the predetermined value POLE_lf2 as the valve lift Liftin is larger. That is, the switching function-setting parameter POLE_lf is set to such a value that allows an increase in the follow-up error E_lf and reduces the disturbance suppressing capability. As a result, while maintaining the rotational speed assumed before the change of the setting of the switching function-setting parameter POLE_lf, the short arm 65 of the lift actuator is driven toward the maximum lift stopper 67b in a state where the sensitivity of the control in increasing or decreasing the driving force applied to the short arm in response to a decrease or increase in the follow-up error E_lf is lower than before the change of the setting, whereby the impact occurring when the short arm is brought into contact with the maximum lift stopper 67b can be reduced.

Further, when the valve lift Liftin is in a range of Liftin_VPL≦Liftin≦Liftin_VPH, the switching function-setting parameter POLE_lf is set to the predetermined value POLE_lf1 which is closer to a value of 0, which makes it possible to maintain the follow-up capability of the valve lift Liftin to the target valve lift Liftin_cmd, the convergence behavior, and the disturbance suppressing capability at respective high levels.

In the present embodiment, the valve lift Liftin corresponds to the control amount, the target valve lift Liftin_cmd to the target control amount, and the lift control input Uliftin to the control input.

It should be noted that in the table shown in FIG. 15, the threshold values Liftin_VPL and Liftin_VPH may be set to such values as will satisfy the relationship of the (Liftin_VPL−Liftin_L)≠(Liftin_H−Liftin_VPH). Further, in calculating the switching function-setting parameter POLE_lf, the table shown in FIG. 15 may be searched according to the target valve lift Liftin_cmd in place of the valve lift Liftin.

Figure 17:
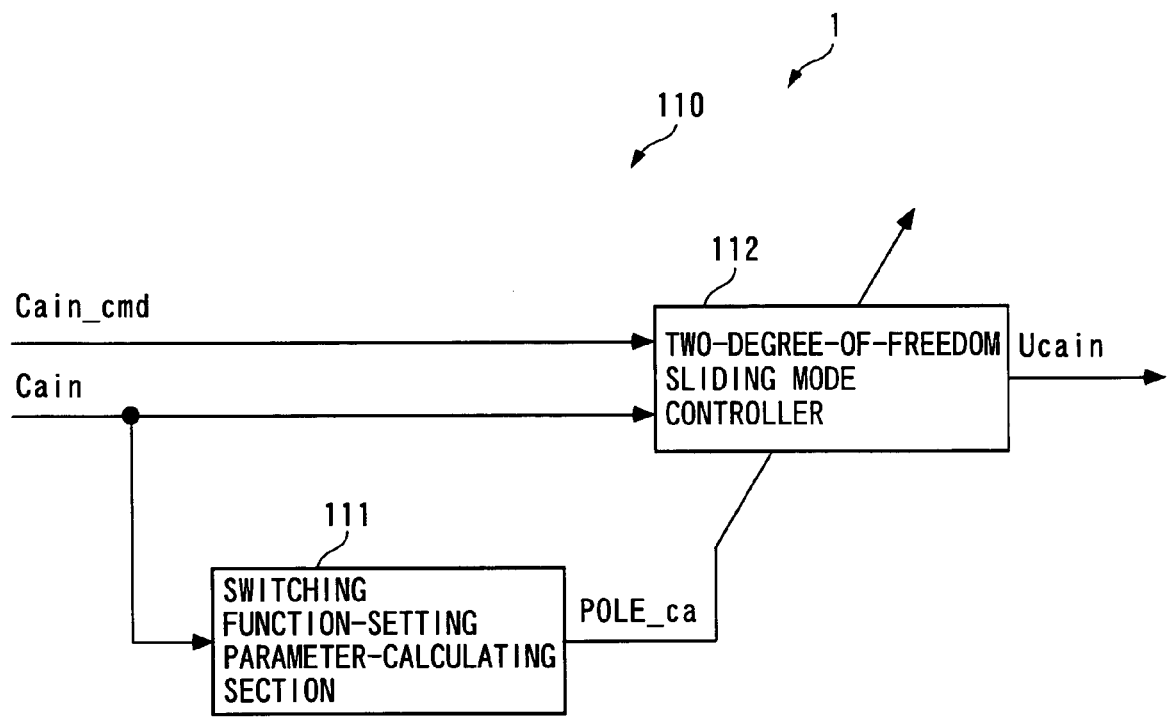
FIG. 17 is a schematic block diagram of a cam phase controller.

Next, a description will be given of the cam phase controller 110. The cam phase controller 110 calculates the phase control input Ucain for control of the variable cam phase mechanism 70, and as shown in FIG. 17, it is comprised of a switching function-setting parameter-calculating section 111 and a two-degree-of-freedom SLD controller 112.

Figure 18:
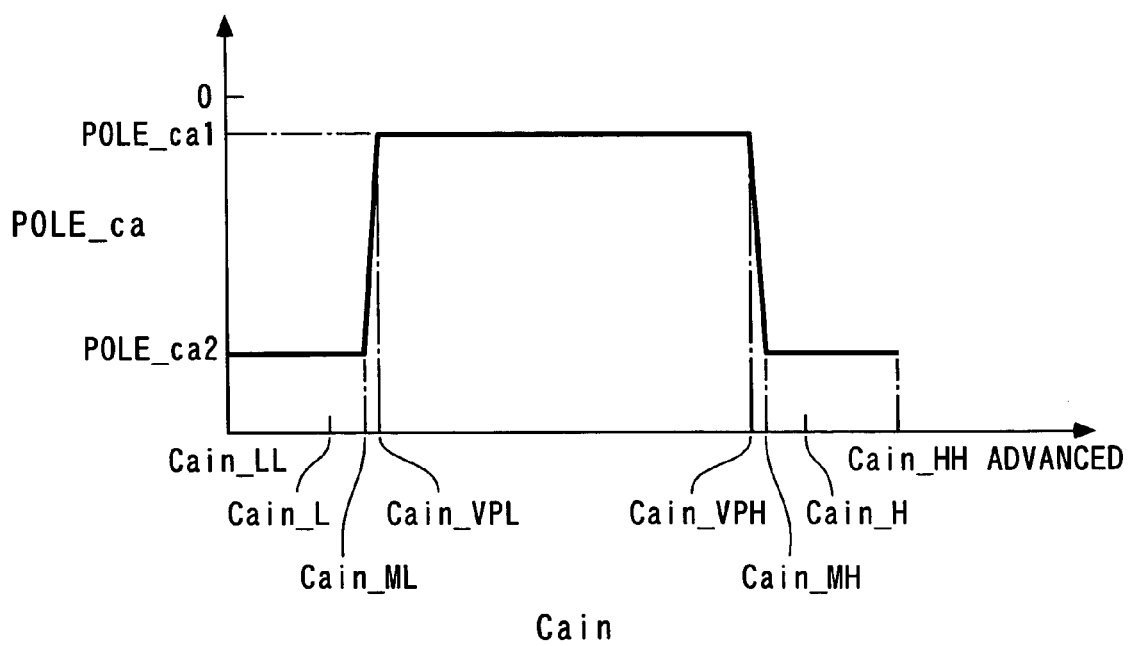
FIG. 18 is a diagram showing, by way of example, a table for use in calculating a switching function-setting parameter POLE_ca.

The switching function-setting parameter-calculating section 111 calculates the switching function-setting parameter POLE_ca by searching a table shown in FIG. 18 according to the cam phase Cain. In FIG. 18, POLE_cal is set to a predetermined negative value (e.g. a value of −0.2) close to a value of 0, and POLE_ca2 is set to a predetermined negative value (e.g. a value of −0.99) close to a value of −1.

Further, in FIG. 18, Cain_LL, Cain_ML, Cain_VPL, Cain_VPH, Cain_MH, and Cain_HH correspond to respective predetermined values of the cam phase Cain set such that the following equations (12) and (13) hold. Cain_LL and Cain_HH represent a predetermined most retarded hold value and a predetermined most advanced hold value, respectively, and used for holding the arm 74b of the aforementioned electromagnetic brake 72 in contact with the most retarded position stopper 73a and the most advanced position stopper 73b. Further, Cain_VPL and Cain_VPH represent predetermined threshold values, respectively, and Dcain_vpole in the following equation (13) represents a predetermined positive value.

$$\text{Cain\_LL} < \text{Cain\_L} < \text{Cain\_ML} < \text{Cain\_VPL} < \text{Cain\_VPH} < \text{Cain\_MH} < \text{Cain\_H} < \text{Cain\_HH} \quad (12)$$

$$\text{Cain\_H-Cain\_VPH} = \text{Cain\_VPL-Cain\_L} = \text{Dcain\_vpole} \quad (13)$$

In this table, the switching function-setting parameter POLE_ca is set to the predetermined value POLE_ca2 when the cam phase Cain is within a range of Cain≦Cain_ML or a range of Cain_MH≦Cain, and to the predetermined value POLE_ca1 when the same is within a range of Cain_VPL≦Cain≦Cain_VPH. Further, when the cam phase Cain is within a range of Cain_ML<Cain<Cain_VPL, the switching function-setting parameter POLE_ca is set to a larger value as the cam phase Cain is larger, and when the same is within a range of Cain_VPH<Cain<Cain_MH, the switching function-setting parameter POLE_ca is set to a smaller value as the cam phase Cain is larger.

In the table shown in FIG. 18, the reason for thus setting the switching function-setting parameter POLE_ca as described above is the same as that for setting the switching function-setting parameter POLE_lf in the table shown in FIG. 15, and hence detailed description thereof is omitted.

In the present embodiment, the cam phase controller 110 corresponds to the control input-calculating means, the switching function-setting parameter-calculating section 111 to the disturbance suppressing parameter-setting means, and the switching function-setting parameter POLE_ca to the disturbance suppressing parameter and the response-specifying parameter. Further, the most retarded and the most advanced hold value Cain_LL and Cain_HH correspond to the predetermined value outside the control range of the present invention, and the threshold values Cain_VPL and Cain_VPH correspond to the predetermined value close to the limit value of the present invention.

On the other hand, with a target value filter-type two-degree-of-freedom sliding mode control algorithm defined by the following equations (14) to (21), the two-degree-of-freedom SLD controller 112 calculates the phase control input Ucain based on the cam phase Cain and a target cam phase Cain_cmd. That is, the phase control input Ucain is calculated as a value for causing the cam phase Cain to follow up and converge to the target cam phase Cain_cmd.

$$\text{Cain\_cmd\_f}(k) = \qquad (14)$$
$$-\text{POLE\_f\_ca} \cdot \text{Cain\_cmd\_f}(k-1) + (1 + \text{POLE\_f\_ca}) \cdot \text{Cain\_cmd}(k)$$

$$Ucain(k) = Ueq\_ca(k) + Urch\_ca(k) + Uadp\_ca(k) + Unl\_ca(k) \quad (15)$$

$$Ueq\_ca(k) = \frac{1}{b1\_ca}\{(1 - a1\_ca - \text{POLE\_ca}) \cdot \text{Cain}(k) + \qquad (16)$$
$$(\text{POLE\_ca} - a2\_ca) \cdot \text{Cain}(k-1) - b2\_ca \cdot Ucain(k-1) +$$
$$\text{Cain\_cmd\_f}(k) + (\text{POLE\_ca} - 1) \cdot \text{Cain\_cmd\_f}(k-1) -$$
$$\text{POLE\_ca} \cdot \text{Cain\_cmd\_f}(k-2)\}$$

$$Urch\_ca(k) = -\frac{Krch\_ca}{b1\_ca} \cdot \sigma\_ca(k) \qquad (17)$$

$$Uadp\_ca(k) = -\frac{Kadp\_ca}{b1\_ca} \cdot \sum_{i=0}^{k} \sigma\_ca(i) \qquad (18)$$

$$Unl\_ca(k) = -\frac{Knl\_ca}{b1\_ca} \cdot sgn(\sigma\_ca(k)) \qquad (19)$$

$$\sigma\_ca(k) = E\_ca(k) + \text{POLE\_ca} \cdot E\_ca(k-1) \qquad (20)$$

-continued $$E\_ca(k) = \text{Cain}(k) - \text{Cain\_cmd\_f}(k) \qquad (21)$$

In the control algorithm, first, a filtered value Cain_cmd_f of the target cam phase is calculated with a target value filter algorithm, i.e. a first-order lag filter algorithm expressed by the equation (14). In the equation (14), POLE_f_ca represents a target value filter-setting parameter set to a value which satisfies the relationship of −1<POLE_f_ca>0.

Next, the phase control input Ucain is calculated with a sliding mode control algorithm expressed by the equations (15) to (21). That is, as shown in the equation (15), the phase control input Ucain is calculated as the total sum of an equivalent control input Ueq_ca, a reaching law input Urch_ca, an adaptive law input Uadp_ca, and a non-linear input Unl_ca.

The equivalent control input Ueq_ca is calculated using the equation (16). In the equation (16), parameters a1_ca, a2_ca, b1_ca, and b2_ca represent model parameters of a plant model expressed by an equation (22), referred to hereinafter, which are set to respective predetermined values.

Further, the reaching law input Urch_ca is calculated using an equation (17). In the equation (17), Krch_ca represents a predetermined reaching law gain, and σ_ca represents a switching function defined by the equation (20). _ca in the equation (20) represents a follow-up error (difference) calculated by the equation (21).

Further, the adaptive law input Uadp_ca is calculated by the equation (18). In the equation (18), Kadp_ca represents a predetermined adaptive law gain. Further, the non-linear input Unl_ca is calculated by the equation (19). In the equation (19), Knl_ca represents a predetermined non-linear gain, and at the same time, sgn (σ_ca) represents a code function, which assumes a value of sgn (σ_ca)=1 when σ_ca≧0 holds, and a value of sgn (σ_ca)=−1 when σ_ca<0 holds (it may be configured to assume a value of sgn (σ_ca)=0 when σ_ca=0 holds.) The above equations (14) to (21) are derived in the same manner as the equations (3) to (10) are derived, which are described hereinbefore: A plant is defined as a system to which is inputted the phase control input Ucain and from which is outputted the cam phase Cain as the control amount, and modeled into a discrete-time system model, whereby the following equation (22) is obtained. When the target value filter-type two-degree-of-freedom sliding mode control theory is applied to the model defined by the equation (22) such that the cam phase Cain converges to the target cam phase Cain_cmd, the aforementioned equations (14) to (21) are derived.

$$\text{Cain}(k+1) = a1\_ca \cdot \text{Cain}(k) + a2\_ca \cdot \text{Cain}(k-1) + \qquad (22)$$
$$b1\_ca \cdot Ucain(k) + b2\_ca \cdot Ucain(k-1)$$

In the control algorithms of the two-degree-of-freedom SLD controller 112, as described hereinbefore, by varying the switching function-setting parameter POLE_ca within a range of −1<POLE_ca<0, it is possible to change disturbance suppressing capability. Therefore, in the table described above with reference to FIG. 18, to reduce impact occurring when the arm 74b of the electromagnetic brake 72 is brought into contact with the most retarded and most advanced stoppers 73a and 73b, the switching function-setting parameter POLE_ca is set as described above. More specifically when the cam phase Cain is controlled toward the most retarded value Cain_L, if the cam phase Cain becomes a more retarded value than the threshold value Cain_VPL close to the most retarded value Cain_L, the switching function-setting parameter POLE_ca is set to a value closer to the predetermined value POLE_ca2 as the cam phase Cain is more retarded, that is, the switching function-setting parameter POLE_ca is set to such a value that allows an increase in the follow-up error E_ca and reduces the disturbance suppressing capability. As a result, while maintaining the rotational speed assumed before the change of the setting of the switching function-setting parameter POLE_ca, the arm 74b of the electromagnetic brake 72 is driven toward the most retarded position stopper 73a in a state where the sensitivity of the control in increasing or decreasing the driving force applied to the arm 74b in response to a decrease or increase in the follow-up error E_ca is lower than before the change of the setting, whereby the impact occurring when the arm 74b is brought into contact with most retarded position stopper 73a can be reduced.

On the other hand, conversely to the above, in the case where the cam phase Cain is controlled toward the advanced side, also when the cam phase Cain becomes more advanced than the threshold value Cain_VPH close to the most advanced value Cain_H, the switching function-setting parameter POLE_ca is set to a value closer to the predetermined value POLE_ca2. That is, the switching function-setting parameter POLE_ca is set to such a value that allows an increase in the follow-up error E_ca and reduces the disturbance suppressing capability. As a result, while maintaining the rotational speed assumed before the change of the setting of the switching function-setting parameter POLE_ca, the arm 74b of the electromagnetic brake 72 is driven toward the most advanced position stopper 73b in a state where the sensitivity of the control in increasing or decreasing the driving force applied to the arm 74b in response to a decrease or increase in the follow-up error E_ca is lower than before the change of the setting, whereby the impact occurring when the arm 74b is brought into contact with most advanced position stopper 73b can be reduced.

Further, when the cam phase Cain is in a range of Cain_VPL≦Cain≦Cain_VPH, the switching function-setting parameter POLE_ca is set to the predetermined value POLE_cal which is close to a value of 0, which makes it possible to maintain the follow-up capability of the cam phase Cain to the target cam phase Cain_cmd, the convergence behavior, and the disturbance suppressing capability at respective high levels.

In the present embodiment, the cam phase Cain corresponds to the control amount, the target cam phase Cain_cmd to the target control amount, and the phase control input Ucain to the control input.

It should be noted that in the table shown in FIG. 18, the threshold values Cain_VPL and Cain_VPH may be set to such values as will satisfy the relationship of (Cain_VPL−Cain_L)≠(Cain_H−Cain_VPH). Further, in calculating the switching function-setting parameter POLE_ca, the table shown in FIG. 18 may be searched according to the target cam phase Cain_cmd in place of the cam phase Cain.

Figure 19:
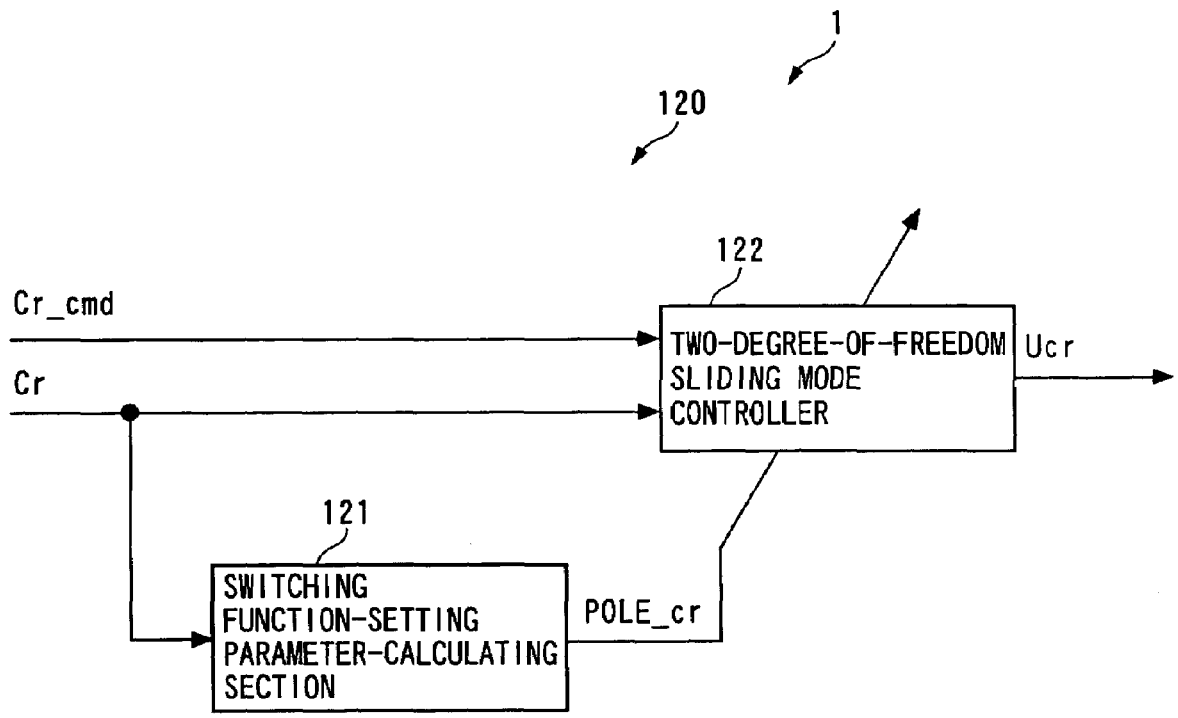
FIG. 19 is a schematic block diagram of a compression ratio controller.

Next, a description will be given of the compression ratio controller 120. The compression ratio controller 120 calculates the compression ratio control input Ucr for control of the variable compression ratio mechanism 80, and as shown in FIG. 19, it is comprised of a switching function-setting parameter-calculating section 121 and a two-degree-of-freedom SLD controller 122.

Figure 20:
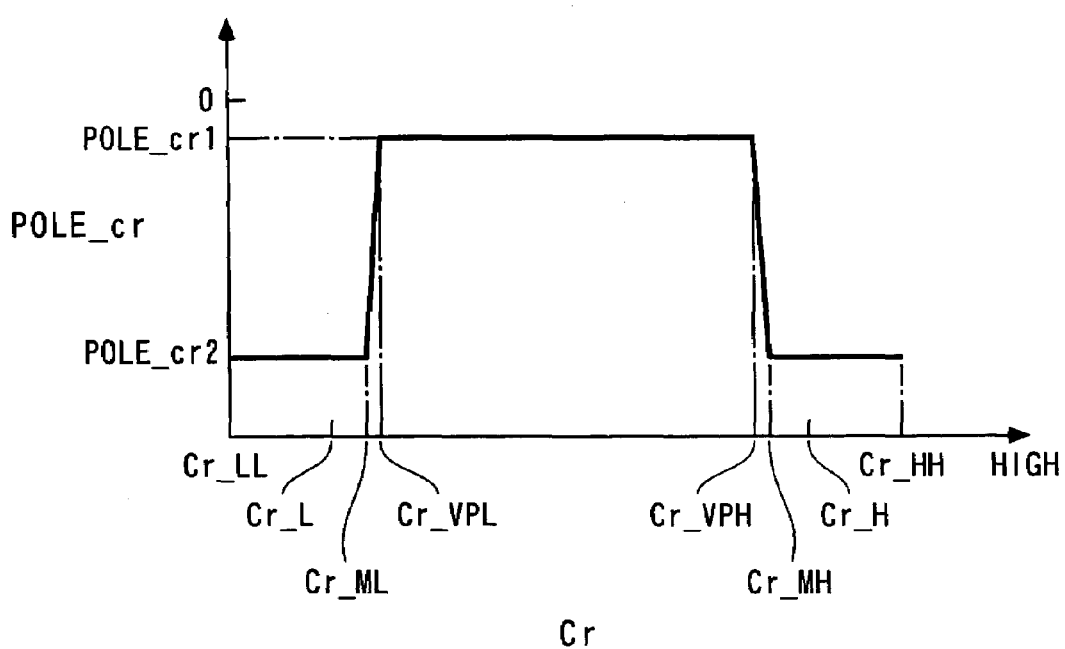
FIG. 20 is a diagram showing, by way of example, a table for use in calculating a switching function-setting parameter POLE_cr.

The switching function-setting parameter-calculating section 121 calculates the switching function-setting parameter POLE_cr by searching a table shown in FIG. 20 according to the compression ratio Cr. In FIG. 20, POLE_cr1 is set to a predetermined negative value (e.g. a value of −0.2) close to a value of 0, and POLE_cr2 is set to a predetermined negative value (e.g. a value of −0.99) close to a value of −1.

Further, in FIG. 20, Cr_LL, Cr_ML, Cr_VPL, Cr_VPH, Cr_MH, and Cr_HH correspond to respective predetermined values of the compression ratio Cr set such that the following equations (23) and (24) hold. Cr_LL and Cr_HH represent a predetermined minimum hold value and a predetermined maximum hold value, respectively, which are used for holding the arm 85b of the aforementioned compression ratio actuator 85 in contact with the minimum compression ratio stopper 86a and the maximum compression ratio stopper 86b, respectively. Further, Cr_VPL and Cr_VPH represent predetermined threshold values, respectively, and Dcr_vpole in the following equation (24) represents a predetermined positive value.

$$Cr\_LL < Cr\_L < Cr\_ML < Cr\_VPL < Cr\_VPH < Cr\_M < Cr\_H < Cr\_HH \quad (23)$$

$$Cr\_H - Cr\_VPH = Cr\_VPL - Cr\_L = Dcr\_vpole \quad (24)$$

In this table, the switching function-setting parameter POLE_cr is set to the predetermined value POLE_cr2 when the compression ratio Cr is within a range of Cr≦Cr_ML or a range of Cr_MH≦Cr, and to the predetermined value POLE_cr1 when the same is within a range of Cr_VPL≦Cr≦Cr_VPH. Further, when the compression ratio Cr is within a range of Cr_ML<Cr<Cr_VPL, the switching function-setting parameter POLE_cr is set to a larger value as the compression ratio Cr is larger, and when the same is within a range of Cr_VPH<Cr<Cr_MH, the switching function-setting parameter POLE_cr is set to a smaller value as the compression ratio Cr is larger.

In the table shown in FIG. 20, the reason for setting the switching function-setting parameter POLE_cr as described above is the same as that for setting the switching function-setting parameter POLE_lf in the table shown in FIG. 15, and hence detailed description thereof is omitted.

In the present embodiment, the compression ratio controller 120 corresponds to the control input-calculating means, the switching function-setting parameter-calculating section 121 to the disturbance suppressing parameter-setting means, and the switching function-setting parameter POLE_cr to the disturbance suppressing parameter and the response-specifying parameter. Further, the minimum and the maximum hold values Cr_LL and Cr_HH correspond to the predetermined value outside the control range, and the threshold values Cr_VPL and Cr_VPH correspond to the predetermined value close to the limit value.

On the other hand, with a target value filter-type two-degree-of-freedom sliding mode control algorithm defined by the following equations (25) to (32), the two-degree-of-freedom SLD controller 122 calculates the compression ratio control input Ucr based on the compression ratio Cr and the target compression ratio Cr_cmd. That is, the compression ratio control input Ucr is calculated as a value for causing the compression ratio Cr to follow up and converge to the target compression ratio Cr_cmd.

$$Cr\_cmd\_f(k) = \quad (25)$$
$$-POLE\_f\_cr \cdot Cr\_cmd\_f(k-1) + (1 + POLE\_f\_cr) \cdot Cr\_cmd(k)$$

$$Ucr(k) = Ueq\_cr(k) + Urch\_cr(k) + Uadp\_cr(k) + Unl\_cr(k) \quad (26)$$

$$Ueq\_cr(k) = \frac{1}{b1\_cr} \quad (27)$$
$$\{(1 - a1\_cr - POLE\_cr) \cdot Cr(k) + (POLE\_cr - a2\_cr) \cdot Cr(k-1) -$$
$$b2\_cr \cdot Ucr(k-1) + Cr\_cmd\_f(k) + (POLE\_cr - 1) \cdot Cr\_cmd$$
$$\_f(k-1) - POLE\_cr \cdot Cr\_cmd\_f(k-2)\}$$

-continued $$\text{Urch\_cr}(k) = -\frac{\text{Krch\_cr}}{\text{b1\_cr}} \cdot \sigma\_cr(k) \quad (28)$$

$$\text{Uadp\_cr}(k) = -\frac{\text{Kadp\_cr}}{\text{b1\_cr}} \cdot \sum_{i=0}^{k} \sigma\_cr(i) \quad (29)$$

$$\text{Unl\_cr}(k) = -\frac{\text{Knl\_cr}}{\text{b1\_cr}} \cdot sgn(\sigma\_cr(k)) \quad (30)$$

$$\sigma\_cr(k) = E\_cr(k) + \text{POLE\_cr} \cdot E\_cr(k-1) \quad (31)$$

$$E\_cr(k) = Cr(k) - Cr\_cmd\_f(k) \quad (32)$$

In the control algorithm, first, a filtered value Cr_cmd_f of the target compression ratio is calculated with a target value filter algorithm, i.e. a first-order lag filter algorithm expressed by the equation (25). In the equation (25), POLE_f_cr represents a target value filter-setting parameter set to a value which satisfies the relationship of −1<POLE_f_cr<0.

Next, the compression ratio control input Ucr is calculated with a sliding mode control algorithm expressed by the equations (26) to (32). That is, as shown in the equation (26), the compression ratio control input Ucr is calculated as the total sum of an equivalent control input Ueq_cr, a reaching law input Urch_cr, an adaptive law input Uadp_cr, and a non-linear input Unl_cr.

The equivalent control input Ueq_cr is calculated using the equation (27). In the equation (27), parameters a1_cr, a2_cr, b1_cr, and b2_cr represent model parameters of a plant model expressed by an equation (33), referred to hereinafter, which are set to respective predetermined values.

Further, the reaching law input Urch_cr is calculated using an equation (28). In the equation (28), Krch_cr represents a predetermined reaching law gain, and $\sigma\_cr$ represents a switching function defined by the equation (31). E_cr in the equation (31) represents a follow-up error (difference) calculated by the equation (32).

Further, the adaptive law input Uadp_cr is calculated by an equation (29). In the equation (29), Kadp_cr represents a predetermined adaptive law gain. Further, the non-linear input Unl_cr is calculated by an equation (30). In the equation (30), Knl_cr represents a predetermined non-linear gain, and at the same time, sgn ($\sigma\_cr$) represents a code function, which assumes a value of sgn ($\sigma\_cr$)=1 when $\sigma\_cr \geq 0$ holds, and a value of sgn ($\sigma\_cr$)=−1 when $\sigma\_cr < 0$ holds (it may be configured to assume a value of sgn ($\sigma\_cr$)=0 when $\sigma\_cr$=0 holds.)

The above equations (25) to (32) are derived in the same manner as the equations (3) to (10) are derived, which are described hereinabove: A plant is defined as a system to which is inputted the compression ratio control input Ucr and from which is outputted the compression ratio Cr as the control amount, and modeled into a discrete-time system model, whereby the following equation (33) is obtained. When the target value filter-type two-degree-of-freedom sliding mode control theory is applied to the model defined by the equation (33) such that the compression ratio Cr converges to the target compression ratio Cr_cmd, the aforementioned equations (25) to (32) are derived.

$$Cr(k+1) = \quad (33)$$
$$a1\_cr \cdot Cr(k) + a2\_cr \cdot Cr(k-1) + b1\_cr \cdot Ucr(k) + b2\_cr \cdot Ucr(k-1)$$

In the control algorithms of the two-degree-of-freedom SLD controller 122, as described hereinbefore, by varying the switching function-setting parameter POLE_cr within a range of −1<POLE_cr<0, it is possible to change disturbance suppressing capability. Therefore, in the present embodiment, in the variable compression ratio mechanism 80, the switching function-setting parameter POLE_cr is set as shown in the table described above with reference to FIG. 20, so as to reduce impact occurring when the arm 85b of the compression ratio actuator 85 is brought into contact with the minimum compression ratio stopper 86a and the maximum compression ratio stopper 86b. More specifically, in the case where the compression ratio Cr is controlled toward the minimum value Cr_L, when the compression ratio Cr becomes smaller than the threshold value CR_VPL close to the minimum value Cr_L, the switching function-setting parameter POLE_cr is set to a value closer to the predetermined value POLE_cr2 as the compression ratio POLE_cr is closer to the minimum value Cr_L. That is, the switching function-setting parameter POLE_cr is set to such a value that allows an increase in the follow-up error E_cr and reduces the disturbance suppressing capability. As a result, while maintaining the rotational speed assumed before the change of the setting of the switching function-setting parameter POLE_cr, the arm 85b of the compression ratio actuator 85 is driven toward the minimum compression ratio stopper 86a in a state where the sensitivity of the control in increasing or decreasing the driving force applied to the arm 85b in response to a decrease or increase in the follow-up error E_cr is lower than before the change of the setting, whereby the impact occurring when the arm 85b is brought into contact with the minimum compression ratio stopper 86a can be reduced.

On the other hand, in the case where the compression ratio Cr is controlled toward the maximum value Cr_H, when the compression ratio Cr becomes larger than the threshold value CR_VPH close to the maximum value Cr_H, the switching function-setting parameter POLE_cr is set to a value closer to the predetermined value POLE_cr2 as the compression ratio POLE_cr is closer to the maximum value Cr_H. That is, the switching function-setting parameter POLE_cr is set to such a value that allows an increase in the follow-up error E_cr and reduces the disturbance suppressing capability. As a result, while maintaining the rotational speed assumed before the change of the setting of the switching function-setting parameter POLE_cr, the arm 85b of the compression ratio actuator 85 is driven toward the maximum compression ratio stopper 86b in a state where the sensitivity of the control in increasing or decreasing the driving force applied to the arm 85b in response to a decrease or increase in the follow-up error E_cr is lower than before the change of the setting, whereby the impact occurring when the arm 85b is brought into contact with maximum compression ratio stopper 86b can be reduced.

Further, when the compression ratio Cr is in a range of Cr_VPL≦Cr≦Cr_VPH, the switching function-setting parameter POLE_cr is set to the predetermined value POLE_cr1 which is closer to a value of 0, which makes it possible to maintain the follow-up capability of the compression ratio Cr to the target compression ratio Cr_cmd, the convergence behavior, and the disturbance suppressing capability at respective high levels.

In the present embodiment, the compression ratio Cr corresponds to the control amount, the target compression ratio Cr_cmd to the target control amount, and the compression ratio control input Ucr to the control input.

It should be noted that in the table shown in FIG. 20, the threshold values Cr_VPL and Cr_VPH may be set to such values as will satisfy the relationship of the (Cr_VPL-Cr_L)≠(Cr_H-Cr_VPH). Further, in calculating the switching function-setting parameter POLE_cr, the table shown in FIG. 18 may be searched according to the target compression ratio Cr_cmd in place of the compression ratio Cr.

Hereinafter, the movable mechanism control process executed by the ECU 2 will be described with reference to FIG. 21. In the following description, the variable valve lift mechanism 50, the variable cam phase mechanism 70, and the variable compression ratio mechanism 80 will be collectively referred to as "the three variable mechanisms". The present process calculates the three control inputs Uliftin, Ucain, and Ucr for control of the three variable mechanisms, and is executed at a predetermined control repetition period ΔT (e.g. 5 msec).

In this process, first, in a step 1 (shown as S1 in abbreviated form in FIG. 20; the following steps are also shown in abbreviated form), a detection value Liftin_ad of the valve lift is calculated based on the detection signal from the pivot angle sensor 23.

Then, the process proceeds to a step 2, wherein it is determined whether or not a lift failure flag F_LIFTNG is equal to 1. The lift failure flag F_LIFTNG is set to 0 when the IG·SW 27 is turned on from the OFF state, and to 1 when conditions, referred to hereinafter, are satisfied.

If the answer to the question of the step 2 is negative (NO), for example, if it is immediately after the IG·SW 27 is turned on, the process proceeds to a step 3, wherein it is determined whether or not an initialization termination flag F_ini_done is equal to 1. The initialization termination flag F_ini_done is set to 0 when the IG·SW 27 is turned on, and as will be described hereinafter, set to 1 when a lift correction value Comp_Liftin is calculated.

If the answer to the question of the step 3 is negative (NO), i.e. if it is immediately after the IG·SW 27 is turned on, the process proceeds to a step 4, wherein the detection value Liftin_ad calculated in the step 1 is set to the valve lift Liftin.

Figure 22:
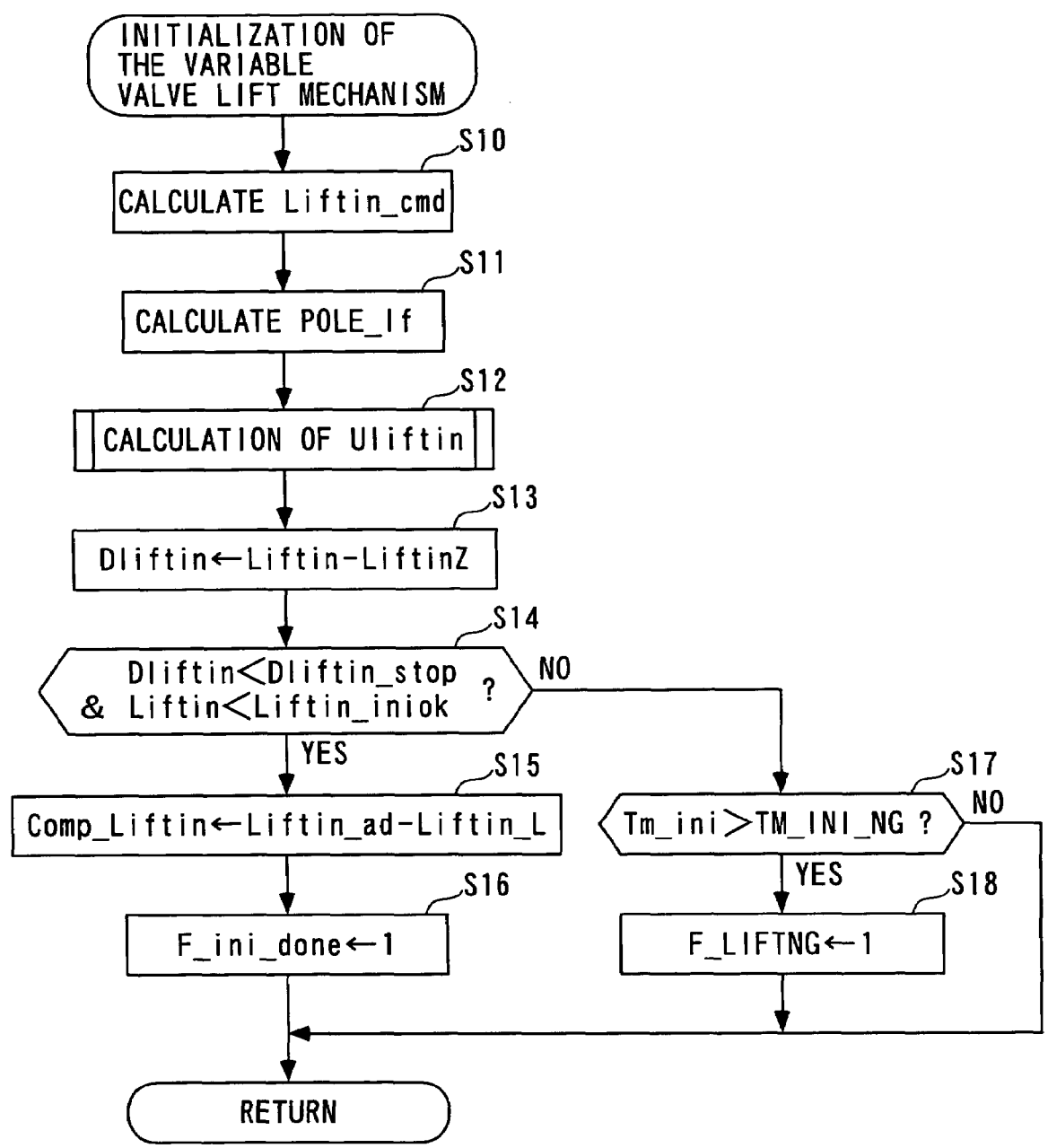
FIG. 22 is a flowchart showing an initializing process for the variable valve lift mechanism.

Then, the process proceeds to a step 5, wherein initialization of the variable valve lift mechanism 50 is executed. The initialization calibrates the pivot angle sensor 23, and determines whether or not the variable valve lift mechanism 50 is faulty. More specifically, it is executed as shown in FIG. 22. First, in a step 10, by searching a table shown in FIG. 23 according to the timer value Tm_ini of an initialization timer, the target valve lift Liftin_cmd is calculated. The initialization timer measures time over which the initialization is executed, i.e. time elapsed after the IG·SW 27 in the OFF state is turned on, and is implemented by an up-count timer.

Figure 23:
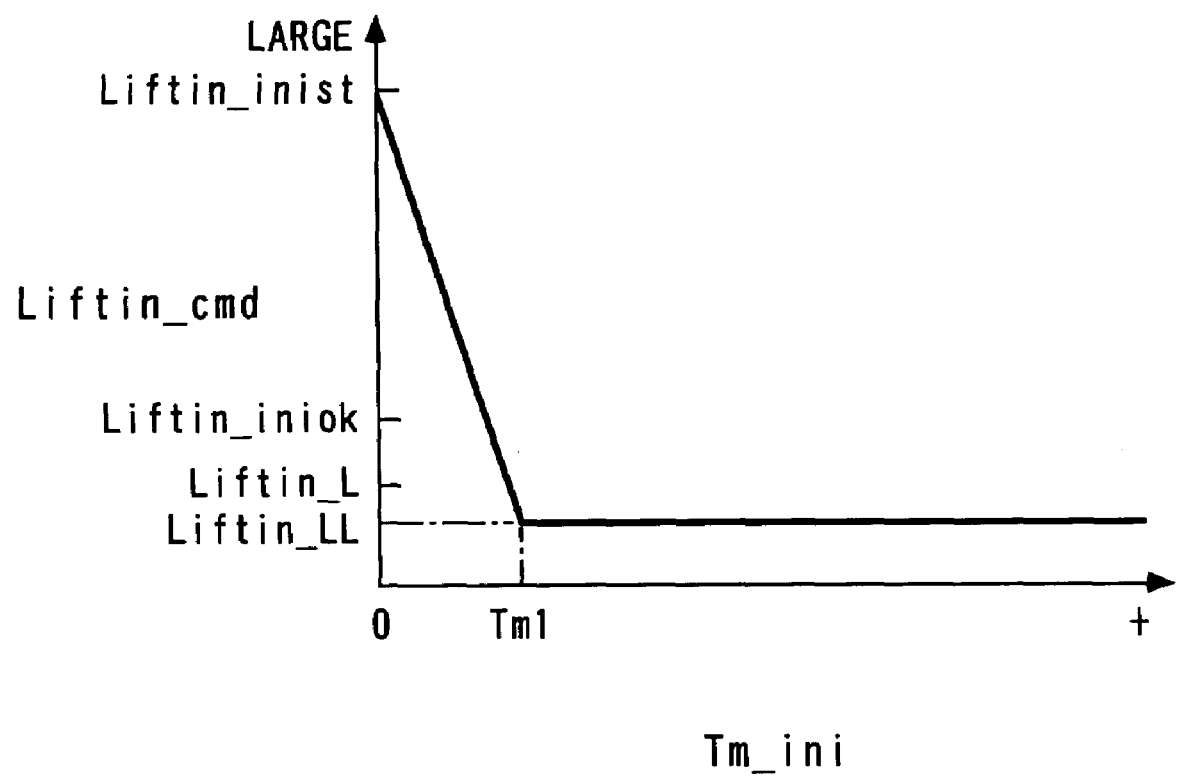
FIG. 23 is a diagram showing, by way of example, a table for use in calculating a target valve lift Liftin_cmd, during the initialization.

In FIG. 23, Tm1 represents a predetermined value, Liftin_inist a predetermined initial value, and Liftin_iniok a predetermined threshold value. These values are set to such values as will satisfy the relationship of Liftin_L<Liftin_iniok<Liftin_inist. The threshold value Liftin_iniok is used, as referred to hereinafter, in determining whether or not the short arm is incapable of pivotally moving to the minimum lift stopper 67a due to freezing or the like, and hence is set to a value slightly larger than the minimum value Liftin_L of the valve lift.

In this table, within a range of Tm_ini<Tm1, the target valve lift Liftin_cmd is set to a smaller value as the timer value Tm_ini is larger, whereas within a range of Tm1≦Tm_ini, it is set to the aforementioned minimum hold value Liftin_LL. This is to cause the short arm to pivotally move toward the minimum lift stopper 67a as time elapses after the IG·SW 27 in the OFF state is turned on, until it is finally positively brought into contact with the minimum lift stopper 67a.

In a step 11 following the step 10, the table shown in FIG. 15 is searched according to the valve lift Liftin, to thereby calculate the switching function-setting parameter POLE_lf.

Next, in a step 12, the lift control input Uliftin is calculated with the algorithm expressed by the aforementioned equations (3) to (10). The program then proceeds to a step 13, wherein the difference between the present value Liftin of the valve lift and the immediately preceding value LiftinZ (=Liftin(k−1)) is set to a lift change amount Dliftin.

Then, in a step 14, it is determined whether or not both the conditions of Dliftin<Dliftin_stp and Liftin<Liftin_iniok are satisfied. These two conditions are specifically for determining whether or not the short arm is held in the state in contact with the minimum lift stopper 67a. Dliftin_stp represents a predetermined threshold value for determining that the valve lift Liftin has not changed.

If the answer to the question of the step 14 is negative (NO), i.e. if the valve lift Liftin has not reached the threshold value Liftin_iniok or the valve lift is changing, the process proceeds to a step 17, where it is determined whether or not the timer value Tm_ini of the initialization timer is larger than a predetermined failure determination value TM_INI_NG. If the answer to this question is negative (NO), the present process is immediately terminated.

On the other hand, if the answer to the question of the step 14 is affirmative (YES), i.e. the valve lift Liftin has becomes smaller than the threshold value Liftin_iniok and is no longer changing, which means that the short arm is in contact with the minimum lift stopper 67a, the process proceeds to a step 15, wherein the lift correction value Comp_Liftin is set to a value (Liftin_ad-Liftin_L) obtained by subtracting the minimum value from the detection value of the valve lift. As will be described hereinafter, the lift correction value Comp_Liftin is used for correcting the detection value Liftin_ad of the valve lift, i.e. for calibration of the pivot angle sensor 23.

Then, the process proceeds to a step 16, wherein the initialization termination flag F_ini_done indicative of termination of the initialization is set to 1, followed by terminating the present process.

On the other hand, if the answer to the question of the step 17 is affirmative (YES), it is determined that the variable valve lift mechanism 50 is faulty, since the valve lift Liftin has not reached the threshold value Liftin_iniok or the degree of change thereof is large, even after the lapse of sufficiently long time, so that the process proceeds to a step 18, wherein the lift failure flag F_LIFTNG is set to 1 to indicate the fact, followed by terminating the present process.

Then, the process returns to the flowchart shown in FIG. 22 to terminate the present process after thus executing the initialization process in the step 5.

On the other hand, if the answer to the question of the step 3 is affirmative (YES), i.e. if the lift correction value Comp_Liftin has been calculated in the initialization process in the step 5, the process proceeds to a step 6, wherein the valve lift Liftin is set to a value (Liftin_ad-Comp_Liftin) obtained by subtracting the lift correction value form the detection value of the valve lift. In other words, the valve lift Liftin is calculated by correcting the detection value Liftin_ad by the lift correction value Comp_Liftin, thus executing the calibration of the pivot angle sensor 23. After thus calculating the valve lift Liftin in the step 6, the process proceeds to a step 7. In the meanwhile, when the answer to the question of the step 2 is affirmative (YES) as well, the process proceeds to the step 7.

In the step 7 following the step 2 or the step 6, a failure determination process is executed. In the failure determination process, as described hereinafter, when it is determined at least one of the three variable mechanisms is faulty, a variable mechanism failure flag F_VDNG is set to 1 to indicate the fact. Otherwise, a movable mechanism failure flag F_VDNG is set to 0.

More specifically, the determination of failure of the variable valve lift mechanism 50 is executed according to the value of the aforementioned lift failure flag F_LIFTNG. Further, the determination of failure of the variable cam phase mechanism is executed as follows: When the absolute value of the difference between the cam phase Cain and the target cam phase Cain_cmd continues to be larger than a predetermined threshold value for more than a predetermined time period, or when the absolute value of the phase control input Ucain continues to be more than a predetermined threshold value for more than a predetermined time period, the variable cam phase mechanism is determined to be faulty. Otherwise, the variable cam phase mechanism is determined to be normal.

Further, the determination of failure of the variable compression ratio mechanism 80 is executed as follows: When the absolute value of the difference between the compression ratio Cr and the target compression ratio Cr_cmd continues to be larger than a predetermined threshold value for more than a predetermined time period, or when the absolute value of the compression ratio control input Ucr continues to be more than a predetermined threshold value for more than a predetermined time period, the variable compression ratio mechanism 80 is determined to be faulty. Otherwise, the variable compression ratio mechanism 80 is determined to be normal.

In a step 8 following the step 7, a control input calculating process is executed as described hereinafter, followed by terminating the present process.

Figure 24:
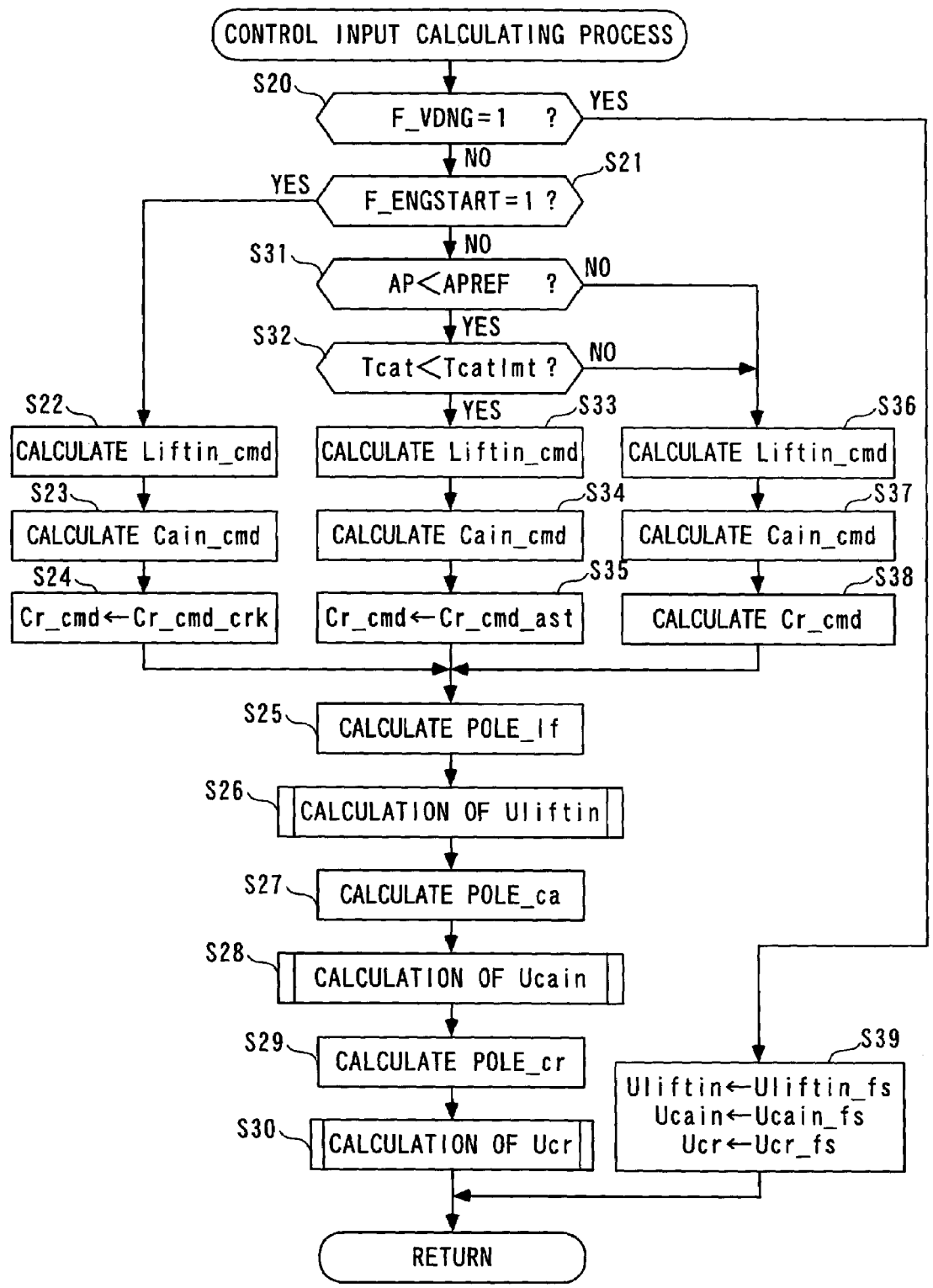
FIG. 24 is a flowchart showing a control input-calculating process.

Next, the control input calculating process will be described with reference to FIG. 24. In this process, first, in the step 20, it is determined whether or not the variable mechanism determination flag F_VDNG is equal to 1. If the answer to this question is negative (NO), i.e. if the three variable mechanisms are all normal, the process proceeds to a step 21, wherein it is determined whether or not an engine start flag F_ENGSTART is equal to 1.

The engine start flag F_ENGSTART is set by determining in a determination process, not shown, based on the engine speed NE and the output signal from the IG·SW 27 whether or not the engine is being subjected to starting control, i.e. being cranked. More specifically, when the engine is being subjected to starting control, the engine start flag F_ENGSTART is set to 1, and otherwise to 0.

Figure 25:
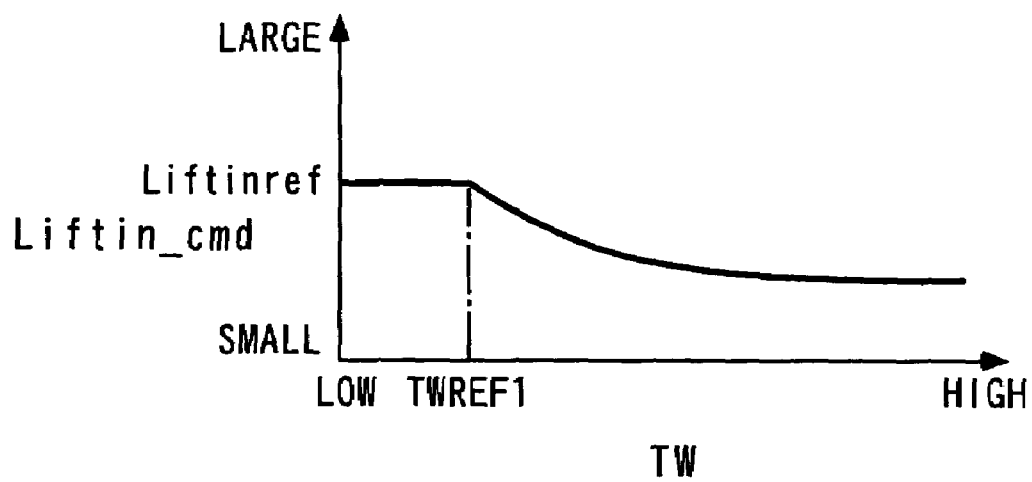
FIG. 25 is a diagram showing an example of a table for use in calculating the target valve lift Liftin_cmd during starting of the engine.

If the answer to the question of the step 21 is affirmative (YES), i.e. if the engine starting control is being executed, the process proceeds to a step 22, wherein the target valve lift Liftin_cmd is calculated by searching a table shown in FIG. 25 according to the engine coolant temperature TW.

In this table, in a range where the engine coolant temperature TW is higher than a predetermined value TWREF1, the target valve lift Liftin_cmd is set to a larger value as the engine coolant temperature TW is lower, and in a range where TW≦TWREF1 holds, the target valve lift Liftin_cmd is set to a predetermined value Liftinref. This is to compensate for an increase in friction of the variable valve lift mechanism 50, which is caused when the engine coolant temperature TW is low.

It should be noted that in the calculation of the target valve lift Liftin_cmd in the step 22, when the table-retrieved value becomes equal to the minimum value Liftin_L, the target valve lift Liftin_cmd is set to the minimum hold value Liftin_LL smaller than the minimum value Liftin_L, whereas when the table-retrieved value becomes equal to the maximum value Liftin_H, the target valve lift Liftin_cmd is set to the maximum hold value Liftin_HH larger than the maximum value Liftin_H. This is, as described hereinabove, to positively bring is the short arm into contact with the minimum and maximum lift stoppers 67a and 67b, and the target valve lift Liftin_cmd is calculated also by map retrieval in steps 33 and 36, referred to hereinafter, which is executed in the same manner for the same reason described above.

Figure 26:
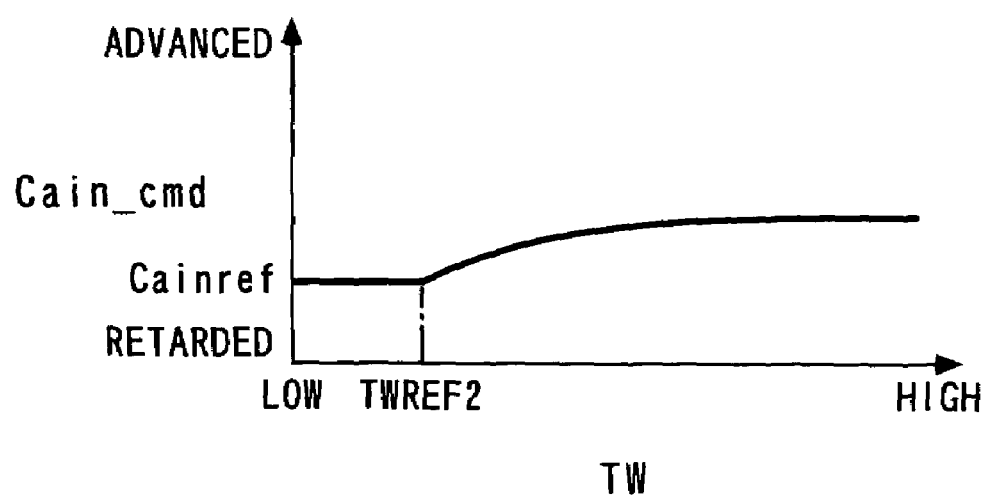
FIG. 26 is a diagram showing, by way of example, a table for use in calculating a target cam phase Cain_cmd during starting of the engine.

Then, in a step 23, the target cam phase Cain_cmd is calculated by searching a table shown in FIG. 26 according to the engine coolant temperature TW.

In this table, in a range where the engine coolant temperature TW is higher than a predetermined value TWREF2, the target cam phase Cain_cmd is set to a more retarded value as the engine coolant temperature TW is lower, and in a range where TW≦TWREF2 holds, the target cam phase Cain_cmd is set to a predetermined value Cainref. This is to ensure the combustion stability of the engine 3 by controlling the cam phase Cain to a more retarded value when the engine coolant temperature TW is low than when the engine coolant temperature TW is high, to thereby reduce the valve overlap, to increase the flow velocity of intake air.

In the calculation of the target cam phase Cain_cmd in the step 23, when the table-retrieved value becomes equal to the most retarded value Cain_L, the target cam phase Cain_cmd is set to the most retarded hold value Cain_LL more retarded than the most retarded value Cain_L, whereas when the table-retrieved value becomes equal to the most advanced value Cain_H, the target cam phase Cain_cmd is set to the most advanced hold value Cain_HH more advanced than the most advanced value Cain_H. This is to positively bring the arm 74b of the electromagnetic brake 72 into contact with the most retarded and most advanced stoppers 73a and 73b, and the target cam phase Cain_cmd is calculated also by map retrieval in steps 34 and 37, referred to hereinafter, which is executed in the same manner for the same reason described above.

Then, in a step 24, the target compression ratio Cr_cmd is set to a predetermined start-time value Cr_cmd_crk. The start-time value Cr_cmd_crk is set to a value on a low compression ratio side, which is capable of increasing the engine speed NE during execution of cranking of the engine 3 to suppress generation of unburned HC.

Subsequently, the process proceeds to a step 25, wherein as described hereinabove, the switching function-setting parameter POLE_lf is calculated by retrieving the table shown in FIG. 15 according to the valve lift Liftin, and thereafter, the process proceeds to a step 26, wherein the lift control input Uliftin is calculated with the target value filter-type two-degree-of-freedom control algorithm expressed by the aforementioned equations (3) to (10).

Next, the process proceeds to a step 27, wherein as described hereinabove, the switching function-setting parameter POLE_ca is calculated by retrieving the table shown in FIG. 18 according to the cam phase Cain, and thereafter, the process proceeds to a step 28, wherein the phase control input Ucain is calculated with a target value filter-type two-degree-of-freedom control algorithm expressed by the aforementioned equations (14) to (21).

Then, the process proceeds to a step 29, wherein as described hereinabove, the switching function-setting parameter POLE_cr is calculated by searching the table shown in FIG. 20 according to the compression ratio Cr Cain, and thereafter, the process proceeds to a step 30, wherein the compression ratio control input Ucr is calculated with the target value filter-type two-degree-of-freedom control algorithm expressed by the aforementioned equations (25) to (32). After calculating the compression ratio control input Ucr in the above step 30, the present process is terminated.

On the other hand, if the answer to the question of the step 21 is negative (NO), i.e. if the engine starting control is not being executed, the process proceeds to a step 31, wherein it is determined whether or not the accelerator pedal opening AP is smaller than the predetermined value APREF. If the answer to this question is affirmative (YES), i.e. if the accelerator pedal is not stepped on, the process proceeds to a step 32, wherein it is determined whether or not a timer value Tcat for a catalyst warmup timer is smaller than a predetermined value Tcatlmt. The catalyst warmup timer measures time over which a catalyst warmup control process is executed, and is implemented by an up-count timer.

Figure 27:
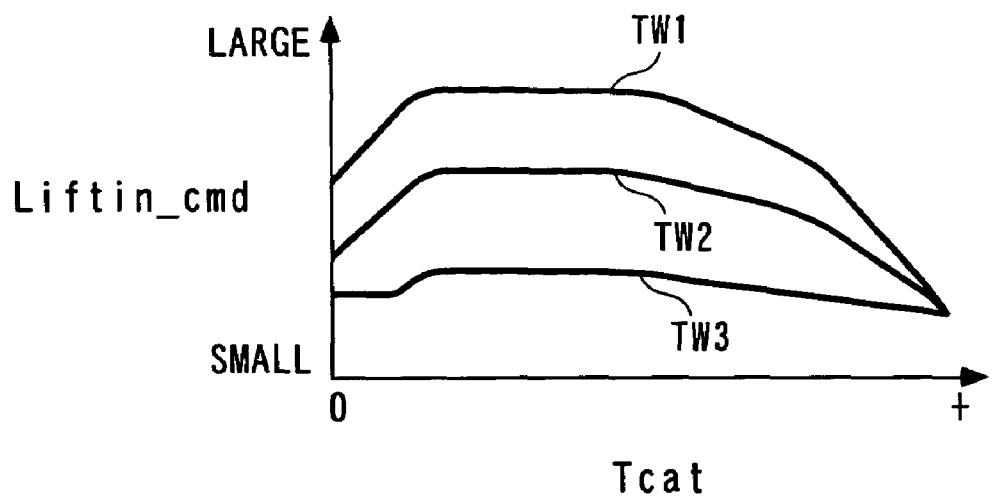
FIG. 27 is a diagram showing, by way of example, a map for use in calculating a target valve lift Liftin_cmd during catalyst warmup control.

If the answer to this question is affirmative (YES), i.e. if Tcat<Tcatlmt holds, it is judged that the catalyst warmup control should be executed, and the process proceeds to a step 33, wherein the target valve lift Liftin_cmd is calculated by searching a map shown in FIG. 27 according to the timer value Tcat of the catalyst warmup timer and the engine coolant temperature TW. In FIG. 27, TW1 to TW3 indicate predetermined values of the engine coolant temperature TW, between which the relationship of TW1<TW2<TW3 holds. This also applies to the following description.

In this map, the target valve lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, in a region where the timer value Tcat of the catalyst warmup timer is small, the target valve lift Liftin_cmd is set to a larger value as the time value Tcat is larger, whereas in a region where the timer value Tcat of the catalyst warmup timer is large, the target valve lift Liftin_cmd is set to a smaller value as the time value Tcat is larger. This is because the warming up of the engine 3 proceeds along with the lapse of time during which the catalyst warmup control is executed, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Figure 28:
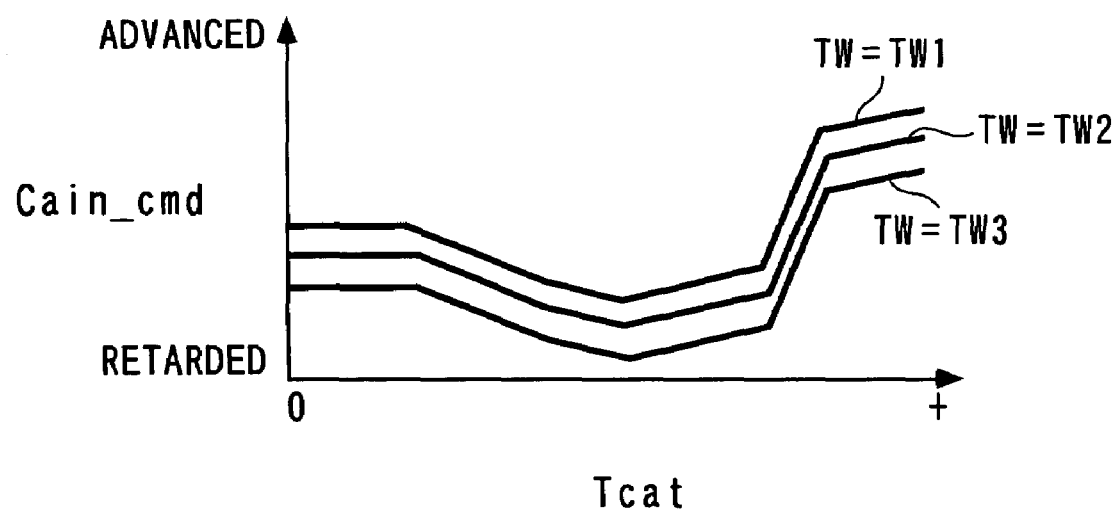
FIG. 28 is a diagram showing, by way of example, a map for use in calculating the target cam phase Cain_cmd during the catalyst warmup control.

Then, in a step 34, the target cam phase Cain_cmd is calculated by searching a map shown in FIG. 28 according to the timer value Tcat of the catalyst warmup timer and the engine coolant temperature TW.

In this map, the target cam phase Cain_cmd is set to a more advanced value as the engine coolant temperature TW is lower. This is because as the engine coolant temperature TW is lower, it takes a longer time period to activate the catalyst, as described above, and hence the pumping loss is reduced to increase the intake air amount to thereby shorten the time period required for activating the catalyst. Furthermore, in the above map, in a region where the timer value Tcat of the catalyst warmup timer is small, the target cam phase Cain_cmd is set to a more retarded value as the timer value Tcat is larger, whereas in a region where timer value Tcat is large, the target cam phase Cain_cmd is set to a more advanced value as the timer value Tcat is larger. The reason for this is the same as given in the description of the FIG. 27 map.

Then, in a step 35, the target compression ratio Cr_cmd is set to a predetermined warmup control value Cr_cmd_ast. The warmup control value Cr_cmd_ast is set to a value on a low compression ratio side, which is capable of reducing heat efficiency, and increasing the temperature of exhaust gases so as to shorten the time period required for activating the catalyst.

Following the step 35, the steps 25 to 30 are carried out, as described hereinabove, followed by terminating the present process.

Figure 29:
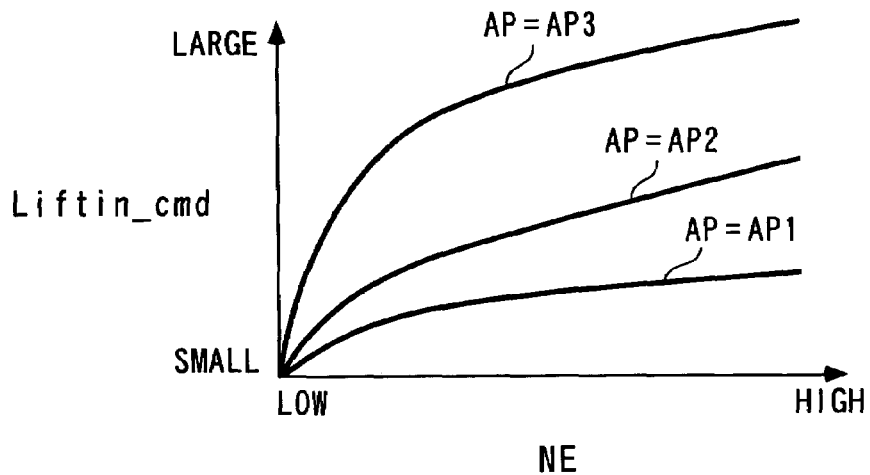
FIG. 29 is a diagram showing, by way of example, a map for use in calculating the target valve lift Liftin_cmd during normal operation of a vehicle.

On the other hand, if the answer to the question of the step 31 or the step 32 is negative (NO), i.e. if the accelerator pedal is stepped on, or if the Tcat≧Tcatlmt holds, the process proceeds to a step 36, wherein the target valve lift Liftin_cmd is calculated by searching a map shown in FIG. 29 according to the engine speed NE and the accelerator pedal opening AP. In FIG. 29, AP1 to AP3 indicate predetermined values of the accelerator pedal opening AP, between which the relationship of AP1<AP2<AP3 holds. This also applies to the following description.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 30:
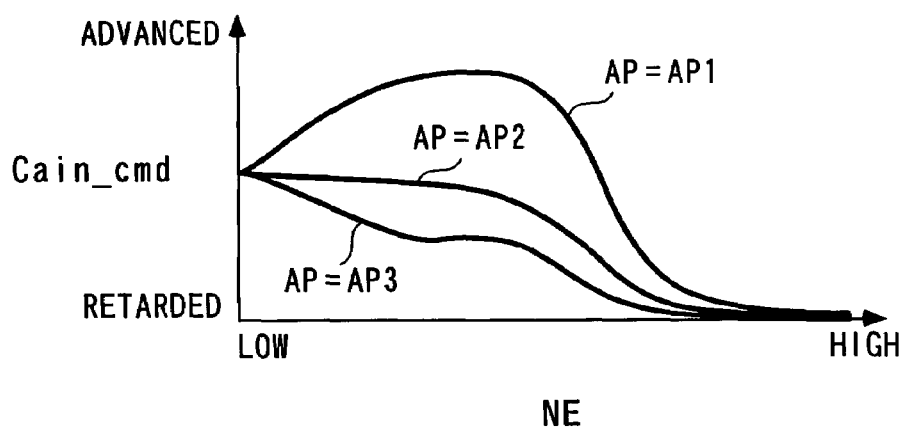
FIG. 30 is a diagram showing, by way of example, a map for use in calculating the target cam phase Cain_cmd during the normal operation of the vehicle.

Then, in a step 37, the target cam phase Cain_cmd is calculated by searching a map shown in FIG. 30 according to the engine speed NE and the accelerator pedal opening AP. In this map, when the accelerator pedal opening AP is small and the engine speed NE is in the medium rotational speed region, the target cam phase Cain_cmd is set to a more advanced value than otherwise. This is because under the above operating conditions of the engine 3, it is necessary to reduce the internal EGR amount to reduce the pumping loss.

Figure 31:
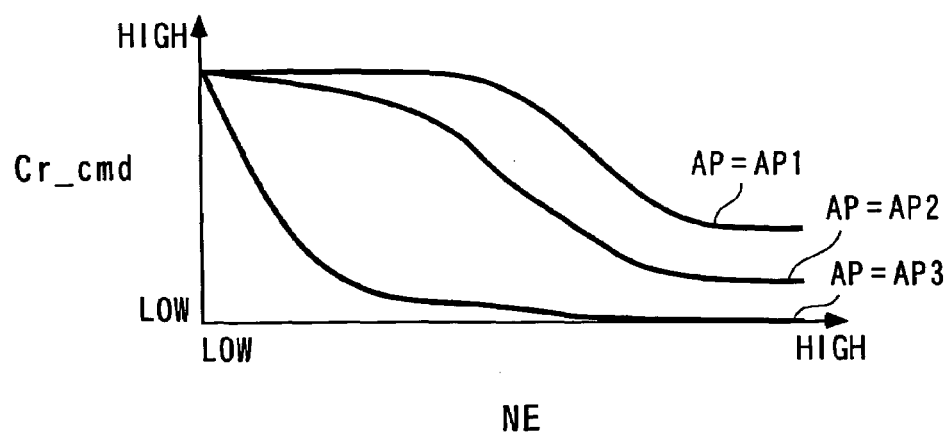
FIG. 31 is a diagram showing, by way of example, a map for use in calculating a target compression ratio Cr_cmd during the normal operation of the vehicle.

Next, in a step 38, the target compression ratio Cr_cmd is calculated by searching a map shown in FIG. 31 according to the engine speed NE and the accelerator pedal opening AP. In this map, the target compression ratio Cr_cmd is set to a smaller value as the engine speed NE is higher, or as the accelerator pedal opening AP is larger. This is because as the engine 3 is in a higher-load region, in other words, as knocking is more liable to occur, the target compression ratio Cr_cmd is set to a lower compression ratio, whereby the ignition timing is avoided from being excessively retarded to prevent reduction of the combustion efficiency.

In the calculation of the target compression ratio Cr_cmd in the step 38, when the map-retrieved value becomes equal to the minimum value Cr_L, the target compression ratio Cr_cmd is set to the minimum hold value Cr_LL smaller than the minimum value Cr_L, whereas when the map-retrieved value becomes equal to the maximum value Cr_H, the target compression ratio Cr_cmd is set to the maximum hold value Cr_HH larger than the maximum value Cr_H. This is to positively bring the arm 85*b* into contact with the minimum compression ratio and maximum compression ratio stoppers 86*a* and 86*b*.

Following the step 38, the steps 25 to 30 are carried out, as described hereinabove. After that, the present process is terminated.

On the other hand, if the answer to the question of the step 20 is affirmative (YES), i.e. if at least one of the three variable mechanisms is faulty, the process proceeds to a step 39, wherein the lift control input Uliftin is set to the predetermined failure time value Uliftin_fs; the phase control input Ucain to the predetermined failure time value Ucain_fs; and the compression ratio control input Ucr to the predetermined failure time value Ucr_fs, followed by terminating the present process. As a result, as described above, the valve lift Liftin is held at the minimum value Liftin_L; the cam phase Cain at the most retarded value Cain_L; and the compression ratio Cr at the minimum value Cr_L, whereby it is possible to suitably carry out idling or starting of the engine 3 during stoppage of the vehicle, and at the same time hold the vehicle in the state of low-speed traveling when the vehicle is traveling.

Next, a description will be given of results of the control executed by the control system 1 according to the present embodiment, configured as described hereinabove. FIG. 32 shows results the above-described initialization process executed on the variable valve lift mechanism 50. As shown in FIG. 32, assuming that after the IG·SW 27 in the OFF state is turned on (after time to), the target valve lift Liftin_cmd changes toward the minimum hold value Liftin_LL as time elapses, and finally becomes equal to the minimum hold value Liftin_LL, the valve lift Liftin, i.e. the detection value Liftin_ad crosses the threshold value Liftin_iniok and then becomes smaller than the threshold value Liftin_VPL (time t1), whereafter the switching function-setting parameter POLE_lf changes from the predetermined value POLE_lf1 toward the predetermined value POLE_lf2, and is finally set to the predetermined value POLE_lf2.

As described above, by setting the switching function-setting parameter POLE_lf to the predetermined value POLE_lf2 closer to a value of −1, the disturbance suppressing capability is lowered to allow an increase in the follow-up error E_lf, so that while maintaining the rotational speed or the speed of pivotal motion of the short arm toward the minimum lift stopper 67a at a value assumed when the parameter is equal to the predetermined value POLE_lf1, the driving force applied to the short arm by the lift control input Uliftin is reduced to thereby reduce the impact occurring when the short arm is brought into contact with the minimum lift stopper 67a. Moreover, by setting the target valve lift Liftin_cmd to the minimum hold value Liftin_LL, the short arm is positively held in contact with the minimum lift stopper 67a, whereby the correction value Comp_Liftin is properly calculated. As a result, the valve lift Liftin is calculated as a value indicative of the value of the actual valve lift without being affected by aging of the variable valve lift mechanism 50. In short, the calibration of the pivot angle sensor 23 is properly carried out.

Figure 33:
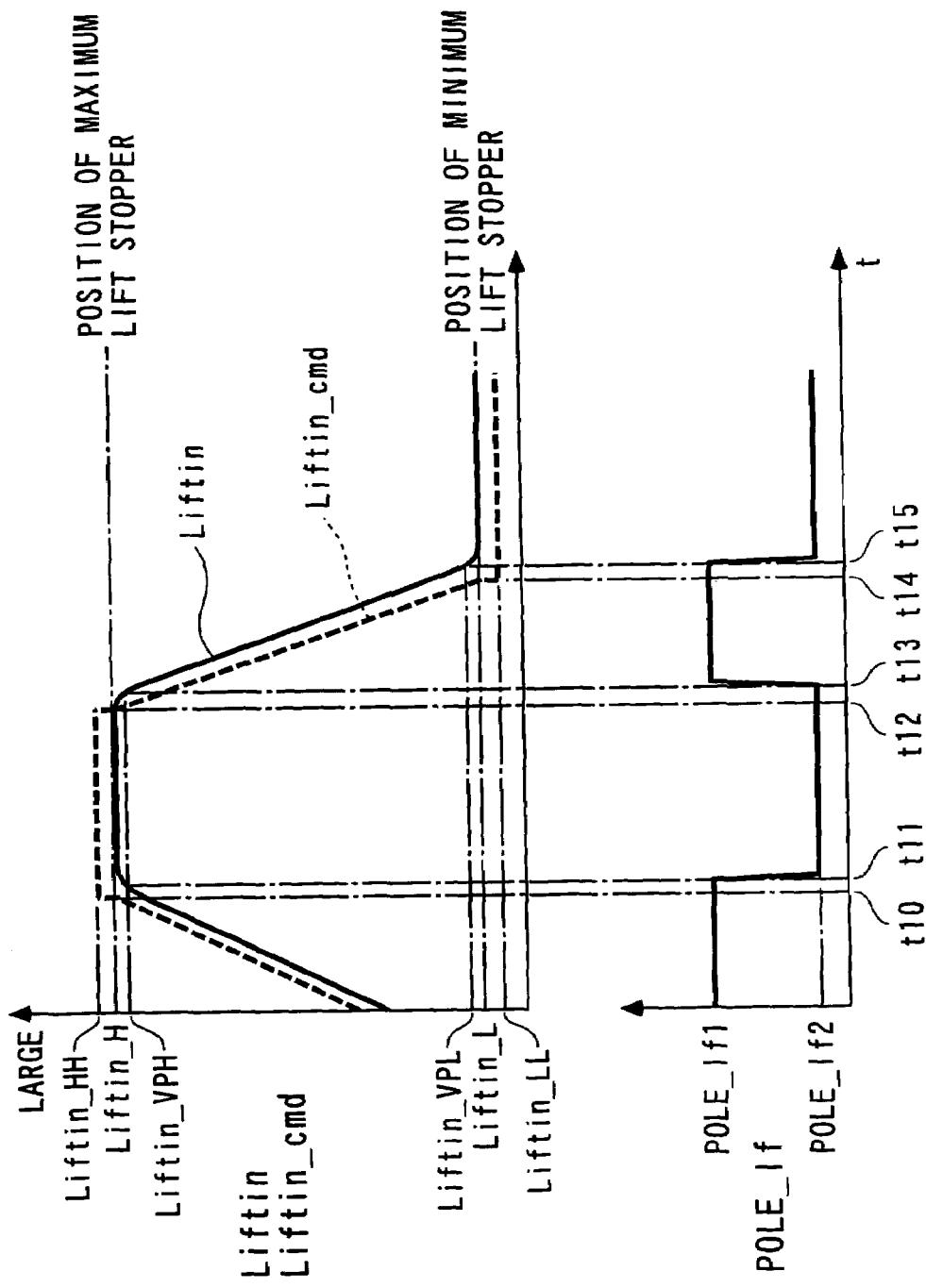
FIG. 33 is a timing diagram showing control results obtained when the valve lift Liftin is controlled between the minimum value Liftin_L and the maximum value Liftin_H.

FIG. 33 shows results of control executed on the variable valve lift mechanism 50 obtained when the valve lift Liftin is changed between the minimum value Liftin_L and the maximum value Liftin_H. As shown in FIG. 33, when the table-retrieved value or map-retrieved value of the target valve lift Liftin_cmd becomes equal to the maximum value Liftin_H (time t10), the target valve lift Liftin_cmd is set to the maximum hold value Liftin_HH. Then, at a time point the valve lift Liftin crosses the predetermined threshold value Liftin_VPH (time t11), the switching function-setting parameter POLE_lf is set such it changes from the predetermined value POLE_lf1 toward the predetermined value POLE_lf2 close to a value of −1. Accordingly, while maintaining the rotational speed or the speed of pivotal motion of the short arm 65 toward the maximum lift stopper 67b at a value assumed before the change of the switching function-setting parameter POLE_lf, the driving force applied to the short arm by the lift control input Uliftin is reduced to thereby reduce the impact occurring when the short arm is brought into contact with the maximum lift stopper 67b.

Further, when the table-retrieved value or map-retrieved value of the target valve lift Liftin_cmd becomes smaller than the maximum value Liftin_H (time t12), the target valve lift Liftin_cmd is set to the retrieved value. Then, at a time point the valve lift Liftin crosses the threshold value Liftin_VPH (time t13), the switching function-setting parameter POLE_lf is set such it changes from the predetermined value POLE_lf2 toward the predetermined value POLE_lf1 close to a value of 0. This increases the driving force applied to the short arm in the direction of the minimum lift stopper 67a. Thereafter, when the table-retrieved or map-retrieved value of the target valve lift Liftin_cmd becomes equal to the minimum value (time t14), the target valve lift Liftin_cmd is set to the minimum hold value Liftin_LL. Then, at a time point the valve lift Liftin goes beyond i.e. changes across the predetermined threshold value Liftin_VPL (time t15), the switching function-setting parameter POLE_lf is set such that it changes from the predetermined value POLE_lf1 to the predetermined value POLE_lf2 close to a value of −1, whereby the impact occurring when the short arm 65 is brought into contact with the minimum lift stopper 67a is reduced.

As described heretofore, according to the control system 1 of the present embodiment, the lift control input Uliftin for controlling the variable valve lift mechanism 50 is calculated with the target value filter-type two-degree-of-freedom sliding mode control algorithm expressed by the equations (3) to (10), such that the valve lift Liftin follows up and converges to the target valve lift Liftin_cmd. The control algorithm includes a sliding mode control algorithm, and hence only by changing the value of the switching function-setting parameter POLE_lf within a range of −1<POLE_lf<0, the disturbance suppressing capability can be promptly changed without spoiling the stability of the control system. More specifically, the lift control input Uliftin is calculated such that as the switching function-setting parameter POLE_lf is set to a value closer to a value of −1, the disturbance suppressing capability is reduced. In this case, as described hereinbefore, the switching function-setting parameter POLE_lf is set to a value closer to a value of −1, when the valve lift is in a range of Liftin<Liftin_VPL or in a range of Liftin_VPH<Liftin than when it is in the other ranges. Particularly, when the valve lift is in a range of Liftin<Liftin_ML, or in a range of Liftin_MH<Liftin, the switching function-setting parameter POLE_lf is set to the predetermined value POLE_lf2 closer to a value of −1.

Therefore, during actuation i.e. driving of the short arm of the actuator toward the minimum valve lift stopper 67a or toward the maximum valve lift stopper 67b, when the valve lift Liftin reaches the threshold value Liftin_VPL or the threshold value Liftin_VPH, i.e. when the short arm has reaches a location in the vicinity of the minimum lift stopper 67a or the maximum lift stopper 67b, the short arm of the actuator is driven toward the minimum lift stopper 67a or the maximum lift stopper 67b in a state where the sensitivity of the control in increasing or decreasing the driving force applied to the short arm in response to an increase or decrease in the follow-up error E_lf is lower than before the change of the setting. This makes it possible to reduce the impact occurring when the short arm is brought into contact with the minimum lift stopper 67a or the maximum lift stopper 67b, thereby prevent the short arm 65, the minimum lift stopper 67a, and the maximum lift stopper 67b from being deformed, and prolong the life of the variable valve lift mechanism 50. Furthermore, with the characteristic of the control algorithm, the impact can be reduced without lowering the rotational speed of the short arm 65, which makes it possible to avoid lengthening of the required driving time. As described above, it is possible to carry out the reduction of the impact and shortening of driving time in a compatible manner. What is more, it is not necessary to carry out modification of the design concerning the structure, such as provision of shock absorbing members for the short arm 65, the minimum lift stopper 67a, and the maximum lift stopper 67b, which makes it possible to reduce the manufacturing cost, and increase the freedom of design.

Also as described hereinbefore, the lift control input Uliftin is calculated with the target value filter-type two-degree-of-freedom sliding mode control algorithm, and hence it is possible to properly set the convergence speed of the valve lift Liftin toward the target valve lift Liftin_cmd with the target value filter algorithm, and properly set the convergence behavior of the valve lift Liftin toward the filtered value Liftin_cmd_f of the target valve lift, i.e. follow-up convergence of the valve lift Liftin toward the target valve lift Liftin_cmd, with the sliding mode control algorithm. This makes it possible to cause the valve lift Liftin to accurately follow up the target valve lift Liftin_cmd while avoiding occurrence of overshooting. As a result, when the short arm is driven toward the minimum lift stopper 67a or the maximum lift stopper 67b, it is possible to more positively reduce the impact occurring when the short arm is brought into contact with the minimum lift stopper 67a or the maximum lift stopper 67b.

In general, in a movable mechanism, such as the variable valve lift mechanism 50, when the short arm is actuated up to the minimum lift stopper 67a or the maximum lift stopper 67b, if the target valve lift Liftin_cmd is set to the minimum value Liftin_L or the maximum value Liftin_H, due to variation in individual units and aging of the variable valve lift mechanism 50, there is a possibility that the short does not reach the minimum lift stopper 67a or the maximum lift stopper 67b. However, according to the present control system 1, when the table-retrieved or the map-retrieved value of the target valve lift Liftin_cmd becomes equal to the maximum value Liftin_H, the target valve lift Liftin_cmd is set to the predetermined maximum hold value Liftin_HH larger than the maximum value Liftin_H, and hence the short arm can be positively actuated up to the maximum lift stopper 67b to thereby bring the same into contact therewith. Similarly, when the table-retrieved or the map-retrieved value of the target valve lift Liftin_cmd becomes equal to the minimum value Liftin_L, the target valve lift Liftin_cmd is set to the predetermined maximum hold value Liftin_LL smaller than the minimum value Liftin_L, and hence the short arm can be positively actuated up to the minimum lift stopper 67a to thereby positively bring the same into contact therewith.

As a result, in the initialization described hereinbefore, by intentionally creating the state in which the short arm is in contact with the minimum lift stopper 67a, it is possible to properly calculate the lift correction value Comp_Liftin, and perform the valve lift control using the valve lift Liftin obtained by correcting the detection value Liftin_ad by the correction value Comp_Liftin. That is, the valve lift Liftin can be properly corrected, by causing deviation of the detection value Liftin_ad from the actual value Liftin_L due to aging of the variable valve lift mechanism 50 to be reflected thereon, and the calibration of the pivot angle sensor 23 can be properly carried out, whereby the control accuracy can be enhanced.

Further, the phase control input Ucain is also calculated, similarly to the case of the lift control input Uliftin, with the control algorithms expressed by the equations (14) to (21), and the switching function-setting parameter POLE_ca is also set similarly to the switching function-setting parameter POLE_lf, and hence the effects described above can be obtained. More specifically, when the arm 74b of the electromagnetic brake 72 is driven toward the two stoppers 73a and 73b, the impact occurring when the short arm 75 is brought into contact with the stoppers 73a and 73b can be reduced and the driving speed can be shortened, in a compatible manner.

Further, the compression ratio control input Ucr is also calculated, similarly to the case of the lift control input Uliftin, with the control algorithms expressed by the equation (25) to (32), and the switching function-setting parameter POLE_cr is also set similarly to the switching function-setting parameter POLE_lf, and hence provides the advantageous effects as described hereinbefore as to the switching function-setting parameter POLE_lf. That is, it is possible to reduce the impact occurring when the arm 85b of the compression ratio actuator 85 is brought into contact with the two stoppers 86a and 86b and the required driving time in a compatible manner.

Although the first embodiment is an example of application of the control system 1 according to the present invention to a movable mechanism in which a movable part thereof is brought into two restricting parts, this is not limitative, but it can be applied to a movable mechanism in which the movable part is brought into one or three or more restricting parts. For example, as the movable mechanism, there may be employed a variable valve lift mechanism 50 which is provided with only the maximum lift stopper 67b. Further, in the variable valve lift mechanism 50, a retractable stopper may be provided in the pivotally movable range of the short arm between the maximum lift stopper 67b and the minimum lift stopper 67a, and the short arm may be brought into contact with the retractable stopper as required.

Further, although the first embodiment is an example in which when the short arm has been driven to the vicinity of the minimum lift stopper 67a or the maximum lift stopper 67b, the value of the switching function-setting parameter POLE_lf is changed from the predetermined value POLE_lf1 to the predetermined value POLE_lf2, by searching the table shown in FIG. 15, the method of changing the value of the switching function-setting parameter POLE_lf is not limited to this, but any suitable method may be employed insofar as the value of the switching function-setting parameter POLE_lf is changed from the predetermined value POLE_lf1 to the predetermined value POLE_lf2 when the short arm has been driven to the vicinity of the minimum lift stopper 67a or the maximum lift stopper 67b. For example, a table in which the abscissa in the FIG. 15 table is changed to represent predetermined values of the pivot angle θ lift of the short arm detected by the pivot angle sensor 23 may be searched according to the detection value of the pivot angle θ lift to thereby calculate the value of the switching function-setting parameter POLE_lf, and when the pivot angle θ lift shows a value indicating that the short arm has been driven to the vicinity of the minimum lift stopper 67a or the maximum lift stopper 67b, the switching function-setting parameter POLE_lf may be changed from the predetermined value POLE_lf1 to the predetermined value POLE_lf2.

Further, although the first embodiment is an example in which the target value filter-type two-degree-of-freedom sliding mode control algorithm is employed as the predetermined control algorithm with which the control input for controlling the movable mechanism is calculated such that the control amount follows up a target control amount, this is not limitative, but any suitable control algorithm may be employed insofar as the control input can be calculated such that the control amount follows up the target control amount. For example, there may be employed a general feedback control algorithm, such as a PID control algorithm.

Further, although the first embodiment is an example in which the sliding mode control algorithm is employed as the response-specifying control algorithm, this is not limitative, but any suitable response-specifying control algorithm, such as a back-stepping control algorithm, may be employed insofar as it can specify the response speed of the control amount to the target control amount.

Further, although the first embodiment is an example in which the target value filter-type two-degree-of-freedom sliding mode control algorithm is used as the two-degree-of-freedom control algorithm, it is understood that the two-degree-of-freedom control algorithm is not limited to this. For example, as the two-degree-of-freedom control algorithm, there may be employed a combination of a target value filter-type algorithm, such as a first-order lag filter algorithm, and a feedback control algorithm, such as a PID control algorithm.

Further, although the first embodiment is an example in which the three control inputs ULiftin, Ucain, and Ucr are directly input to the three variable mechanisms, respectively, this is not limitative, but the control inputs may be processed by other electric circuits or controllers, and the resulting values may be input to the movable mechanisms, respectively. For example, the control input Ucain may be modulated with a control algorithm based on a $\Delta\Sigma$ modulation algorithm, and the modulated value may be input to the variable cam phase mechanism 70.

Further, although the first embodiment is an example in which the initialization of the variable valve lift mechanism 50 is executed when the IG·SW 27 in the OFF state is turned on, it is understood that the timing for execution of the initialization is not limited to this. For example, the initialization may be executed after stoppage of the engine 3, or during the fuel cut operation, or during idling. Further, the initializations of the variable cam phase mechanism and the variable compression ratio mechanism 80 may be executed in the same manner as executed on the variable valve lift mechanism 50 in FIG. 22.

Next, a control system 1A according to a second embodiment of the present invention will be described with reference to FIGS. 34 to 36. The control system 1A according to the present embodiment controls a throttle valve mechanism 90 provided in the intake pipe 12 of the internal combustion engine. It should be noted that in the following description, component elements identical to those of the first embodiment are designated by identical reference numerals, and detailed description thereof is omitted.

Figure 34:
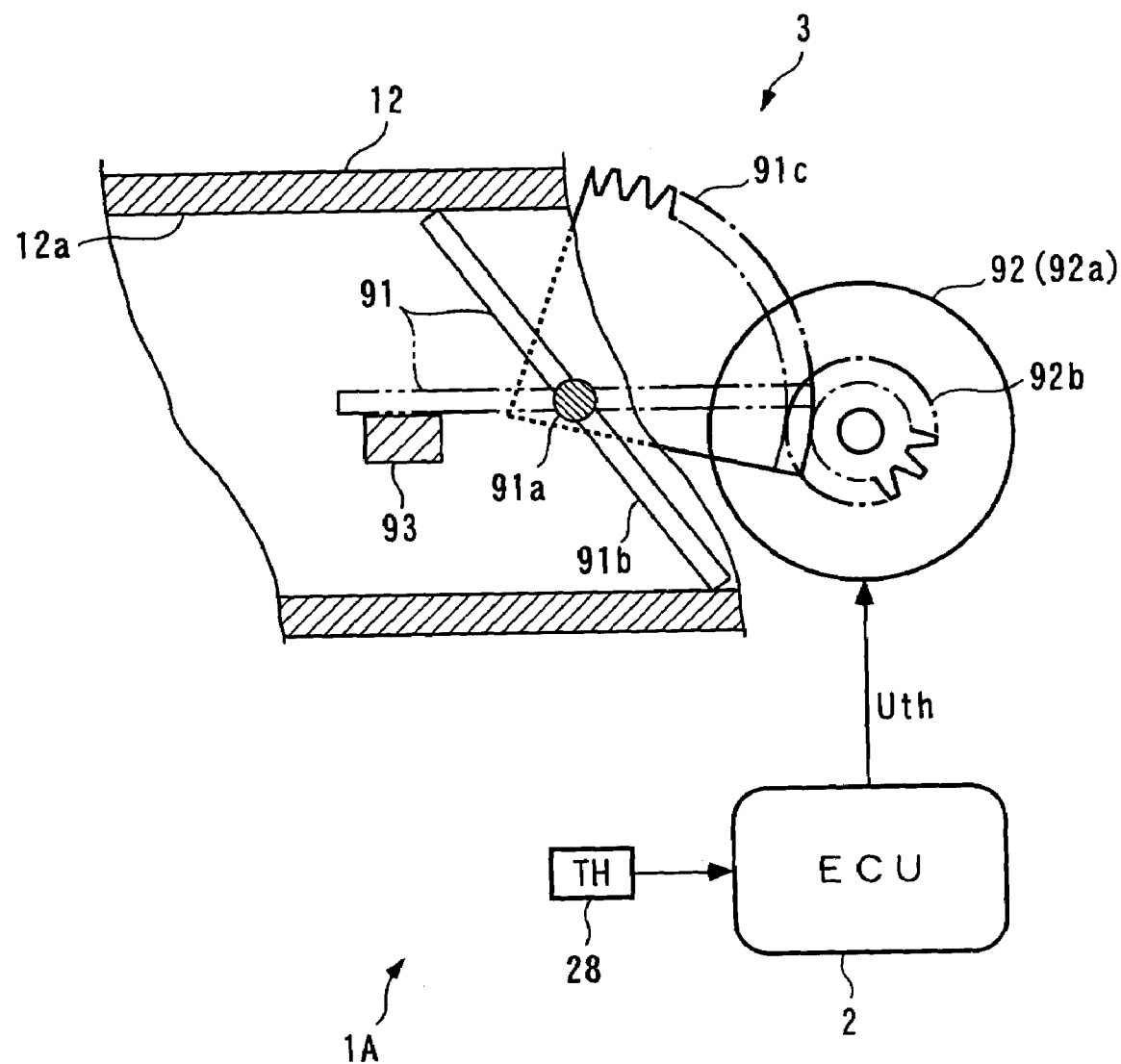
FIG. 34 is a schematic diagram of a control system according to a second embodiment of the present invention, and a throttle valve mechanism to which the control system is applied.
Figure 35:
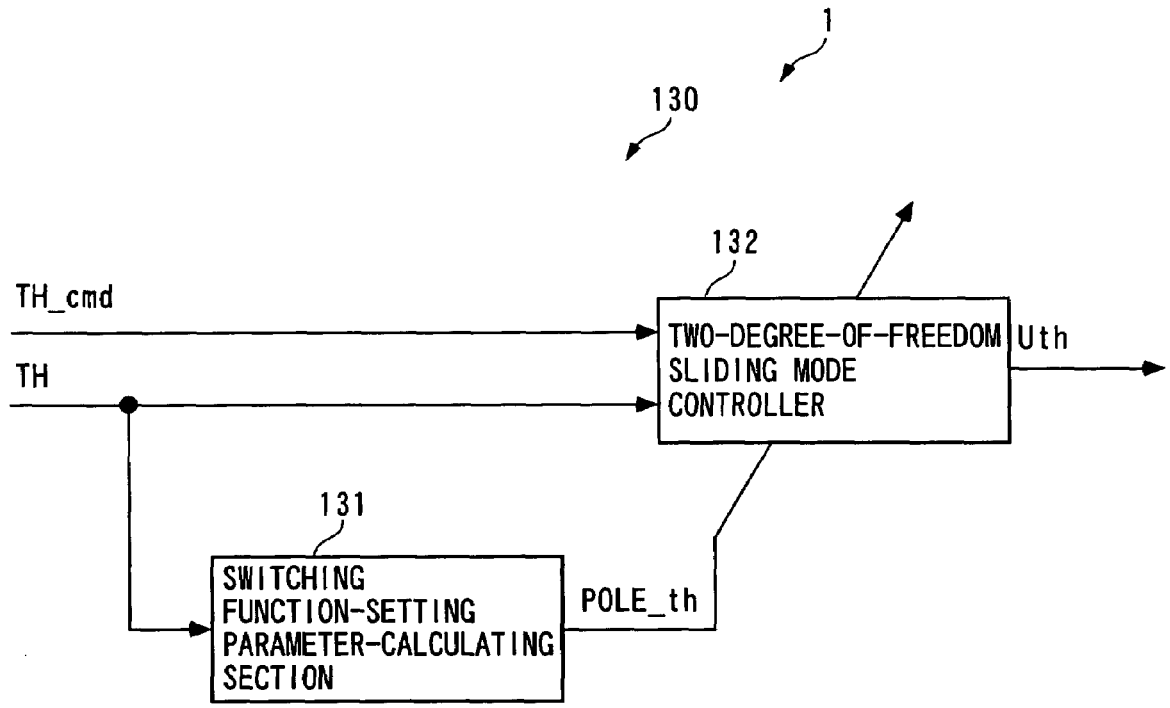
FIG. 35 is a schematic block diagram of a throttle valve opening controller.

As shown in FIG. 34, the throttle valve mechanism 90 is of an electronic control type, and is comprised of a throttle valve 91 provided in an intermediate portion of the intake pipe 12, a TH actuator 92 for actuating the throttle valve 92 for opening and closing the same, and a fully-open stopper 93 for restricting the pivotal motion of the throttle valve 91. In the present embodiment, the throttle valve mechanism 90 corresponds to the movable mechanism, the throttle valve 91 to the movable part, and the intake pipe 12 and the fully-open stopper 93 to the restricting part.

The throttle valve 91 is comprised of a pivot shaft 91a pivotally movably mounted in the intake pipe 12, and a valve element 91b pivotally moved in unison with the pivot shaft 91a, and configured such that the vale element 91b is movable between a fully-closed position (position indicated by solid lines in FIG. 34) where the valve element 91b is in contact with the inner wall of the intake pipe 12 and a fully-open position (position indicated by two-dot chain lines in FIG. 34) where the valve element 91b is in contact with the fully-open stopper 93. When the throttle valve 91 is in the fully-closed position, the throttle valve 91 holds the intake passage 12a in a fully-closed state, whereas when the same is in the fully-open position, the flow rate Gin of air flowing through the intake pipe 12a exhibits its maximum value. The rotating shaft 91a of the throttle valve 91 has a gear 91c, fan-shaped in cross-section, fixedly fitted thereon.

Further, the TH actuator 92 is comprised of a motor 92a connected to the ECU 2, and a gear 92b fixedly fitted on the rotating shaft of the motor 92a, and the gear 92b is in constant mesh with the gear 91c. The TH actuator 92 is driven according to an opening control input Uth from the ECU 2, to thereby pivotally move the throttle valve 91 between the fully-closed position and the fully-open position, whereby the flow rate Gin of air flowing through the intake passage 12a is varied.

Further, the rotating shaft 91a of the throttle valve 91 has two springs, not shown, attached thereto, which urge the throttle valve 91 in a valve-opening direction and a valve-closing direction, respectively. The urging forces of these two springs hold the throttle valve 91 at a predetermined initial opening degree when the opening control input Uth is not input to the TH actuator 92 or set to a failure-time value Uth_fs, referred to hereinafter. The initial opening degree is set to a value (e.g. 6°) close to the fully-closed position and at which an amount of intake air necessary for starting the engine 3 can be secured.

Further, the TH actuator 92 is provided with a throttle valve opening sensor 28 implemented by a potentiometer or the like. The throttle valve opening sensor 28 output a detection signal indicative of a pivot angle θ th of the rotating shaft 91a of the throttle valve 91. The pivot angle θ th indicates a position of the throttle valve 91 between the fully-closed position and the fully-open position. The ECU calculates the throttle valve opening TH based on the pivot angle θ th. In the present embodiment, the throttle valve opening sensor 28 corresponds to the position detecting means.

In the throttle valve mechanism 90 constructed as above, the throttle valve 91 is actuated between the fully-closed position and the fully-open position, whereby the throttle valve opening TH is varied between a predetermined fully-closed value TH_L and a predetermined fully-open value TH_H. In the present embodiment, the predetermined fully-closed value TH_L and the predetermined fully-open value TH_H correspond to the limit value of the control range.

Next, the control system 1A according to the present embodiment will be described. The control system 1A includes, as shown in FIG. 35, a throttle valve opening controller 130 which calculates the opening control input Uth for controlling the throttle valve mechanism 90. As shown in FIG. 35, the throttle valve opening controller 130 is comprised of a switching function-setting parameter-calculating section 131, and a two-degree-of-freedom SLD controller 132, which are implemented by the ECU 2.

Figure 36:
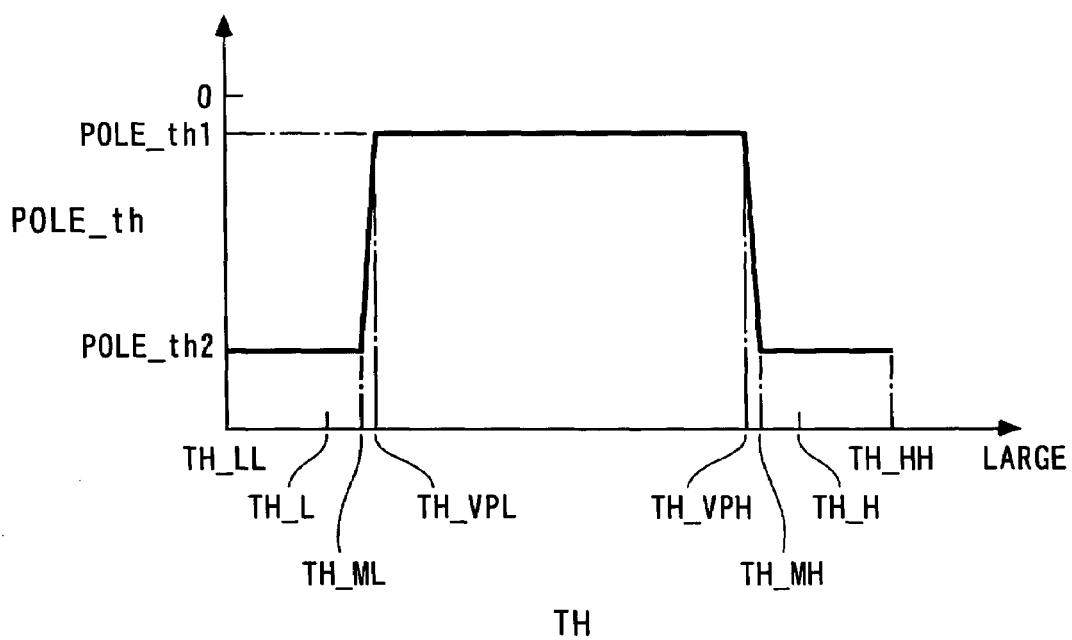
FIG. 36 is a diagram showing, by way of example, a table for use in calculating a switching function-setting parameter POLE_th.

The switching function-setting parameter-calculating section 131 calculates the switching function-setting parameter POLE_th by searching a table shown in FIG. 36 according to the throttle valve opening TH. In FIG. 36, POLE_th1 is set to a predetermined negative value (e.g. a value of −0.2) close to a value of 0, and POLE_th2 is set to a predetermined negative value (e.g. a value of −0.99) close to a value of −1.

Further, TH_LL, TH_ML, TH_VPL, TH_VPH, TH_MH, and TH_HH correspond to respective predetermined values of the throttle valve opening TH set such that the following equations (34) and (35) hold. TH_LL and TH_HH represent a predetermined fully-closed hold value (predetermined value outside the control range) and a predetermined fully-open hold value (predetermined value outside the control range), respectively, and used for holding the throttle valve 91 at the fully-closed position or the fully-open position (i.e. in a state where the throttle valve 91 is in contact with the inner wall of the intake pipe 12 or the fully-open stopper 93). Further, TH_VPL and TH_VPH represent predetermined threshold values (predetermined value close to the limit value), respectively, and Dth_vpole in the following equation (35) represent a predetermined positive value.

$$\text{TH\_LL} < \text{TH\_L} < \text{TH\_ML} < \text{TH\_VPL} < \text{TH\_VPH} < \text{TH\_MH} < \text{TH\_H} < \text{TH\_HH} \tag{34}$$

$$\text{TH\_H} - \text{TH\_VPH} = \text{TH\_VPL} - \text{TH\_L} = \text{Dth\_vpole} \tag{35}$$

In this table, the switching function-setting parameter POLE_th is set to a predetermined value POLE_th2 when the throttle valve opening TH is within a range of TH≦TH_ML or a range of TH_MH≦TH, and to a predetermined value POLE_th1 when the same is within a range of TH_VPL≦TH≦TH_VPH. Further, when the throttle valve opening TH is within a range of TH_ML<TH<TH_VPL, the switching function-setting parameter POLE_th is set to a larger value as the throttle valve opening TH is larger, and when the same is within a range of TH_VPH<TH<TH_MH, the switching function-setting parameter POLE_th is set to a smaller value as the throttle valve opening TH is larger.

In the table shown in FIG. 36, the reason for setting the switching function-setting parameter POLE_th as described above is the same as that for setting the switching function-setting parameter POLE_lf in the table shown in FIG. 15, and detailed description thereof will be given hereinafter.

In the present embodiment, the throttle valve opening controller 130 corresponds to the control input-calculating means, the switching function-setting parameter-calculating section 131 to the disturbance suppressing parameter-setting means, and the switching function-setting parameter POLE_th to the disturbance suppressing parameter and the response-specifying parameter. Further, the fully-closed and fully-open hold values TH_LL and TH_HH correspond to the predetermined value outside the control range, and the threshold values TH_VPL and TH_VPH correspond to the predetermined value close to the limit value.

On the other hand, with the target value filter-type two-degree-of-freedom sliding mode control algorithm expressed by the following equations (36) to (43), the two-degree-of-freedom SLD controller 132 calculates the opening control input Uth based on the throttle valve opening TH and the target throttle valve opening TH_cmd. That is, the opening control input Uth is calculated as a value for causing the throttle valve opening TH to follow up and converge to the target throttle valve opening TH_cmd.

$$TH\_cmd\_f(k) = \qquad (36)$$
$$-POLE\_f\_th \cdot TH\_cmd\_f(k-1) + (1 + POLE\_f\_th) \cdot TH\_cmd(k)$$

$$Uth(k) = Ueq\_th(k) + Urch\_th(k) + Uadp\_th(k) + Unl\_th(k) \qquad (37)$$

$$Ueq\_th(k) = \frac{1}{b1\_th} \qquad (38)$$
$$\{(1 - a1\_th - POLE\_th) \cdot TH(k) + (POLE\_th - a2\_cr) \cdot TH(k-1) -$$
$$b2\_th \cdot Uth(k-1) + TH\_cmd\_f(k) + (POLE\_th - 1) \cdot TH\_cmd$$
$$\_f(k-1) - POLE\_th \cdot TH\_cmd\_f(k-2)\}$$

$$Urch\_th(k) = -\frac{Krch\_th}{b1\_th} \cdot \sigma\_th(k) \qquad (39)$$

$$Uadp\_th(k) = -\frac{Kadp\_th}{b1\_th} \cdot \sum_{i=0}^{k} \sigma\_th(i) \qquad (40)$$

$$Unl\_th(k) = -\frac{Knl\_th}{b1\_th} \cdot sgn(\sigma\_th(k)) \qquad (41)$$

$$\sigma\_th(k) = E\_th(k) + POLE\_th \cdot E\_th(k-1) \qquad (42)$$

$$E\_th(k) = TH(k) - TH\_cmd\_f(k) \qquad (43)$$

In the control algorithm, first, a filtered value TH_cmd_f of the target throttle valve opening is calculated with a target value filter algorithm, i.e. a first-order lag filter algorithm expressed by the equation (36). In the equation (36), POLE_f_th represents a target value filter-setting parameter set to a value which satisfies the relationship of −1<POLE_f_th<0.

Next, the opening control input Uth is calculated with a sliding mode control algorithm expressed by the equations (37) to (43). That is, as shown in the equation (37), the opening control input Uth is calculated as the total sum of an equivalent control input Ueq_th, a reaching law input Urch_th, an adaptive law input Uadp_th, and a non-linear input Unl_th.

The equivalent control input Ueq_th is calculated using the equation (38). In the equation (38), parameters a1_th, a2_th, b1_th, and b2_th represent model parameters of a plant model expressed by an equation (44), referred to hereinafter, which are set to respective predetermined values.

Further, the reaching law input Urch_th is calculated using an equation (39). In the equation (39), Krch_th represents a predetermined reaching law gain, and σ_th represents a switching function defined by the equation (42). E_th in the equation (42) represents a follow-up error (difference) calculated by the equation (43).

Further, the adaptive law input Uadp_th is calculated by the equation (40). In the equation (40), Kadp_th represents a predetermined adaptive law gain. Further, the non-linear input Unl_th is calculated by the equation (41). In the equation (41), Knl_th represents a predetermined non-linear gain, and at the same time, sgn (σ_th) represents a code function, which assumes a value of sgn (σ_th)=1 when σ_th≧0 holds, and a value of sgn (σ_th)=−1 when σ_th<0 holds (it may be configured to assume a value of sgn (σ_th)=0 when σ_th=0 holds.)

The above equations (36) to (43) are derived in the same manner as described hereinbefore: A plant is defined as a system to which is inputted the opening control input Uth and from which is outputted the throttle valve opening TH as the control amount, and modeled into a discrete-time system model, whereby the following equation (44) is obtained. When the target value filter-type two-degree-of-freedom sliding mode control theory is applied to the model defined by the equation (44) such that the throttle valve opening TH follows up and converges to the target throttle valve opening TH_cmd, the aforementioned equations (36) to (43) are derived.

$$TH(k+1) = \qquad (44)$$
$$a1\_th \cdot TH(k) + a2\_th \cdot TH(k-1) + b1\_th \cdot Uth(k) + b2\_th \cdot Uth(k-1)$$

In the control algorithms of the two-degree-of-freedom SLD controller 132, as described hereinabove, by varying the switching function-setting parameter POLE_th within a range of −1<POLE_th<0, it is possible to change disturbance suppressing capability. Therefore, in the table described above with reference to FIG. 36, the switching function-setting parameter POLE_ca is set as described above, so as to reduce impact occurring when the throttle valve 91 is brought into contact with the inner wall of the intake pipe 12 and the fully-open stopper 93. More specifically, in the case where the throttle valve opening TH is controlled toward the fully-closed opening value TH_L, when the throttle valve opening TH becomes closer to the fully-closed opening value TH_L with respect to the threshold value TH_VPL close to the fully-closed opening value TH_L, the switching function-setting parameter POLE_th is set to a value closer to the predetermined value POLE_th2 as the throttle valve opening TH is closer to the fully-closed opening value TH_L. That is, the switching function-setting parameter POLE_th is set to such a value that allows an increase in the follow-up error E_th and reduces the disturbance suppressing capability. As a result, while maintaining the rotational speed assumed before the change of the setting of the switching function-setting parameter POLE_th, the throttle valve 91 is driven toward the inner wall of the intake pipe 12 in a state where the sensitivity of the control in increasing or decreasing the driving force applied to the throttle valve 91 in response to a decrease or increase in the follow-up error E_th is lower than before the change of the setting, whereby the impact occurring when the throttle valve 91 is brought into contact with inner wall of the intake pipe 12 can be reduced.

On the other hand, in the case where the throttle valve opening TH is controlled toward the fully-open opening value TH_H, when the throttle valve opening TH becomes closer to the fully-open opening value TH_H with respect to the threshold value TH_VPH close to the fully-open opening value TH_H, similarly to the above, as the throttle valve opening TH is closer to the fully-open opening value, the switching function-setting parameter POLE_th is set to a value closer to the predetermined value POLE_th2. That is, the switching function-setting parameter POLE_th is set to such a value that allows an increase in the follow-up error E_th and reduces the disturbance suppressing capability. As a result, while maintaining the rotational speed assumed before the change of the setting of the switching function-setting parameter POLE_th, the throttle valve 91 is driven toward the fully-open stopper 93 in a state where the sensitivity of the control in increasing or decreasing the driving force applied to the throttle valve 91 in response to a decrease or increase in the follow-up error E_th is lower than before the change of the setting whereby the impact occurring when the throttle valve 91 is brought into contact with fully-open stopper 93 can be reduced.

Further, when the throttle valve opening TH is in a range of TH_VPL≦TH≦TH_VPH, the switching function-setting parameter POLE_th is set to the predetermined value POLE_th1 which is closer to a value of 0, whereby it is possible to maintain the follow-up capability of the throttle valve opening TH to the target throttle valve opening TH_cmd, the convergence behavior, and the disturbance suppressing capability at respective high levels.

In the present embodiment, the throttle valve opening TH corresponds to the control amount, the target throttle valve opening TH_cmd to the target control amount, and the opening control input Uth to the control input.

It should be noted that in the table shown in FIG. 36, the threshold values TH_VPL and TH_VPH may be set to such values as will satisfy the relationship of the (TH_VPL-TH_L)≠(TH_H-TH_VPH). Further, in calculating the switching function-setting parameter POLE_th, the table shown in FIG. 36 may be searched according to the target throttle valve opening TH_cmd in place of the throttle valve opening TH.

Although details of a control process for the throttle valve mechanism 90 are not shown, the control process is carried out in the same manner as the control process described hereinabove with reference to FIGS. 21 to 25. Particularly, initialization of the throttle valve mechanism 90 is carried out in the same manner as that of the variable valve lift mechanism 50 in FIG. 22.

According to the control system 1A configured as above, it is possible to obtain the same advantageous effects as provided by the control system 1 according to the first embodiment. Further, when throttle valve 91 is driven toward the fully-closed position or the fully-open position, it is possible to reduce the impact occurring when the throttle valve is brought into contact with inner wall of the intake pipe 12 and the fully-open stopper 93, and the driving time required for the actuation, in a compatible manner.

It is further understood by those skilled in the art that the foregoing are preferred embodiments of the invention, and that various changes and modifications may be made without departing from the spirit and scope thereof.

What is claimed is:

1. A control system comprising:
   a movable mechanism that has a restricting part, and a movable part that is brought into contact with said restricting part to be thereby limited in a movable range, said movable mechanism being operable to vary a control amount within a predetermined control range, by driving said movable part within the movable range;
   position detecting means for detecting a position of said movable part;
   control amount-calculating means for calculating the control amount according to the detected position of said movable part;
   target control amount-setting means for setting a target control amount as a target to which the control amount is to be controlled; and
   control input-calculating means for calculating a control input for controlling said movable mechanism with a predetermined control algorithm such that the control amount follows up the target control amount,
   wherein the predetermined control algorithm includes a disturbance suppressing parameter for suppressing influence of disturbance applied to said movable mechanism, and
   wherein said control input-calculating means has disturbance suppressing parameter-setting means for setting the disturbance suppressing parameter such that a degree of suppression of the influence of disturbance by the disturbance suppressing parameter becomes smaller, when one of the control amount and the target control amount is toward a limit value of the predetermined control range with respect to a predetermined value close to the limit value, or when the detected position of said movable part is toward a limit of the movable range with respect to a predetermined position close to the limit, than otherwise.

2. A control system as claimed in claim 1, wherein the predetermined control algorithm includes a predetermined response-specifying control algorithm, and
   wherein the disturbance suppressing parameter is a response-specifying parameter that specifies a speed of convergence of a difference between the control amount and the target control amount and a behavior of the convergence.

3. A control system as claimed in claim 1, wherein the predetermined control algorithm includes a predetermined two-degree-of-freedom control algorithm.

4. A control system as claimed in claim 1, wherein when said movable part is to be driven to the limit of the movable range, said target control amount-setting means sets the target control amount to a predetermined value outside the predetermined control range.

5. A control system as claimed in claim 1, further comprising determination means for determining whether or not said movable part is at the limit of the movable range, based on at least one of the detected position of said movable part and the calculated control amount; and
   correction value-calculating means for calculating a correction value for correcting the calculated control amount, according to a result of comparison between the control amount calculated when said determination means determines that said movable part is at the limit of the movable range and the limit value.

6. A control system as claimed in claim 1, wherein said movable mechanism is a variable valve lift mechanism that varies, as the control amount, a valve lift as a lift of at least one of a intake valve and an exhaust valve of an internal combustion engine.

7. A control system as claimed in claim 1, wherein said movable mechanism is a variable cam phase mechanism that varies, as the control amount, a cam phase as a phase of at least one of an intake cam and an exhaust cam relative to a crankshaft of an internal combustion engine.

8. A control system as claimed in claim 1, wherein said movable mechanism is a variable compression ratio mechanism that varies, as the control amount, a compression ratio of an internal combustion engine.

9. A control system as claimed in claim 1, wherein said movable mechanism is a throttle mechanism that varies, as the control amount, opening of a throttle valve provided in an intake passage of an internal combustion engine.

* * * * *